(12) United States Patent
Farag

(10) Patent No.: US 7,716,170 B2
(45) Date of Patent: May 11, 2010

(54) HOLISTIC DYNAMIC INFORMATION MANAGEMENT PLATFORM FOR END-USERS TO INTERACT WITH AND SHARE ALL INFORMATION CATEGORIES, INCLUDING DATA, FUNCTIONS, AND RESULTS, IN COLLABORATIVE SECURE VENUE

(76) Inventor: Wafik Farag, 2456 Massachusetts Ave., Apt.# 405, Cambridge, MA (US) 02140

( * ) Notice: Subject to any disclaimer, the term of this patent is extended or adjusted under 35 U.S.C. 154(b) by 1045 days.

(21) Appl. No.: 10/943,306

(22) Filed: Sep. 17, 2004

(65) Prior Publication Data

US 2005/0060342 A1 Mar. 17, 2005

Related U.S. Application Data

(63) Continuation-in-part of application No. 10/338,932, filed on Jan. 8, 2003, now abandoned.

(60) Provisional application No. 60/346,376, filed on Jan. 8, 2002.

(51) Int. Cl.
*G06F 7/00* (2006.01)
*G06F 17/00* (2006.01)

(52) U.S. Cl. .................. 707/104.1; 707/1; 707/2; 707/3; 707/9; 707/10; 707/101; 707/102; 707/103 R; 707/200

(58) Field of Classification Search .......... 707/102, 707/104
See application file for complete search history.

(56) References Cited

U.S. PATENT DOCUMENTS 5,701,453 A * 12/1997 Maloney et al. ............ 707/2
5,765,154 A * 6/1998 Horikiri et al. ............ 707/10
6,233,332 B1 * 5/2001 Anderson et al. ....... 379/265.09
6,262,730 B1 * 7/2001 Horvitz et al. ............ 715/707
6,338,069 B1 * 1/2002 Ghatate ................ 707/103 R
6,356,913 B1 * 3/2002 Chu et al. .............. 707/103 R
6,560,592 B1 * 5/2003 Reid et al. ................ 707/2

(Continued)

OTHER PUBLICATIONS

Farag et al. "FunBase: A function-based Information Management System." Software Systems Research Labrotory. pp. 507-515. Retrieved Dec. 19, 2006 from <http://delivery.acm.org/10.1145/180000/170408/p507-farag.pdf?key1=170408&key2=1860126611&dl=GUIDE&CFID=8999509&CFTOKEN=19987004>.*

*Primary Examiner*—Hosain T Alam
*Assistant Examiner*—Usmaan Saeed

(57) ABSTRACT

A method and system dynamically and contextually manage information in an electronic computational environment. In one aspect, a desired project provides a context for management of a plurality of information elements, each element being in at least one of a plurality of categories. Each category in turn is a member of a category set, and the category set includes data category, function category, and result category. The context corresponds to at least one model that is defined by the elements and a set of rules governing permissible relationships among the elements. The method includes: receiving an input to the environment specifying a relationship among at least two information elements; using an integrity engine, operating to enforce such rules, to verify dynamically correctness of the relationship specified; and upon acceptance of the relation by the integrity engine, storing automatically the relationship specified, so as to permit dynamic interaction with respect to the context. The relation can be specified and implemented on the fly, without a preconceived design process. Related systems are also provided.

28 Claims, 44 Drawing Sheets

U.S. PATENT DOCUMENTS

| | | | |
|---|---|---|---|
| 6,578,037 B1* | 6/2003 | Wong et al. | 707/10 |
| 6,944,596 B1* | 9/2005 | Gray et al. | 705/1 |
| 6,983,463 B1* | 1/2006 | Hunt | 719/316 |
| 7,065,745 B2* | 6/2006 | Chan | 717/117 |
| 2002/0069189 A1* | 6/2002 | Bertrand et al. | 706/45 |
| 2002/0123957 A1* | 9/2002 | Notarius et al. | 705/37 |
| 2003/0023686 A1* | 1/2003 | Beams et al. | 709/205 |
| 2003/0037301 A1* | 2/2003 | Rising, III | 715/513 |
| 2003/0037327 A1* | 2/2003 | Cicciarelli et al. | 717/178 |
| 2003/0069736 A1* | 4/2003 | Koubenski et al. | 705/1 |
| 2003/0126245 A1* | 7/2003 | Feltin et al. | 709/223 |
| 2003/0233585 A1* | 12/2003 | Quick et al. | 713/202 |
| 2005/0216503 A1* | 9/2005 | Charlot et al. | 707/103 R |
| 2006/0080288 A1* | 4/2006 | MacLaurin et al. | 707/3 |
| 2006/0253275 A1* | 11/2006 | Parkinson et al. | 704/9 |
| 2008/0104084 A1* | 5/2008 | Chavda et al. | 707/100 |

* cited by examiner

Replacement Sheet
DiBase Master

| DiBase Master ID | Project name | Schema name | Relation name | Function name | Result name | User ID | Date | Time | Location | Access rights | Reason | Description | databases | Attributes |
|---|---|---|---|---|---|---|---|---|---|---|---|---|---|---|
| 1 | | | | | | | | | | | | | | |
| 2 | HIP | Schema_ HIP | Relation_ HIP | Function_ HIP | Result_HI P | josh | 4/3/1994 | | | | | | Tb_Maste r_HIP | Attribute_ HIP |
| 3 | HIP Web | Schema_ HIP_Web | Relation_ HIP_Web | Function_ HIP_Web | Result_HI P_Web | josh | | | | | | | | |
| 1-1 | 1-2 | 1-3 | 1-4 | 1-5 | 1-6 | 1-7 | 1-8 | 1-9 | 1-10 | 1-11 | 1-12 | 1-13 | 1-14 | 1-15 |

Column numbers

Figure 1

Replacement Sheet
Schema X

| Schema ID | Attribute name | Type | User ID | Date | Time | Location | Access rights | Reason | Description | Data Source URL | Data Source name | Data Source function | Relations | Result tag | Triggers |
|---|---|---|---|---|---|---|---|---|---|---|---|---|---|---|---|
| 1 | name | char50 | wfarag | 3/15/1990 | 12:34 | MIT | 77663 | test | testing | | | | Tb_Sch_Rel_name | Tb_Sch_Res_name | Tb_Sch_Trigg_name |
| 2 | address | char255 | wfarag | 3/15/1990 | 12:34 | MIT | 77663 | test | testing | | | | Tb_Sch_Rel_address | | |
| 3 | phone # | numeric | wfarag | 3/15/1990 | 12:34 | MIT | 77663 | test | buyers market | www.yahoo.com | yahoo # | yahoo-tv-sony.2334 | Tb_Sch_Rel_phone# | | |
| 4 | order # | numeric | john | 2/11/1982 | 12:20 | Michigan | 75561 | test3 | what cust paid | | | | Tb_Sch_Rel_order# | Tb_Sch_Res_order# | |
| 5 | Price | numeric | john | 2/11/1982 | | Michigan | 75561 | test4 | | | | | Tb_Sch_Rel_price | | Tb_Sch_Trigg_price |
| 6 | cell phone | numeric | wfarag | 4/28/1993 | 11:00 | Cambridge | 77663 | test5 | emergency contact | | | | Tb_Sch_Rel_cellphone | | |
| 2-1 | 2-2 | 2-3 | 2-4 | 2-5 | 2-6 | 2-7 | 2-8 | 2-9 | 2-10 | 2-11 | 2-12 | 2-13 | 2-14 | 2-15 | 2-16 |

Column numbers

Figure 2

Tb_Sch_Rel_name

| Relation name | Attributes | Rel System |
|---|---|---|
| Customer | 2,3 | |
| Order | 4,5 | |
| 6-1 | 6-2 | 6-3 |

Figure 6

Replacement Sheet
Relation X

| Relation ID | Relation name by user | Relation name by system | DB name | Functions | Dimension | SubTable | User ID | Date | Time | Location | Access rights | Reason | Description | Attributes | Result tag |
|---|---|---|---|---|---|---|---|---|---|---|---|---|---|---|---|
| 1 | Customer | Cus1-2_3 | warehouse | Tb_Rel_Fun_Customer | | Tb_Rel_Sub_Customer | wfarag | 3/15/1990 | 12:34 | MIT | 75663 | test | customer table | Tb_Rel_Att_Customer | |
| 2 | Order | Ord-4_3 | | | | | | | | | | | | | |

| 3-1 | 3-2 | 3-3 | 3-4 | 3-5 | 3-6 | 3-7 | 3-8 | 3-9 | 3-10 | 3-11 | 3-12 | 3-13 | 3-14 | 3-15 | 3-16 |

Column numbers

Figure 3

Tb_Rel_Fun_Customer

| Functions | version | Attributes |
|---|---|---|
| Get_Phone | 12.2.3.4 | 1, 3 |
| Get_name | | 1, 3 |

| 9-1 | 9-2 | 9-3 |

Figure 9

Tb_Rel_Sub_Customer

| SubTable | DB name | User ID | Split date | Time |
|---|---|---|---|---|
| Customer-a-f | Telco2 | wfarag | 6/11/1996 | 12:34 |
| Customer-g-k | Telco3 | | 6/11/1996 | |
| Customer-l-z | | | 6/11/1996 | |

| 10-1 | 10-2 | 10-3 | 10-4 | 10-5 |

Figure 10

Tb_Rel_Att_Customer

| Attributes | User ID | Date added to Relation | Date deleted from Relation | Key role |
|---|---|---|---|---|
| name | wfarag | 3/15/1990 | 3/15/1990 | PK |
| address | wfarag | 3/15/1990 | 3/15/1990 | |
| phone# cell | wfarag | 3/15/1990 | 3/15/1990 | |
| phone | wfarag | 4/28/1993 | 1/28/1994 | DK |

| 11-1 | 11-2 | 11-3 | 11-4 | 11-5 |

Figure 11

Replacement Sheet
Function X

| Function ID | Function name | version | Inputs | Outputs | author | Check by User ID | Date | Time | Location | Access rights | Reason | Description | Classification | Path | OS | Platform | Programming language | Compiler | Complexity | Execution time | sof runs |
|---|---|---|---|---|---|---|---|---|---|---|---|---|---|---|---|---|---|---|---|---|---|
| 1 | sort | Tb_Fun_v er_sort | Tb_Fun_I nput_sort | Tb_Fun_o utput_sort | Wafik Farag | janet | 12/2/1994 | 12:34 | NY | 777 32 | | | | c:\BioIPro grams | W2K, XP | Windows | | C++ | n2 | 0:03 | 20 |
| 2 | Get_phone | Tb_Fun_v er_get_ph one | Tb_Fun_I nput_get_ phone | Tb_Fun_o utput_get_ phone | Pavlos | jamet | | | | | | | application | | | | | Java | | | |
| | Get_name | Tb_Fun_v er_get_na me | Tb_Fun_I nput_get_ name | Tb_Fun_o utput_get_ name | Janet | janet | | | | | | | | | | | | no | | | |
| 4-1 | 4-2 | 4-3 | 4-4 | 4-5 | 4-6 | 4-7 | 4-8 | 4-9 | 4-10 | 4-11 | 4-12 | 4-13 | 4-14 | 4-15 | 4-16 | 4-17 | 4-18 | 4-19 | 4-20 | 4-21 | 4-22 |

Column numbers

Figure 4

Replacement Sheet
Result X

| Result ID | Result tag | Type | User ID | Date | Time | Location | Access rights | Reason | Description | Function list | Data flow path table | Data Source function | Relations | Triggers |
|---|---|---|---|---|---|---|---|---|---|---|---|---|---|---|
| 1 | | | | | | | | | | | | | | |
| 2 | | | | | | | | | | | | | | |

5-1   5-2   5-3   5-4   5-5   5-6   5-7   5-8   5-9   5-10   5-11   5-12   5-13   5-14   5-15

Column numbers

DFP-

Function  Instantiatio output list

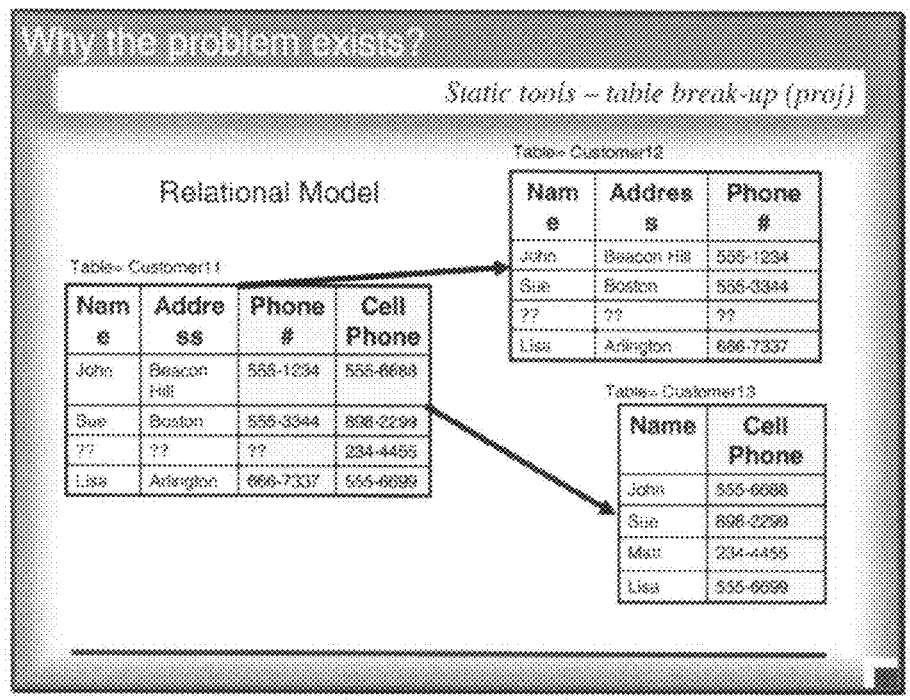
Figure 14- Prior Art
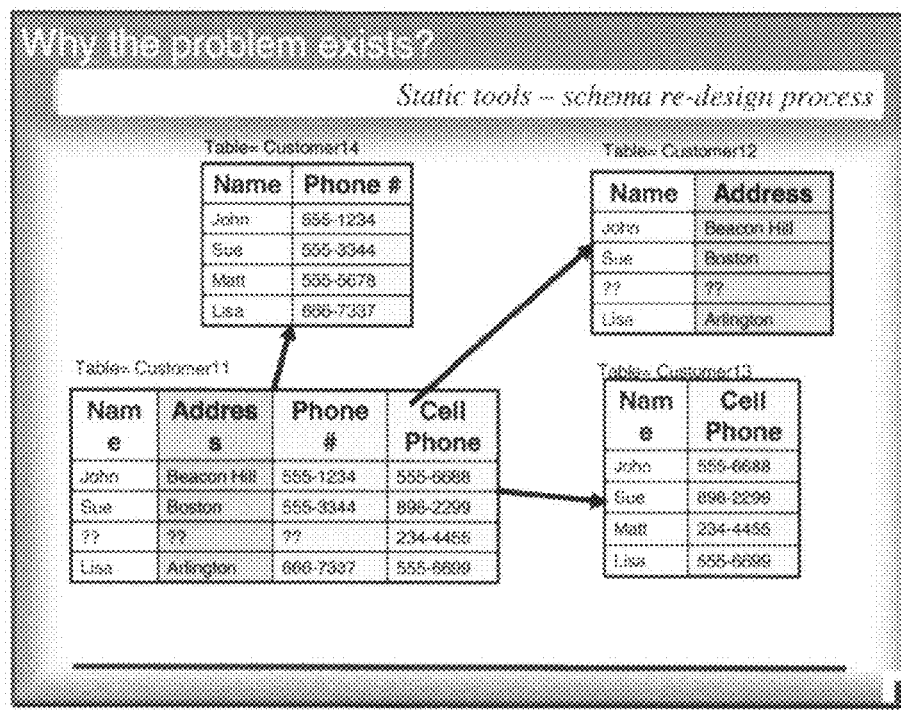
Figure 15- Prior Art

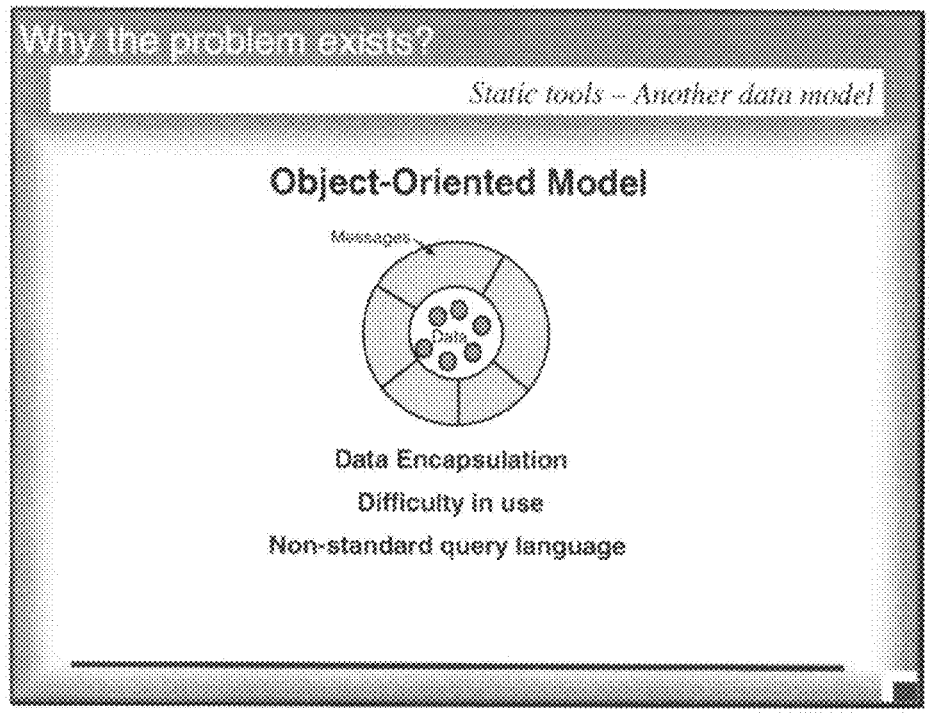
Figure 16- Prior Art
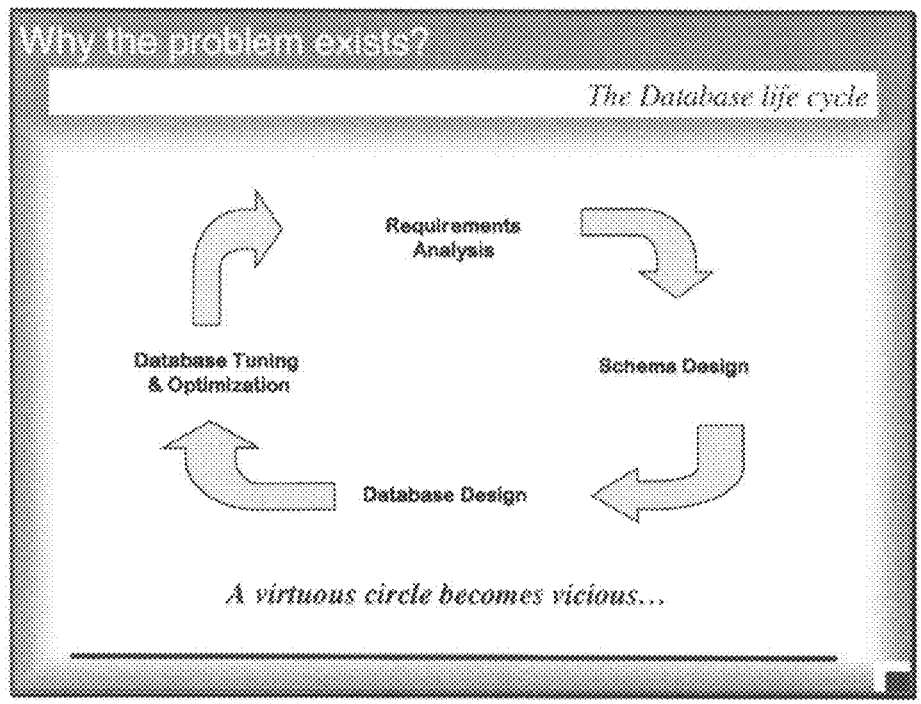
Figure 17- Prior Art

```xml
<?xml version="1.0" encoding="UTF-8" ?>
<DATABASES>
<DATABASE NAME="UNIGENE">
<FILE FORMAT="*.data" RECORD_SEPARATOR="//">
<ATTRIBUTES>
<ATTRIBUTE TYPE="TX" LENGTH="450" CHILD_ATT="N" REPEATABLE="N"
    ATT_SEPARATOR="NEWLINE" VALUE_SEPARATOR="" KEYROLE="PK"
    ELEMENT="N" MULTIPLE="N" GENERATE="N">
  <DESCRIPTION>UniGene Cluster id</DESCRIPTION>
  <DB_ATTRIBUTE_NAME>UN_DATA_ID</DB_ATTRIBUTE_NAME>
  <ATTRIBUTE_NAME>ID</ATTRIBUTE_NAME>
  </ATTRIBUTE>
<ATTRIBUTE TYPE="TX" LENGTH="450" CHILD_ATT="N" REPEATABLE="N"
    ATT_SEPARATOR="NEWLINE" VALUE_SEPARATOR="" KEYROLE="" ELEMENT="N"
    MULTIPLE="N" GENERATE="N">
  <DESCRIPTION>Title for the cluster</DESCRIPTION>
  <DB_ATTRIBUTE_NAME>UN_DATA_TITLE</DB_ATTRIBUTE_NAME>
  <ATTRIBUTE_NAME>TITLE</ATTRIBUTE_NAME>
  </ATTRIBUTE>
<ATTRIBUTE TYPE="TX" LENGTH="450" CHILD_ATT="N" REPEATABLE="N"
    ATT_SEPARATOR="NEWLINE" VALUE_SEPARATOR="" KEYROLE="" ELEMENT="N"
    MULTIPLE="N" GENERATE="N">
  <DESCRIPTION>Gene symbol</DESCRIPTION>
  <DB_ATTRIBUTE_NAME>UN_DATA_GENE</DB_ATTRIBUTE_NAME>
  <ATTRIBUTE_NAME>GENE</ATTRIBUTE_NAME>
  </ATTRIBUTE>
<ATTRIBUTE TYPE="TX" LENGTH="450" CHILD_ATT="N" REPEATABLE="N"
    ATT_SEPARATOR="NEWLINE" VALUE_SEPARATOR="" KEYROLE="" ELEMENT="N"
    MULTIPLE="N" GENERATE="N">
  <DESCRIPTION>Cytological band</DESCRIPTION>
  <DB_ATTRIBUTE_NAME>UN_DATA_CYTOBAND</DB_ATTRIBUTE_NAME>
  <ATTRIBUTE_NAME>CYTOBAND</ATTRIBUTE_NAME>
  </ATTRIBUTE>
<ATTRIBUTE TYPE="TX" LENGTH="500" CHILD_ATT="N" REPEATABLE="N"
    ATT_SEPARATOR="NEWLINE" VALUE_SEPARATOR="" KEYROLE="" ELEMENT="N"
    MULTIPLE="N" GENERATE="N">
  <DESCRIPTION>Tissues of origin for ESTs in cluster</DESCRIPTION>
  <DB_ATTRIBUTE_NAME>UN_DATA_EXPRESS</DB_ATTRIBUTE_NAME>
  <ATTRIBUTE_NAME>EXPRESS</ATTRIBUTE_NAME>
  </ATTRIBUTE>
<ATTRIBUTE TYPE="TX" LENGTH="450" CHILD_ATT="N" REPEATABLE="N"
    ATT_SEPARATOR="NEWLINE" VALUE_SEPARATOR="" KEYROLE="" ELEMENT="N"
    MULTIPLE="N" GENERATE="N">
  <DESCRIPTION>Genomic confirmation of presence of a 3'
    terminus</DESCRIPTION>
```

Figure 42 A

```xml
<DB_ATTRIBUTE_NAME>UN_DATA_GNM_TERMINUS</DB_ATTRIBUTE_NAME>
<ATTRIBUTE_NAME>GNM_TERMINUS</ATTRIBUTE_NAME>
</ATTRIBUTE>
<ATTRIBUTE TYPE="TX" LENGTH="450" CHILD_ATT="N" REPEATABLE="N"
    ATT_SEPARATOR="NEWLINE" VALUE_SEPARATOR="" KEYROLE="" ELEMENT="N"
    MULTIPLE="N" GENERATE="N">
<DESCRIPTION>LocusLink identifier associated with at least one sequence in
    this cluster (Hs only)</DESCRIPTION>
<DB_ATTRIBUTE_NAME>UN_DATA_LOCUSLINK</DB_ATTRIBUTE_NAME>
<ATTRIBUTE_NAME>LOCUSLINK</ATTRIBUTE_NAME>
</ATTRIBUTE>
<ATTRIBUTE TYPE="TX" LENGTH="450" CHILD_ATT="N" REPEATABLE="N"
    ATT_SEPARATOR="NEWLINE" VALUE_SEPARATOR="" KEYROLE="" ELEMENT="N"
    MULTIPLE="N" GENERATE="N">
<DESCRIPTION>Chromosome</DESCRIPTION>
<DB_ATTRIBUTE_NAME>UN_DATA_CHROMOSOME</DB_ATTRIBUTE_NAME>
<ATTRIBUTE_NAME>CHROMOSOME</ATTRIBUTE_NAME>
</ATTRIBUTE>
<ATTRIBUTE TYPE="TX" LENGTH="450" CHILD_ATT="Y" REPEATABLE="Y"
    ATT_SEPARATOR="NEWLINE" VALUE_SEPARATOR="" KEYROLE="" ELEMENT="N"
    MULTIPLE="N" GENERATE="N">
<DESCRIPTION>STS</DESCRIPTION>
<DB_ATTRIBUTE_NAME>UN_DATA_STS</DB_ATTRIBUTE_NAME>
<ATTRIBUTE_NAME>STS</ATTRIBUTE_NAME>
<CHLD_ATTRIBUTES>
<CHLD_ATTRIBUTE TYPE="TX" LENGTH="450" ATT_SEPARATOR=""
    VALUE_SEPARATOR="=" KEYROLE="" ELEMENT="N" MULTIPLE="N">
<DESCRIPTION>Name of STS</DESCRIPTION>
<DB_ATTRIBUTE_NAME>UN_DATA_NAME</DB_ATTRIBUTE_NAME>
<ATTRIBUTE_NAME>NAME</ATTRIBUTE_NAME>
</CHLD_ATTRIBUTE>
<CHLD_ATTRIBUTE TYPE="TX" LENGTH="450" ATT_SEPARATOR=""
    VALUE_SEPARATOR="=" KEYROLE="" ELEMENT="N" MULTIPLE="N">
<DESCRIPTION>GenBank/EMBL/DDBJ accession number of STS (optional
    field)</DESCRIPTION>
<DB_ATTRIBUTE_NAME>UN_DATA_ACC</DB_ATTRIBUTE_NAME>
<ATTRIBUTE_NAME>ACC</ATTRIBUTE_NAME>
</CHLD_ATTRIBUTE>
<CHLD_ATTRIBUTE TYPE="TX" LENGTH="450" ATT_SEPARATOR=""
    VALUE_SEPARATOR="=" KEYROLE="" ELEMENT="N" MULTIPLE="N">
<DESCRIPTION>GDB Dsegment number (optional field)</DESCRIPTION>
<DB_ATTRIBUTE_NAME>UN_DATA_DSEG</DB_ATTRIBUTE_NAME>
<ATTRIBUTE_NAME>DSEG</ATTRIBUTE_NAME>
</CHLD_ATTRIBUTE>
<CHLD_ATTRIBUTE TYPE="TX" LENGTH="450" ATT_SEPARATOR=""
    VALUE_SEPARATOR="=" KEYROLE="" ELEMENT="N" MULTIPLE="N">
```

Figure 42 B

```xml
<DESCRIPTION>dentifier in NCBI's    UNISTS database</DESCRIPTION>
<DB_ATTRIBUTE_NAME>UN_DATA_UNISTS</DB_ATTRIBUTE_NAME>
<ATTRIBUTE_NAME>UNISTS</ATTRIBUTE_NAME>
   </CHLD_ATTRIBUTE>
   </CHLD_ATTRIBUTES>
   </ATTRIBUTE>
<ATTRIBUTE TYPE="TX" LENGTH="450" CHILD_ATT="Y" REPEATABLE="Y"
   ATT_SEPARATOR="NEWLINE" VALUE_SEPARATOR="" KEYROLE="" ELEMENT="N"
   MULTIPLE="N" GENERATE="N">
<DESCRIPTION>TXMAP</DESCRIPTION>
<DB_ATTRIBUTE_NAME>UN_DATA_TXMAP</DB_ATTRIBUTE_NAME>
<ATTRIBUTE_NAME>TXMAP</ATTRIBUTE_NAME>
<CHLD_ATTRIBUTES>
<CHLD_ATTRIBUTE TYPE="TX" LENGTH="450" ATT_SEPARATOR=";"
   VALUE_SEPARATOR="=" KEYROLE="" ELEMENT="N" MULTIPLE="N">
<DESCRIPTION>Marker found on at least one sequence in this
   cluster</DESCRIPTION>
<DB_ATTRIBUTE_NAME>UN_DATA_MARKER</DB_ATTRIBUTE_NAME>
<ATTRIBUTE_NAME>MARKER</ATTRIBUTE_NAME>
   </CHLD_ATTRIBUTE>
<CHLD_ATTRIBUTE TYPE="TX" LENGTH="450" ATT_SEPARATOR=";"
   VALUE_SEPARATOR="=" KEYROLE="" ELEMENT="N" MULTIPLE="N">
<DESCRIPTION>Radiation Hybrid panel used to place marker</DESCRIPTION>
<DB_ATTRIBUTE_NAME>UN_DATA_RHPANEL</DB_ATTRIBUTE_NAME>
<ATTRIBUTE_NAME>RHPANEL</ATTRIBUTE_NAME>
   </CHLD_ATTRIBUTE>
   </CHLD_ATTRIBUTES>
   </ATTRIBUTE>
<ATTRIBUTE TYPE="TX" LENGTH="450" CHILD_ATT="Y" REPEATABLE="Y"
   ATT_SEPARATOR="NEWLINE" VALUE_SEPARATOR="" KEYROLE="" ELEMENT="N"
   MULTIPLE="N" GENERATE="N">
<DESCRIPTION>PROTSIM</DESCRIPTION>
<DB_ATTRIBUTE_NAME>UN_DATA_PROTSIM</DB_ATTRIBUTE_NAME>
<ATTRIBUTE_NAME>PROTSIM</ATTRIBUTE_NAME>
<CHLD_ATTRIBUTES>
<CHLD_ATTRIBUTE TYPE="TX" LENGTH="450" ATT_SEPARATOR=";"
   VALUE_SEPARATOR="=" KEYROLE="" ELEMENT="N" MULTIPLE="N">
<DESCRIPTION>Organism</DESCRIPTION>
<DB_ATTRIBUTE_NAME>UN_DATA_ORG</DB_ATTRIBUTE_NAME>
<ATTRIBUTE_NAME>ORG</ATTRIBUTE_NAME>
   </CHLD_ATTRIBUTE>
<CHLD_ATTRIBUTE TYPE="TX" LENGTH="450" ATT_SEPARATOR=";"
   VALUE_SEPARATOR="=" KEYROLE="" ELEMENT="N" MULTIPLE="N">
<DESCRIPTION>Sequence GI of protein</DESCRIPTION>
<DB_ATTRIBUTE_NAME>UN_DATA_PROTGI</DB_ATTRIBUTE_NAME>
<ATTRIBUTE_NAME>PROTGI</ATTRIBUTE_NAME>
   </CHLD_ATTRIBUTE>
```

Figure 42 C

```xml
<CHLD_ATTRIBUTE TYPE="TX" LENGTH="450" ATT_SEPARATOR=";"
    VALUE_SEPARATOR="=" KEYROLE="" ELEMENT="N" MULTIPLE="N">
  <DESCRIPTION>Sequence ID of protein</DESCRIPTION>
  <DB_ATTRIBUTE_NAME>UN_DATA_PROTID</DB_ATTRIBUTE_NAME>
  <ATTRIBUTE_NAME>PROTID</ATTRIBUTE_NAME>
</CHLD_ATTRIBUTE>
<CHLD_ATTRIBUTE TYPE="TX" LENGTH="450" ATT_SEPARATOR=";"
    VALUE_SEPARATOR="=" KEYROLE="" ELEMENT="N" MULTIPLE="N">
  <DESCRIPTION>Percent alignment</DESCRIPTION>
  <DB_ATTRIBUTE_NAME>UN_DATA_PCT</DB_ATTRIBUTE_NAME>
  <ATTRIBUTE_NAME>PCT</ATTRIBUTE_NAME>
</CHLD_ATTRIBUTE>
<CHLD_ATTRIBUTE TYPE="TX" LENGTH="450" ATT_SEPARATOR=";"
    VALUE_SEPARATOR="=" KEYROLE="" ELEMENT="N" MULTIPLE="N">
  <DESCRIPTION>length of aligned region (aa)</DESCRIPTION>
  <DB_ATTRIBUTE_NAME>UN_DATA_ALN</DB_ATTRIBUTE_NAME>
  <ATTRIBUTE_NAME>ALN</ATTRIBUTE_NAME>
</CHLD_ATTRIBUTE>
</CHLD_ATTRIBUTES>
</ATTRIBUTE>
<ATTRIBUTE TYPE="TX" LENGTH="450" CHILD_ATT="N" REPEATABLE="N"
    ATT_SEPARATOR="NEWLINE" VALUE_SEPARATOR="" KEYROLE="" ELEMENT="N"
    MULTIPLE="N" GENERATE="N">
  <DESCRIPTION>SCOUNT</DESCRIPTION>
  <DB_ATTRIBUTE_NAME>UN_DATA_SCOUNT</DB_ATTRIBUTE_NAME>
  <ATTRIBUTE_NAME>SCOUNT</ATTRIBUTE_NAME>
</ATTRIBUTE>
<ATTRIBUTE TYPE="TX" LENGTH="450" CHILD_ATT="Y" REPEATABLE="Y"
    ATT_SEPARATOR="NEWLINE" VALUE_SEPARATOR="" KEYROLE="" ELEMENT="N"
    MULTIPLE="N" GENERATE="N">
  <DESCRIPTION>SEQUENCE</DESCRIPTION>
  <DB_ATTRIBUTE_NAME>UN_DATA_SEQUENCE</DB_ATTRIBUTE_NAME>
  <ATTRIBUTE_NAME>SEQUENCE</ATTRIBUTE_NAME>
<CHLD_ATTRIBUTES>
<CHLD_ATTRIBUTE TYPE="TX" LENGTH="450" ATT_SEPARATOR=";"
    VALUE_SEPARATOR="=" KEYROLE="" ELEMENT="N" MULTIPLE="N">
  <DESCRIPTION>GenBank/EMBL/DDBJ accession number of
      sequence</DESCRIPTION>
  <DB_ATTRIBUTE_NAME>UN_DATA_ACC</DB_ATTRIBUTE_NAME>
  <ATTRIBUTE_NAME>ACC</ATTRIBUTE_NAME>
</CHLD_ATTRIBUTE>
<CHLD_ATTRIBUTE TYPE="TX" LENGTH="450" ATT_SEPARATOR=";"
    VALUE_SEPARATOR="=" KEYROLE="" ELEMENT="N" MULTIPLE="N">
  <DESCRIPTION>Unique nucleotide sequence identifier (gi)</DESCRIPTION>
  <DB_ATTRIBUTE_NAME>UN_DATA_NID</DB_ATTRIBUTE_NAME>
  <ATTRIBUTE_NAME>NID</ATTRIBUTE_NAME>
</CHLD_ATTRIBUTE>
```

Figure 42 D

```xml
<CHLD_ATTRIBUTE TYPE="TX" LENGTH="450" ATT_SEPARATOR=";"
    VALUE_SEPARATOR="=" KEYROLE="" ELEMENT="N" MULTIPLE="N">
<DESCRIPTION>Unique protein sequence identifier (used for non-
    ESTs)</DESCRIPTION>
<DB_ATTRIBUTE_NAME>UN_DATA_PID</DB_ATTRIBUTE_NAME>
<ATTRIBUTE_NAME>PID</ATTRIBUTE_NAME>
</CHLD_ATTRIBUTE>
<CHLD_ATTRIBUTE TYPE="TX" LENGTH="450" ATT_SEPARATOR=";"
    VALUE_SEPARATOR="=" KEYROLE="" ELEMENT="N" MULTIPLE="N">
<DESCRIPTION>Clone identifier (used for ESTs only)</DESCRIPTION>
<DB_ATTRIBUTE_NAME>UN_DATA_CLONE</DB_ATTRIBUTE_NAME>
<ATTRIBUTE_NAME>CLONE</ATTRIBUTE_NAME>
</CHLD_ATTRIBUTE>
<CHLD_ATTRIBUTE TYPE="TX" LENGTH="450" ATT_SEPARATOR=";"
    VALUE_SEPARATOR="=" KEYROLE="" ELEMENT="N" MULTIPLE="N">
<DESCRIPTION>End (5'/3') of clone insert read (used for ESTs
    only)</DESCRIPTION>
<DB_ATTRIBUTE_NAME>UN_DATA_END</DB_ATTRIBUTE_NAME>
<ATTRIBUTE_NAME>END</ATTRIBUTE_NAME>
</CHLD_ATTRIBUTE>
<CHLD_ATTRIBUTE TYPE="TX" LENGTH="450" ATT_SEPARATOR=";"
    VALUE_SEPARATOR="=" KEYROLE="" ELEMENT="N" MULTIPLE="N">
<DESCRIPTION>Library ID; see Hs.lib.info for library name and
    tissue</DESCRIPTION>
<DB_ATTRIBUTE_NAME>UN_DATA_LID</DB_ATTRIBUTE_NAME>
<ATTRIBUTE_NAME>LID</ATTRIBUTE_NAME>
</CHLD_ATTRIBUTE>
<CHLD_ATTRIBUTE TYPE="TX" LENGTH="450" ATT_SEPARATOR=";"
    VALUE_SEPARATOR="=" KEYROLE="" ELEMENT="N" MULTIPLE="N">
<DESCRIPTION>5' CDS-completeness indicator</DESCRIPTION>
<DB_ATTRIBUTE_NAME>UN_DATA_MGC</DB_ATTRIBUTE_NAME>
<ATTRIBUTE_NAME>MGC</ATTRIBUTE_NAME>
</CHLD_ATTRIBUTE>
</CHLD_ATTRIBUTES>
</ATTRIBUTE>
</ATTRIBUTES>
</FILE>
</DATABASE>
<DATABASE NAME="ENSEMBL">
<DATABASE NAME="LOCUSLINK">
<DATABASE NAME="OMIM">
<DATABASE NAME="SWISS-PROT">

<DATABASE NAME="KEGG">
<DATABASE NAME="GO">
</DATABASES>
```

Figure 42 E

HOLISTIC DYNAMIC INFORMATION MANAGEMENT PLATFORM FOR END-USERS TO INTERACT WITH AND SHARE ALL INFORMATION CATEGORIES, INCLUDING DATA, FUNCTIONS, AND RESULTS, IN COLLABORATIVE SECURE VENUE

The present application is a continuation in part of application Ser. No. 10/338,932, filed Jan. 8, 2003 now abandoned, entitled "A holistic dynamic information management platform for end-users to interact with and share all information categories, including data, functions, and results, in a collaborative secure venue" by the present inventor, Wafik Farag. That application claimed the benefit of priority of Provisional Patent Application No. 60/346,376 filed on Jan. 8, 2002. Both of the foregoing applications are hereby incorporated herein by reference.

BACKGROUND ART

Data plays a major role affecting the whole information spectrum which is conventionally known as database management systems (DBMS) as discussed next.

Data:

DBMS were designed to satisfy the storage and retrieval needs of large static software system. DBMS have been extremely successful in sustaining the demands of large stable corporate entities that required little change over time. However, in a dynamic environment, like biotechnology, where the main activity is research for finding new relations among different organisms and compounds mandates to quickly capture new results that link existing with newly found or introduced attributes, in which case a DBMS quickly breaks down. Similarly, in the area of data mining where new relations are discovered about existing datasets, these relations need to be integrated with the datasets to effectively put to work the new data mined relations.

Three main obstacles that best describe such breakdown are as follows:
 1. The fact that existing DBMS are static consumes time and expensive resources in the event a change is needed, due to the schema re-design process. A dynamic DBMS allows end-users to quickly reflect a change like create new attributes or capture new relations on-the-fly.
 2. A shift in type of user directly accessing the database is needed. Database administrators (DBAs) guarded their systems very closely preventing any access. This is essential when DBMS systems are used, for example, in call centers with users' level of sophistication is minimal and the type of data at hand is important. In the example of the biotech research, the end-user is a scientist of an experienced caliber and the type of data is sometimes owned by that same scientist who guards it with a degree of vigilance maybe higher than a DBA.
 3. Collaboration becomes essential in keeping a system up to date which requires a system to accept new input from several sources, in the form of new data categories and relationships and not only new data values. The traditional database life cycle of requirement gathering by a team, schema design, than passing the flow to a few DBAs breaks down because of limiting sophisticated end-users access to directly contribute to the system over time thus keeping the system up to date.

The above three obstacles stem mainly from existing DBMS static approach to change. Examples of most widely used static models are relational and object oriented. These obstacles will be clearer as to why they exist after discussing the short comings of both models.

Conventional DBMS:

Conventional relational DBMS, the most widely used data model, is based on lambda calculus. It tightly fixes the relation between attributes, data elements signifying a group of values like phone-numbers, to their relations. For example, a relation called "Customer" is represented as a table with a group of attributes: name, address, and phone #. This is represented in the data dictionary, a master lookup table used by the relational model to parse and execute SQL queries. An entry in the data dictionary would look like "Customer: name, address→phone #" which means a phone # is dependant on name and address in relation/table "Customer" and that the attributes name, address, and phone # reside in relation Customer. In the data dictionary, each table has one entry with the table name as the key value for search together with all the functional dependencies within that table. A user cannot get a person's phone # if they only know their name, the name of the relation must be supplied as well. In the relational model, the interface language available to programmers, i.e. technical users, is SQL. A user executes an SQL query, like: "Select phone # from Customer where name=Matt" to get Matt's phone number out of the relational model. If the user does not know the table name "Customer" and that attributes name and phone # belong to the Customer table, the user will not be able to retrieve a person's phone number, which is known as schema in the relational model. The user is required to have a priori knowledge of the underlying schema in order to use the DBMS. The schema identifies the relations between attributes and tables and the dependencies among attributes. This is one reason that makes relational models rigid because attributes are fixed to a relationship once a schema is designed.

The above design limitation of fixing attributes to relations in a relational model explains its rigidity and therefore its inability to change relationships on-the-fly. Let us assume customer now has a cell phone number and a DBA adds it to table Customer as a quick work around to avoid schema redesign (see FIG. 12 fourth column in table customer). Let's say customer Matt moves (See FIG. 13). Due to the delete anomalies, the customer cell phone number data will be lost since the functional dependency of table Customer in the data dictionary looked like: "Customer: name, address→phone #, cell phone" which renders the cell phone dependent on the name and address. To avoid losing the cell phone number information, the user needs to split the Customer table into two tables, say Customer12 and Customer13 (See FIG. 14), which triggers a complete schema redesign cycle (see FIG. 17). Similarly, if phone is found to depend only on name and not address, a similar split will be needed (See FIG. 15) to preserve the functional dependencies as name→phone # and name→address. This ruggedness to change can have major business impact due to time delay and expenses incurred. For example, when the FCC issued that customers can keep their phone number irrespective of the phone company allowing users to take their phone numbers wherever they move implies that phone# depends on name and not address triggers a databases re-design.

Another aspect of relational database model rigidity is that the process of designing a schema is manual—carried out by experts (database administrators) utilizing a set of external business rules and data normalization rules. These rules when put together with the experience of experts define the data model that exists in the relational database. The data normalization rules enforce the integrity of the data in the model (i.e. business rules) under design.

Other database models, like object-oriented database have similar limitations. In FIG. 16, the object model encapsulates data elements by methods. The relationships and logic of the encapsulated data elements are locked in the encapsulating methods. A change mandates a change in the method and the messages related to accessing that method will need to change as well rendering the model also rigid to dynamic change requiring a system redesign. Object-oriented suffer from two other main obstacles: data encapsulation makes it harder for an end user to access the data without knowing the method to use. The user needs to know the object, the correct methods, as well as how to instantiate the messages for accessing the data as a priori knowledge of the system. Secondly, no standard query language exists in the object oriented paradigm which gained the relational model popularity in the market share due to the ease of use and standard operators available in the SQL language.

Type of User: Both models suffer from limiting their user community to highly technical users to interact with the DBMS such as DBAs or programs. Programmers embed statements to query or insert data in the function code they write allowing the function to interact with the underlying DBMS. Written functions shield end users from the details or the need of a priori knowledge of the underlying data model. However, this creates a layer banning access for an end user to interact with the actual data layer as stored in conventional DBMS.

Collaboration: From the previous point, type of users allowed to interact with DBMS is limited to only highly technical staff. This shuts access for end-user collaboration, mainly the business or non-technical user.

Information:

Beyond data, the two best known categories are functions and results.

Software Systems

A software system is best described as a: data layer where data is stored in a conventional database management system (DBMS); a functionality layer where a group of functions are stored in a file system or a functionality server to be instantiated by a user via the interface layer; and an interface, i.e. result or rendering layer, which manages the input and output of the system to the User. Each layer responds to requests interfacing with the underlying layer forming a software system.

Prior art software systems of the type described in previous paragraph have limitations that can be characterized:

1. Interactions are one-way: Users request or insert data according to a predefined slot or functionality. For example, a user in a car repair shop notices that the color of the car does relate to the repair intervals of certain parts. Let's say red car drivers can be more aggressive resulting in more frequent tire and brake repairs. Adding attribute "color" to relations in a conventional system by an end user is not possible. It requires technical expertise and might trigger a schema re-design. This results into an impact on the DBMS, on the functionality server to re-write the function to reflect the new change, and the interface to accommodate the users to enter new requirements. That is what is meant by "one-way", i.e. using the system as designed inserting or requesting data values based on some operation out of the system, not possible to add or change new requirements into the system. In case a result creates a new attribute, the result can not be stored back into the system—i.e. on-way.

2. Closed function-base: Inserting new functionality requires technical expertise to add and link them to the underlying DBMS, i.e. create the relation between the function and what attributes/tables it needs to access. Even if the software system exposes the function base, i.e. available functions, to the user empowering them to choose the sequence of execution by building a workflow or a data-flow-path (DFP), the pool of available functions is still closed. The system suffers from its inability to allow end-user to add new functions to the pool because making the link to the underlying DMBS requires knowledge of the underlying design of attributes and relationships.

3. User interaction: end-user interaction is limited to the interface as requested by the business needs and developed by a technical team. The end-user doesn't have control to make a change and depends on technical resources. System updates translates into a painful process with time delays for updates plus the expense to carry out.

The biggest obstacle in a software system becomes its static DBMS that captures the business requirements of the system regarding relationships among data items like attributes and tables are stored. Because of this static nature, software systems are built in a "silo" fashion. The database is independent of the functionality server and the functions have data retrieval statements that are not tracked, while the results that come out of the system are usually not related to the state of the software system. Hence, a change in the DBMS doesn't trigger which functions are affected—no relationship exists—the programmers who insert the data access statements in the function code assume static state of the system and any schema re-design includes re-visiting and manually examining the function-base as well—i.e. "system silo effect". Similarly with results, an obtained result doesn't keep track of the DFP used or data sources used.

In a software system, the interface layer is best known to be data-driven or static. For example, a web-based system using dynamic data driven web layout is driven by a function that is based on the underlying static data model. The dynamic aspect of the interface is based on the permutations and combinations of the fixed pool of attributes whose data values trigger conditions causing a change in the web-state. Changing the interface behavior needs an update in the driving function(s) and updates to the data-model statements requiring a priori knowledge expected by a technical user. That is, the static DBMS remains an obstacle, because change (to the system) based on new attributes is limited to inserting data values in a pre-defined slot in the designed database.

The system silo effect hinders an end-users' ability to add new features or change system behavior.

Function

Advancements in function-bases are limited, that is, where functions can be stored, selected accessed, arranged for execution in a DFP manner, enabled by end users to gain more independent control in achieving results tailored to their needs quickly. A key obstacle remaining is the inability of end-users to introduce new functionality. As discussed above in the software system limitations, adding new functionality or modifying existing functionality that requires or reflects a change in the underlying data model remains a stumbling block to end-users. It requires technical assistance from resources to intervene. At the same time, functions that have the data retrieval components, such as the SQL statement, embedded in the code make them tightly-coupled—inflexible to be used against any other data source, creating a another layer of integration complexity. Hence, existing function-bases are static.

This limitation translates to a number of areas:
1. Collaboration: end-users can't share functions which encapsulate experience or complex logic instrumental in obtaining certain results.
2. Data integration: A function operates on data sources and its logic results in linking those sources creating a relation among them. This is key in advancement of data integration is to enable researches and end-users to contribute to large data integration efforts.

Result

Results suffer from symptoms that are similar to those in the case of functions. Prior art in capturing how results are obtained by which set of functions and data sources used cannot be stored back into a database if these results introduce the need for new attributes or new relations for the data to be stored in. For example, consider a merchant identifying its customers via their phone numbers. One customer requests to add the cell phone number as an alternate number. If the database doesn't have an attribute or a slot of an alternate or cell phone number, the merchant is stuck with a rigid system that makes expansion difficult—a common experience. Hence results that do require a DBMS change are stuck. Another shortcoming in results is in collaboration and sharing of results. It is difficult for a user to find how new results where obtained, what DFP—sequence of functions used with what input parameters and which versions of functions used, and the datasets used in the DFP. A user has no access to such valuable information of how a result is obtained or of finding how new data sources or functions could be used in obtaining a result—doing what-if analysis.

Data Integration:

Due to the importance of this topic—data integration—unraveling the root symptom is important and relevant to this invention as the tool under discussion solves root cause. Data integration across multiple sources today is typically performed as a manual activity, namely capturing a relation between two or more items. Doing this still remains a challenge! The key bottleneck remains the static nature of the tools and the approach to the problem.

Various obstacles, in the prior art, hinder dynamic data integration. Consider the way in which people try to integrate static systems in a collaborative environment. Most integration efforts tackle the process by assigning a limited number of experts (i.e., the "Group") to integrate a number of underlying data sources. The Group creates a parser-like engine or identifies relationships in a schema-design-like exercise. The outcome is a virtual integration layer providing a unified view for the end user. By the time the integration process is complete; two factors already limit the effectiveness of the solution developed by the Group. First, each underlying data source continues to change. Second, other experts outside the Group continue to find new integration relationships. Hence, the Group is forced to undertake another effort of data integration. This iterative approach to integration fails to take into account the on going changes that take place while the integration process is in progress. By the time the process is complete, it is already obsolete!! The time spent creating a virtual integrating layer becomes the bottleneck during which no external integration rules or changes in underlying data sources are considered. Everything is put on hold until the next integration cycle.

Three obstacles to dynamic data integration are as follows:
1. The Tools: Current data modeling technologies, which are the tools used to solve integration problems, are static. Adding a new relation triggers a schema re-design in the relational model and a similar effect takes place in the object oriented model. On top of that, a parser engine-like approach which acts as the virtual integration layer locks in the logic linking data items from underlying data sources rendering it static as well. This creates a compound stagnant effect, as it not only locks the logic in the parser; it also mandates that the underlying data sources must remain static as well. This multifaceted static nature of current integration approaches, i.e. a static virtual integration layer depending on static underlying data sources—renders a fragile and inflexible solution.
2. The Expertise: The process of schema redesign mandates a restricted number of participants. During an exercise to update a schema, expertise is restricted to only a few available participants who have expert knowledge of the field and the data modeling tools. Similarly, the process of creating a virtual integration layer is limited by a small number of participating experts to produce a single snapshot. This static design methodology only captures the experience of a few at a point in time.
3. The Logic: Integrating data items is based on logic to relate those items to one another. The relating logic varies depending on some similarity factor like complexity or dimensionality. In dimensionality, like data items are those that share in space, in time, or in an experiment, . . . etc. In complexity, like data items are those that share similarity resulting from a search, say a Blast search (a function that matches, identifying a relation, the input of a gene sub-string to which gene in the human map), or after running a data mining function which is the result of a more complex function. Such similarity can be based on one or a series of functions leading to the complex logic.

Data integration (DI) is an example that highlights the severity of the problem at hand. The use of static tools across all information categories limits the ability to identify or tackle a practical and timely solution. A large number of disciplines that need to deal with legacy data face data integration and data access challenges, biotechnology is just one example.

Integration—Beyond Data:

Integration may alternatively be viewed as creating a model to represent a real life scenario as a mathematical/software modeling. Modeling involves capturing the relationships and interactions among different elements from real life into a model. Data modeling, like schema design, is a snapshot in time. The art of modeling is therefore the art of successfully identifying and selecting those elements that affect the environment under study, the relationships among those elements, and determining which elements are to remain constant in the environment. Modeling is about fixing parameters—which elements will be changing, possible changes for each element, and which elements will remain static. For example, in modeling traffic flow of cars in a city center, one may fix the car width, number of lanes per street depending on the total width of existing streets. On the other hand, the timing of green lights, and the flow rate of cars, may be kept variable to experiment with the model-optimizing parameters like green light duration. Hence changing a fixed element or introducing new variables in a model will result in a re-design. Models are created following the static approach as is in a data model.

Mathematical modeling usually focuses more closely on the relationships in a model and rules of interaction among elements in a model. These aspects may be captured in a function to mimic and govern the interaction. However, functions in a model still rely on data sources to simulate the targeted environment. Hence, the same inflexibility problems as discussed earlier in prior art make it difficult to deal with redesigns that require a change in the model.

SUMMARY OF THE INVENTION

This invention relates generally to the field of information management targeting non-technical end-users to dynamically, collaboratively and securely manage relations on-the-fly (i.e. dynamically manipulate without a priori design knowledge) across all information items, and more particularly, to manage data and functions internally and from external sources to obtain results which are user managed as well.

In an information system, two categories are widely mentioned, data and information and sometimes the distinction is blurred. In this invention, information encompasses data as one of its categories in the information spectrum. Information categories are best described to include data, functions (+stored queries), and results. The term "category" is used to identify a group of information items requiring a distinct way of handling, as how they are stored, accessed and retrieved. The data category plays a major role affecting the whole information spectrum which is conventionally known as database management systems (DBMS).

Other categories exist like stored queries, storing SQL statements, that is, information categories are not only limited to data, function, stored queries, and results. The difference between stored queries and functions is important as a category, the way a group of items are stored, retrieved, and manipulated, see function category for discussion. However, data, functions, stored queries, and results together are best referred to as a software system or application.

Embodiments of the present invention address the inflexibility of prior art software systems by providing a method for dynamically and contextually managing information in an electronic computational environment. In one embodiment, a desired project provides a context for management of a plurality of information elements, each element being in at least one of a plurality of categories.

Each category in turn is a member of a category set, and the category set includes data category, function category, and result category. The context corresponds to at least one model that is defined by the elements and a set of rules governing permissible relationships among the elements. The method includes: receiving an input to the environment specifying a relationship among at least two information elements; using an integrity engine, operating to enforce such rules, to verify dynamically correctness of the relationship specified; and upon acceptance of the relation by the integrity engine, storing automatically the relationship specified, so as to permit dynamic interaction with respect to the context. In this method, the relation can be specified and implemented on the fly, without a preconceived design process. In a related embodiment, the computational environment is multi-user, so that a plurality of users may collaborate with respect to a project, resulting in a collaboration in which the information elements may be integrated dynamically without a pre-conceived design. With collaboration, a tracking system of who did what when and a set of policies and procedures protecting and facilitating users interacting in such a community becomes essential. Thus other technical requirements like tracking or policies and procedures for different users are not discussed in existing DBMS while they are dealt with in a dynamic model as discussed here.

In an additional related embodiment, the information relates to a plurality of projects, with each project providing a distinct context. The method of this embodiment includes: storing a table listing the contexts; and for each context, storing an information element table pertinent to an information category in the context, the table listing information elements that are present, in the information category, in the context.

Related systems are also provided.

Use of the integrity engine in this manner means that the method and system need no longer depend—as is required in the prior art—on manual processes, implemented by database designers or domain experts, to modify the model (The use of an integrity engine here differentiates these embodiments from XML, which lacks an integrity engine and is not a database model but rather a markup language for storing data.)

The growth of dynamic disciplines, like biotech as an example, has caused a demand for dynamic information management to rise sharply. Dynamic information management, regardless of the information category involved, poses at best three main challenges:
1. Dynamic information models to deal with continuous change.
2. End-user access leading to collaboration, information discovery and new ways of information access
3. An integrity engine to maintain policies and procedures as well as a tracking mechanism.

Separating the integration logic is key for users to understand the rationale behind why a similarity exists and for allowing users to change or test the correctness of the logic keeping the model agile to change.

BRIEF DESCRIPTION OF THE DRAWINGS

The foregoing aspects of the invention will be more readily understood by reference to the following detailed description, taken with the accompanying drawings, in which:

FIG. 1 is a table showing components of the DiBase™ system in accordance with an embodiment of the present invention. The table represents the master table that manages all other tables in the system with all its contexts, where each context represents different information categories. Each row/line in the master table represents a context that the integrity engines are to be applied upon.

FIG. 2 and FIG. 3 are representations showing the structure of tables Schema X and Relation X respectively, which are pertinent to a context X, in the system of FIG. 1;

FIG. 4 is a representation showing structure of table Function X for storing, searching and managing functions and data-flow-paths in FunBase, which is pertinent to context X, in the system of FIG. 1.

FIG. 5 is a representation showing the structure of table Result X for storing results and all information items leading to the creation of that result, which is pertinent to context X, in the system of FIG. 1.

FIG. 6 is a table representation for each attribute which is a row in the system of FIG. 2, for which a structure of table Tb_SCh_REl_name stores all relation names and corresponding attribute names for which the attribute row of FIG. 2 is part of. This table is used by functionalities like the integrity engine.

FIG. 9 is a representation showing the structure of table Tb_Rel_Fun_Customer for storing all function names that have a dependency on a relation R in a context X storing all function names, version numbers, and all attributes used by each function from the referenced relation R which is a row in the system of FIG. 3. This is used by functionalities like integrity constraints alerting to changes in relations in the database that have functional dependencies or deleting/altering functions in the result model—FunBase.

FIG. 10 is a representation showing the structure of table Tb_Rel_Sub_Customer for storing all sub-table names and corresponding storage location of each table. This table is created for each relation table, which is a row per the representation in FIG. 3, when segmented horizontally to two or more tables for reasons like performance or scalability to keep track of the actual data storage locations of the sub-tables.

FIG. 11 is a representation showing the structure of table Tb_Rel_ATT_Customer for storing all attribute information found in a relation as it appears for every single row as represented in FIG. 3. Attribute information include name, user id who created the attribute, role in the relation such as primary key, descriptor attribute or other, tracking, etc.

Figures 12, 13:
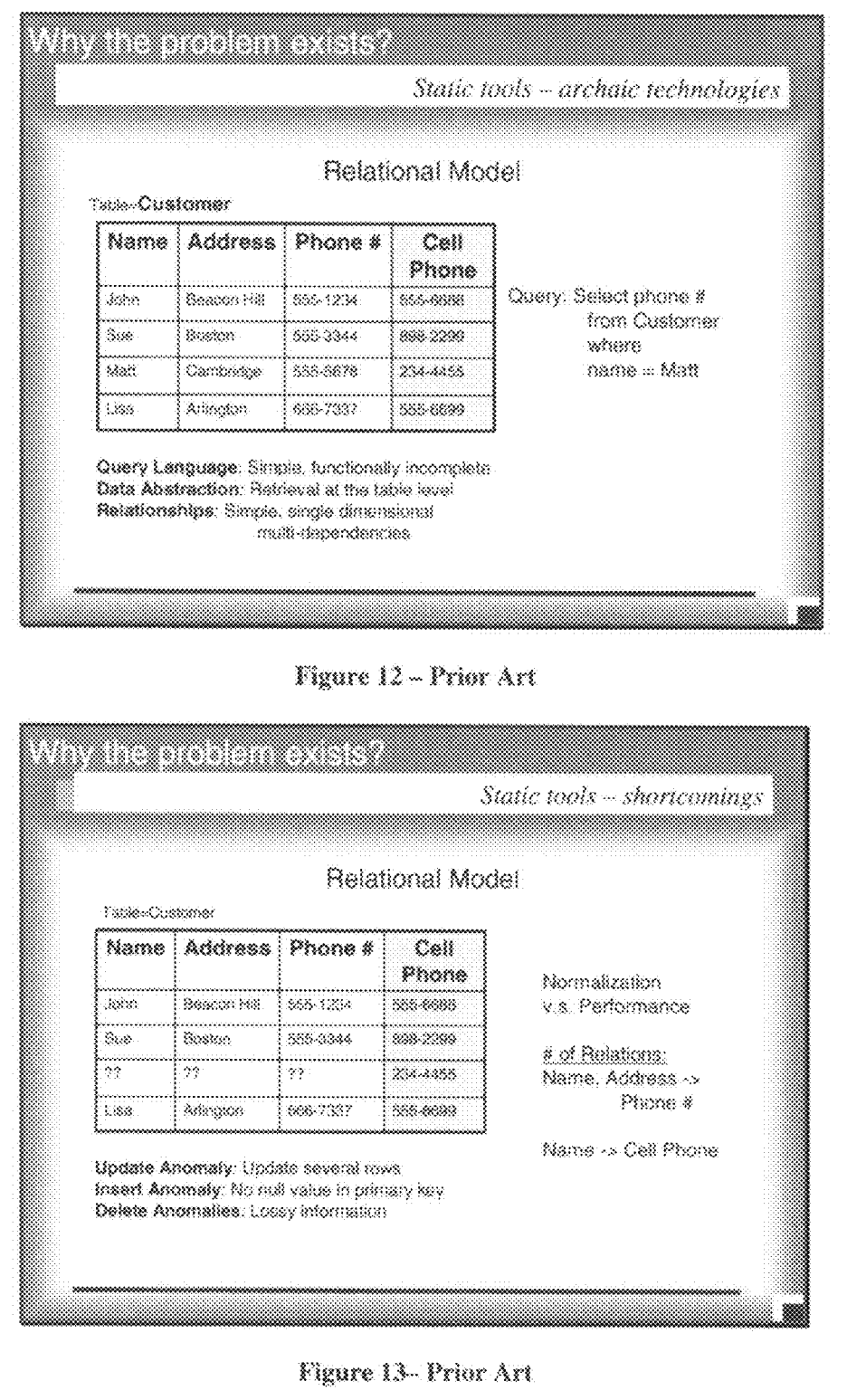

FIG. 12 is a representation showing the structure of table Customer as an example illustrating limitations in the relational model for storing data. This example represents effect of adding a column like Cell_Phone to an existing relation creating a multiple dependencies that leads to a lossy information due to insert and delete anomalies.

FIG. 13 is a representation showing the structure of table Customer as an example of limitations in the relational model for storing data. This figure shows the case, of delete anomaly that the cell phone number will be lost in case of a person's moving out, that is a case of delete and not update of address field.

FIG. 14 is a representation showing the splitting of table Customer11 into two tables Customer12 and Customer13. This split leaves table Customer13 as an example of correctly storing data creating a single dependency in a relation among data attributes such as name and cell_phone.

FIG. 15 is a representation showing the splitting of table Customer11 into three tables Customer12, Customer13, and Customer14. This split displays examples of correctly storing data creating single dependencies among all data attributes in a data model eliminating integrity constraint violations leading to a lossless database. This figure shows how a single table Customer11 needs to be replaced by the three other relations of Customer12/13/14 to maintain a lossless data model.

FIG. 16 is a representation of the limitations in the object-oriented data model where changes in data are more difficult to achieve because of data encapsulation by a non-standard access method which is the messages. These messages add another level of brittleness to access or change data.

FIG. 17 represents the typical life cycle of a relational database model adapting to changes in business requirements. Each change requiring an addition of one or more relations typically triggering a schema redesign process.

FIGS. 42A through 42E collectively represent a sample view of an XML file that captures schema definitions for externally remote databases. This XML file is used by an FTP upload engine to upload database definitions, schema, and data into SeBase. The FTP upload engine acts as a function in FunBase. Once relations and data are uploaded into Sebase, dynamic joins with other relations within SeBase are possible to be conducted on-the-fly. The simplicity of the XML format allows users to easily update the file for changes in schema definitions of the remote database. The current view represents a relational database schema; however similar mechanism could be used for ontology, object-oriented database, or other storage models.

DETAILED DESCRIPTION OF SPECIFIC EMBODIMENTS

To better understand the subtlety of the invention, let's discuss basic concepts. Our understanding of information versus data is important: a data item becomes information when put in a context for a need. For example a traveler asks an airline ticket agent: "When is the next flight to Dallas?" The airline agent answers "5:25". To clarify, 5:25 becomes information and not data because it was used in a context satisfying a need requiring no more processing. Here, the context is a set of variables (i.e. attributes) like:

Start location as airport terminal or gate
Time of day—morning or afternoon, etc.
Airline carrier
Routing method—direct non-stop.

Such context was assumed by all parties, the traveler and the airline agent, during their interaction.

Every attribute in a context plays a role in affecting other attributes and the result obtained. An attribute adds a dimension to the context space. In the ticketing example, attributes carrier and routing method can limit the outcome significantly. To design a model to operate and manage information items, the context is best thought of as the model to represent different information categories.

A contextual model allows change to take place over an attribute dimension. In the ticketing example, the next flight to Dallas depends on the time of day and the location that are in the context. Thus the assumed context in this example is dynamic. Embodiments of the present invention may handle contexts that are dynamic.

Figures 7, 8:
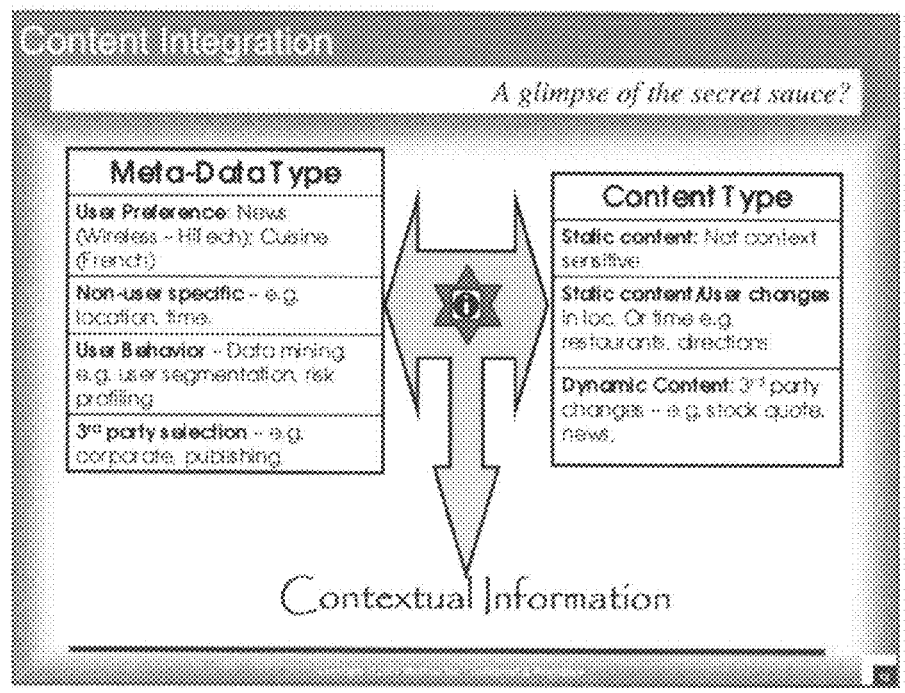
FIG. 7, taken from the provisional application incorporated by reference in the parent of the present application, is a diagram wherein there are shown different types of information elements, which in the Figure are called "Meta-Data Type", as well as different types of information content in a context that is being modeled by embodiments of the present invention.
FIG. 8 taken from the "DiBase™ Application and function Installation Manual," filed with the present application, shows a screen shot pertinent to modifying a checked-in function in FunBase. Pending access rights and integrity constraint rules, authors and others can modify existing functions. In this figure, the name of the function being modified is "SeBase_Upload". This particular function takes the output of any other referenced function properly formatted and uploads the output to SeBase. Once the SeBase_Upload function output has been stored in SeBase, these results are referenced and can be traced in SeBase tables as shown in FIG. 28.

In FIG. 7, there are shown different types of information elements, which in the Figure are called "Meta-Data Type". In the ticketing example, the time of day and location, which depend on context, are shown as "Non-user specific" attributes in FIG. 7 (second row on the left side) that affect the context dynamically. Similarly, user preferences, such as for news sources or for kinds of cuisine, shown in the first row on the left side, will vary according to the user, and when the context is with respect to the user, the context will necessary vary according to who the user is. Similarly, other attributes shown on the left side of the FIG. 7 can cause the context to be changed dynamically.

As a further example, let's take a room in an office. The space attribute identifies the boundaries of the room as the limits of the context for that attribute. A time attribute start time is another limit. An attribute for employees adds a type to exist within the context, such as the people that come and go. In a data model, the contextual data model is different from traditional data models, say relational, in that a schema captures a snapshot in time the relationships among a group of attributes. In the prior art, once a schema is designed—relationships are fixed! With embodiments of the present invention, however, a context allows many users to change. In a room, different people can move different objects independently or collaboratively. The constraints of in the room can be set by the group in place or maybe and outside entity that owns the room. The dynamic nature of the context in embodiments of the present invention is a significant difference over static models.

FIG. 7 also shows (in the right-hand column) that one can handle three different types of information content in a context that is being modeled by embodiments of the present invention. One type of information content, shown in the first row of the second column, is static and is not sensitive to the context as it then exists. A second type of information content, shown in the second row of the second column, while static nature, will change dynamically according to the context. In the ticketing example given previously, the next flight typically varies by the time of day and the location of the user, even though the flight schedule itself may be regarded as fixed. Similarly, the closest available restaurant and directions to it are static information types, but they change according to user location and time of day. A third type of content, shown in the third row of the second column of FIG. 7, is inherently dynamic in nature, such as the latest news and the current stock prices.

Contextual Database Model

A contextual database model is a database model for storing, retrieving, and manipulating of data, modifying of relations, and managing the co-existence of multiple schemas.

In the previous section two main limitations were identified in the relational model:

1. The need to know the table name in order to put or get any data value out of DBMS.
2. A database schema change mandates a complete database schema redesign of the four main steps as shown in FIG. 17.

The basic notion to overcome shortcomings of a static DBMS is to make access to data independent from relations. This allows a user to interact with the system in a manner closer to real life. For example, a user seeking a phone number expects having the persons name is sufficient to get the phone number, only in the real world where context exists. In a conventional DBMS examining posing the question using SQL one needs to fulfill schema related info such as:

Select <what you need to get> from <within a specific table> where <this is what I know>. This instantiates the query to be as in FIG. 12: Select phone# from Customer where name=Matt. How would this convert to the contextual model? Let's assume that table Customer in FIG. 12 is part of a schema of a telecom's database. An end-user would call an operator in a telecom company and ask for Matt's phone number without the need to have a priori knowledge of where such information is stored. This is the need of separating the data from the relations. Once data is separated and placed within a context, end-users will be able access data values without the need of a priori knowledge of the storage structure. By calling an operator in the telecom company, the user instantiated the context as the operator replaces the need for a table name and provides the phone number given a customer name.

Figure 18:
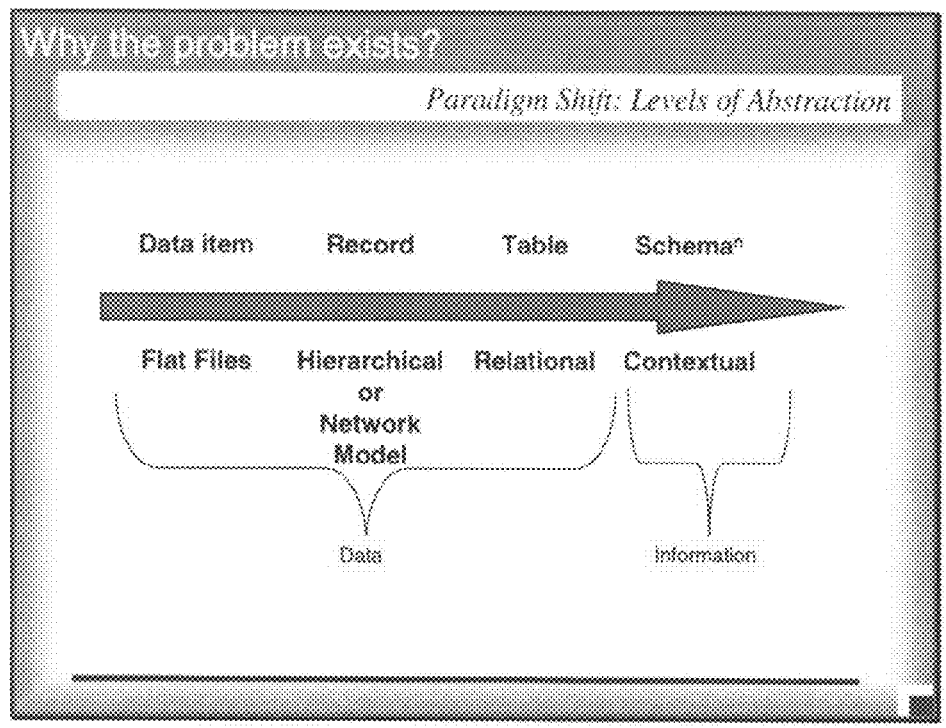
FIG. 18 represents the evolution of models of data storage. Below the arrow is the name of each storage model used and above the arrow is the corresponding data item required as a prerequisite for accessing data from the storage model. For example in the relational model the table name is mandatory to be known to access data from an underlying relation. In the contextual data model, users need not know anything about the underlying data model to retrieve data, a user only need the context in which the data is expected to exist—leading to the information level.

This invention brings a major change in how data storage and access is conducted. In FIG. 18, we see the progression of the different data models below the arrow and data structure needed to manipulate data above the arrow. In the hierarchical model, the actual hardware location of the record was need. In the relational model, the exact name of the table containing the attributes is needed. In the contextual model, a user needs to know the context, which has a structure will call schema″, in which data is stored. (As used here the term "schema″" has a generalized meaning; this concept is distinct from the usage below of "Schema X" to refer to a table that is a companion to the table called "RelationX"; together Schema X and Relation X form a schema″ for the context X.) When a system happens to operate in more than one context, we use the term schema$^N$ to refer to the schema″ for the collection of all of the contexts. The concept of schema$^N$ is quite different from our current understanding of what a schema is in a relational model in the following aspects:

| Schema$^N$ | Schema |
|---|---|
| Dynamically changes over time via user input or via external developments, like passage of time. Keeps up with the change in business requirements allowing different views to co-exist in sub-schema″s. | Is static, any change will require a schema redesign. Captures a snapshot in time representation of a business requirement. |
| End-users in different geographic locations at different time intervals, as permitted by security and access rights, can change the schema″s | Change process: Is controlled by a few usually in the same proximity and all change requests must be funneled through technical experts. |
| Multiple schema″s can co-exist at the same time within schema$^N$ and context to be selected by the user. | Only one schema is accessible at any point in time. The user has no choice. |
| Tables within a schema$^N$ or schema″ are loosely coupled and can exist over multiple hardware boxed permitting scalability. For performance reasons, administrators move tables or parts of large tables to other | A schema can exist on one hardware configuration. For a schema to exist on more than one hardware configuration, extensions to the data model like segmentation and distributed methodologies need to be applied |

-continued

Figure 26:
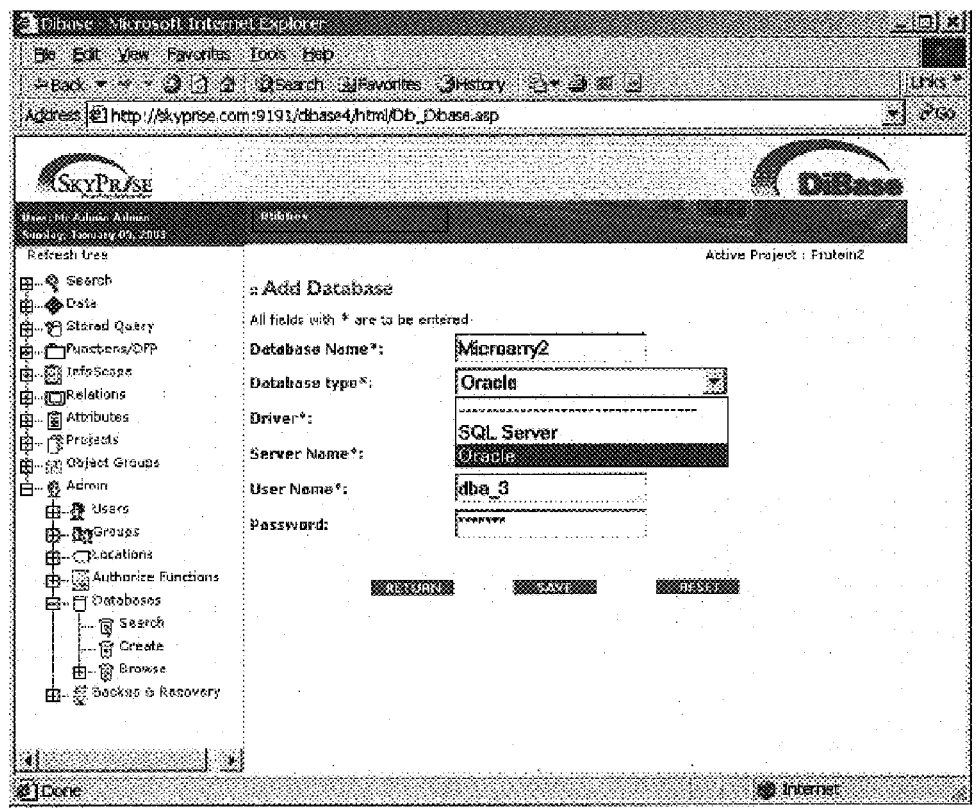
FIG. 26 represents a DiBase™ screen shot in the admin area for creating new storage area this is based on an existing relational data model application. In this case the relational data model will be used as a dumping storage area like a file system. No schema will exist in the underlying relational data model. This is used as an option for extending or connecting external relational databases to be accessible from within DiBase™, or to use commercial branded relational applications such as Oracle or MSsql for marketing reasons.

| Schema$^N$ | Schema |
|---|---|
| hardware configurations transparently from the user to reduce data throughput thrashing increasing performance. See FIG. 23, a user, with correct permission, selects to store relations on different boxes (identified as DB for user simplicity) from a drop down menu. In FIG. 24, an administrator adds a new DB to the system to quickly expand and scale the system dynamically. A DBA can also connect an external conventional DB, see FIG. 26 as a new context. | which are time consuming and require design and setup time. Connecting external DB is not feasible; a total integration effort is required. |
| Users can discover relations and new attributes by selecting an attribute or more of interest and request the list of relations that match exactly, any match, or partial match, see FIG. 22. | User must have a priori knowledge of the schema to access data. The interfacing query language does not allow navigation or discovery of the underlying schema. A user cannot query: "List all relations that contain the attribute "x"?" |
| In a collaborative environment, it is important to allow users to enforce policies and procedures on their work of art. From the attribute up to the context level, users can assign access rights of various degrees, see FIG. 32 for attributes, FIG. 20 for projects, and FIG. 21 for relations. | Usually and an administrator needs to create a view (a collection of tables) in the relational model to restrict access to certain users. Users can't restrict or assign access rights on their own work on-the-fly. |
| In a collaborative dynamic environment, it becomes critical to have meta-data about every element in the data model. See FIG. 19 for an attribute as an example. Fields like description and reason are provided to the users to add and increment comments. The system time stamps every comment and keeps them in a journal log like manner. Policies and procedures can be enforced on user access pending given rights, see FIG. 20 as an example for user rights at the project level. | Users must have complete understanding of the data model prior to usage. No room to add or view comments, let alone increment them. All users of the system require training and understanding of the system.<br><br>Users don't have access to a DBMS, only DBA's. |

Hence, schema″ elevates the user from the table level to a contextual level reducing one more level of design level information needed for input. With schema″, a user can have more than one schema″ to co-exist at the same time.

For example, users within a certain context like in a telecommunication company and work in customer service, or operation, or accounting can have the different schema″ one for corporate billing another for switching systems and communication network. Users who have more than one role will have the right to access the needed schema″'s existing within a single software system yet maintaining separate boundaries, i.e. contexts. This allows different conflicting view to co-exist in different schema″ while integration between agreeing parts takes place.

Figure 44:
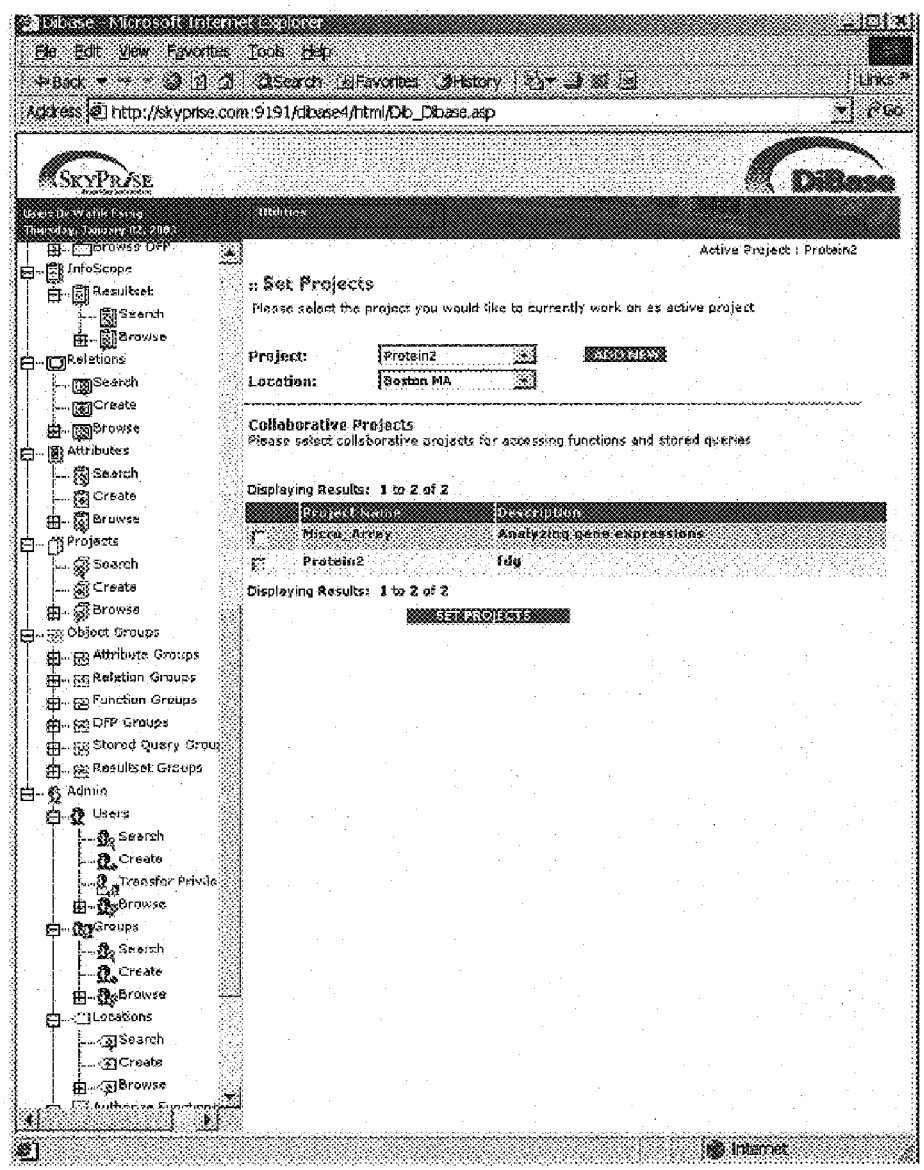
FIG. 44 represents a DiBase™ screen shot displaying the grouping functionality of information elements as displayed in the tree on the left-hand which is the left frame. All information elements can be grouped representing knowledge as user desires to classify, organize, manage, or file elements according to organizational needs.

In FIG. 18, the contextual model removes the user from the table level to a schema″ level unlocking the scope from table level in relational databases to schema″ level in the contextual model where all attributes are available. With this, the contextual model separates data from relation placing the system at an information level and not at a data level. This allows the data model to be dynamic; users can insert new attributes and relation on-the-fly. When the pool of attributes grows, the concept of grouping comes handy. Users can group a set of attributes related to a concept together. To manage information more efficiently, grouping (see FIG. 44) is used similar to views in the relational model to present a subset of information to a specific user.

How it Works

Embodiments of the present invention store metadata information about attributes and relations in separate tables, see FIGS. 2 and 3, Schema X and Relation X correspondingly, where "X" is the name of the context or schema″. Metadata in this case depicts data about how attributes and relations relate to each other and not data describing an individual attribute or relation. (The concept of schema″ is discussed above.) Schema X and Relation X replace the data dictionary in the relational model. In other words, whereas prior art relational databases store attribute and relational information together, forming the schema, in embodiments of the present invention, attribute information and relational information are distinctly identified and stored independently, here as Schema X and Relation X. In particular, when these embodiments of the invention are actually used, the attributes must be created first (and show up as entries in Schema X) before relations among them can be established (and thereby show up as entries in Relation X). Separating attribute definitions from relational definitions enables on-the-fly changing of relations among attributes, a feature that provides unparalleled power to an end user in establishing, modifying, and using structures for managing data. As a consequence of the separation of attribute definitions from relational definitions, it becomes important to impose rules on the creation of relations among attributes to prevent creation of relations that in context are logically impossible, and also to prevent creation of relations that are not desired (such as relations leading to "delete anomalies" and "insert anomalies" as in a relational data model) for the intended use. To impose appropriate rules for a context, we employ, in a manner described in detail below, an integrity engine. Accordingly, embodiments of the invention employ independently stored attribute information and relational information, here as Schema X and Relation X, as well as an integrity engine to enforce rules as to permissible relations among attributes within the context X.

Despite the great power that comes from separating definitions of attributes from definitions of relations among attributes, additional power in managing information can be obtained by attention to further information categories. Attribute and relations among attributes all pertain to an information category that we call "data". Other categories may include functions and results. With respect to functions, we may provide a set of functions applicable to the context X in the form of a table called Function X. When functions in the table Function X are used, the manner of their use may be specified in a data flow path, or "workflow". The data flow paths may themselves be inventoried in a table. An additional integrity engine is used here to enforce rules as to functions, and relations among them, in a data flow path, that are deemed permissible in the context X.

Figure 27:
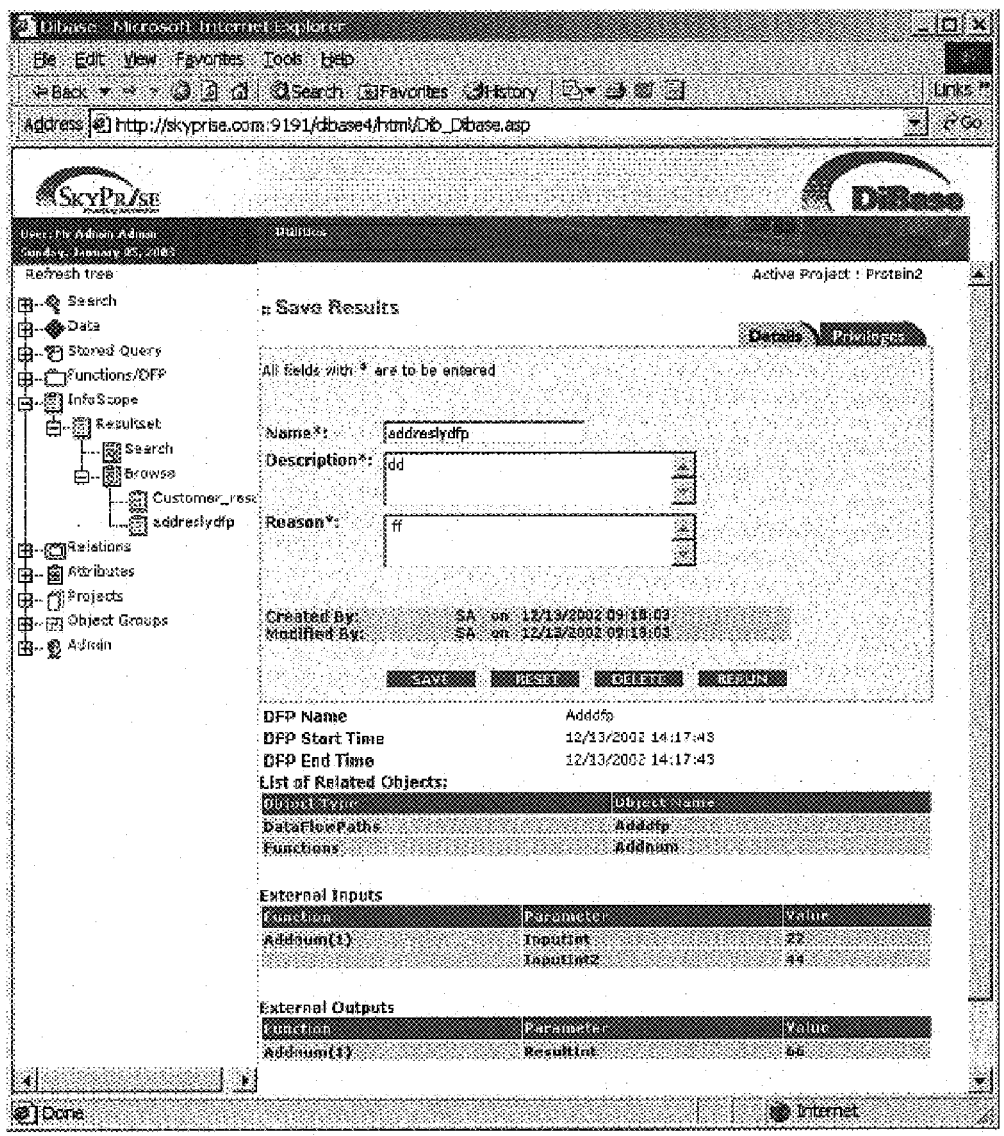
FIG. 27 represents a DiBase™ screen shot in the result model, InfoScope. Displays parameters of a saved result with which data-flow-path (DFP) used, functions within the DFP, relations and attributes if exists, input parameters to each function, and the output results. Users can re-run that result, by selecting the rerun button, and change one or more input parameters for "what-if" analysis.

Similarly, with respect to the information category "results", we may provide a table called Result X, that stores for the context X, for each result obtained, the data flow path used, input parameters for each function in the data flow path, the data sets used, and the result itself. Yet another integrity engine is used here to enforce rules as to permissible syntax for naming results and permissible links to stored results (see FIGS. 27 and 29).

Accordingly, for each of the information categories, namely data, function, and result, we may utilize tables pertinent to the categories in the context X along with the integrity engine to enforce rules also pertinent to category in the context X. In addition, an integrity engine operates on a global level to supervise the interaction among categories.

An embodiment of a system in accordance with the present invention has been achieved in software called DiBase™ (Dynamic-Integration-Base). The DiBase™ implementation has modules that deal with each of the information categories described above. For the data category, the module SeBase includes tables SchemaX and RelationX; for the function category, the module FunBase includes table FunctionX; for the result category, the module InfoScope includes table ResultX. As described above, an integrity engine in DiBase™ assures internal consistency of information used by each module and across modules.

A number of ways to interact with the system can be by using SQL query like statements, simplifying the transition for programmers, though the concepts are not limited to the SQL query language limitations or its functional incompleteness. Or through a graphical interface addressing end-user needs, see FIG. 31.

After describing the two metadata tables, Schema and Relation, in SeBase, we will describe the implementations of FunBase (and the table FunctionX), of InfoScope (and the table ResultX), and then of the integrity engine. We conclude with a more general discussion about information integration achieved with implementations such as DiBase™.

Schema X

Figure 37:
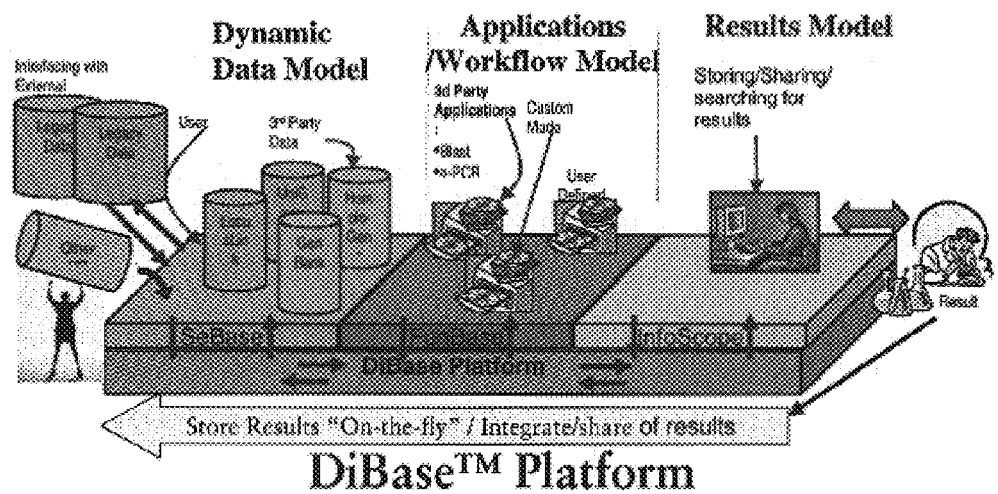
FIG. 37 represents a pictorial description of DiBase™ platform with its three main modules: SeBase, FunBase, and InfoScope each represent a model for the corresponding information element type. SeBase is a dynamic data model, FunBase a dynamic Function model, and InfoScope is a dynamic result model. All three modules are encompassed under the DiBase™ model managing the integration, interchange, tracking, sharing of information elements.
Figure 38:
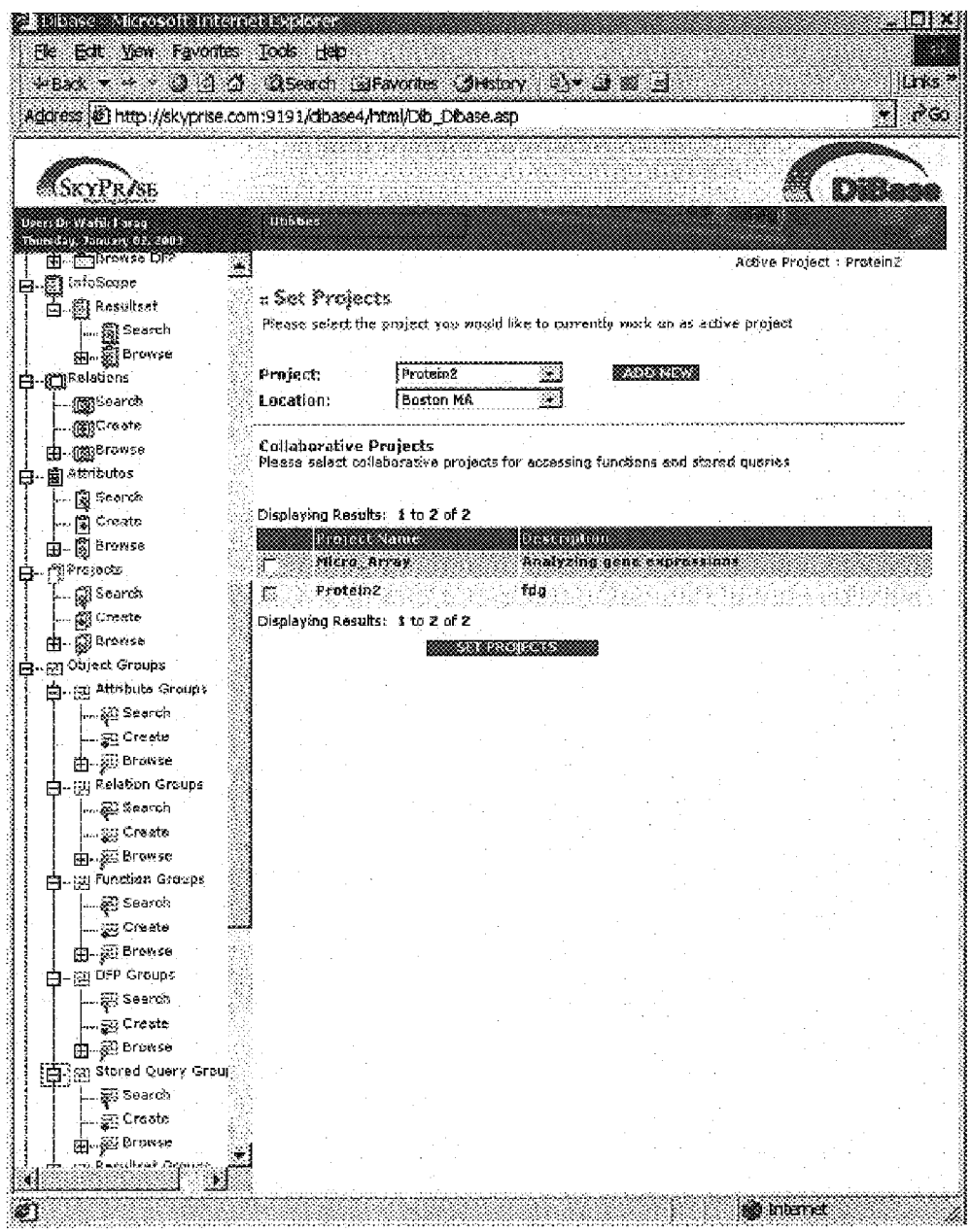
FIG. 38 represents a DiBase™ screen shot for selecting or creating a project. This is the entry screen for a user to select which project (i.e. context) they want to interact and work in. The user can select only one active project at any one point in time. The user can also select collaborative projects to retrieve and integrate information from within the active project context. A collaborative project allows users to carry operations like information retrieval and data insertion—no creation of new relations or dynamic change in the underlying model of a collaborative project is permissible. The project location can be used to enforce integrity rules like access to site licenses of applications in FunBase.

FIG. 2 describes an implementation of attributes and their roles in a contextual model. In the DiBase™ implementation of Schema X, a cell within a row has a one-to-many relation to the primary key of that row. The cell value becomes a pointer to a table, Tb_<Table-name_Attribute-name_row-primary-key-value>, where row in the sub table is one of the many values that relate to the one primary key of the parent table row. This allows ease of scalability, though other approaches work better in other cases, see column 15 under Relation X in FIG. 3. The DiBase™ implementation utilizes three different modules, and each module corresponds to an information category. Thus each data category is handled by the Sebase module; each function category is handled by the FunBase module; and each results category is handled by the InfoScope module. These modules are illustrated schematically in FIG. 37. A description of some of the functionality used in the FunBase module appears in Wafik Farag, Toby J. Teorey: FunBase: A Function-based Information Management System, CIKM 1993: 507-515. The FunBase and InfoScope modules are based on work described in W. Farag: An Information Management System: A Three Layered Approach (1995), Thesis (Ph.D.), University Microfilms, Ann Arbor, Mich.

This facilitates referencing to the different information categories.

In the DiBase™ implementation, each of these modules has its own local integrity engine and there is also a system-level integrity engine to ensure global integrity of the information structure.

Column 2-1, Schema ID, is a unique id to reference the attribute name for storage considerations.

Column 2-2, Attribute name, has an entry for every single attribute in a schema. The attribute name needs to be unique supporting attribute integrity checks for unique attribute naming within a context.

Figure 19:
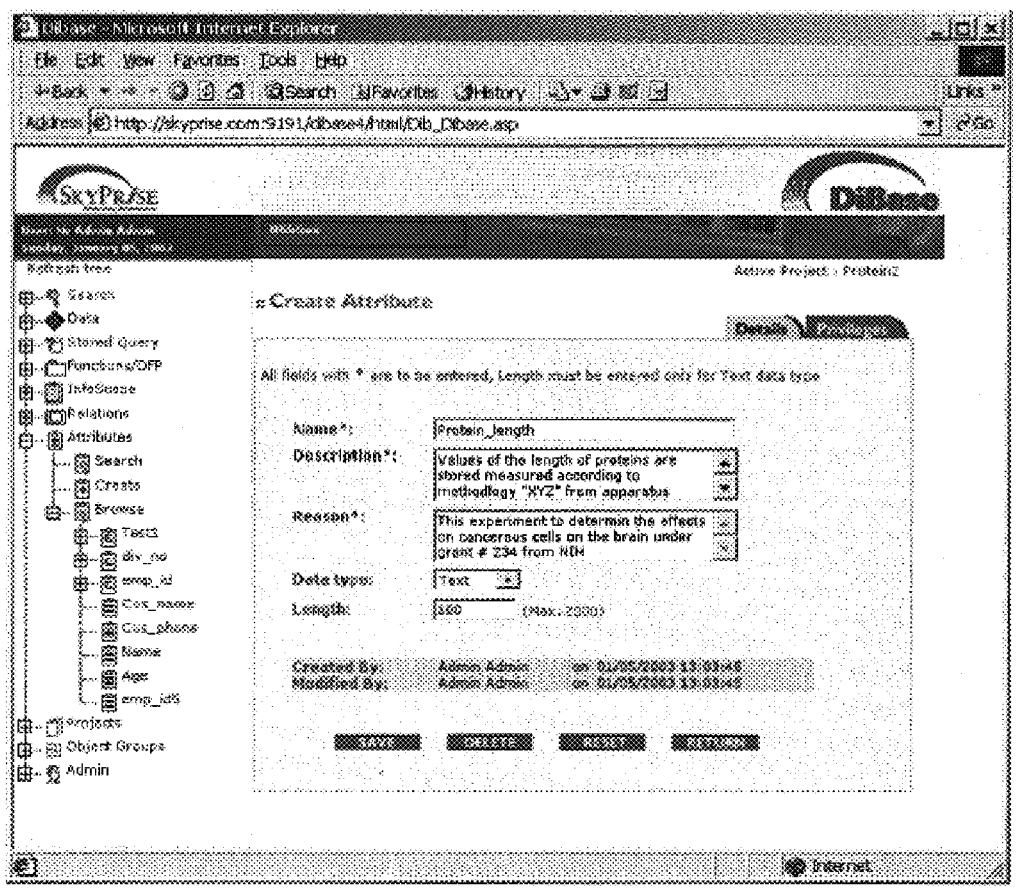
FIG. 19 represents a screen from the DiBase™ system in the Sebase module as used by an end-user during creating a new attribute on-the-fly. This screen shot represents the view of an attribute once it is stored within SeBase, where the attribute details and reasons are displayed together with tracking of user id and timestamps.
Figure 20:
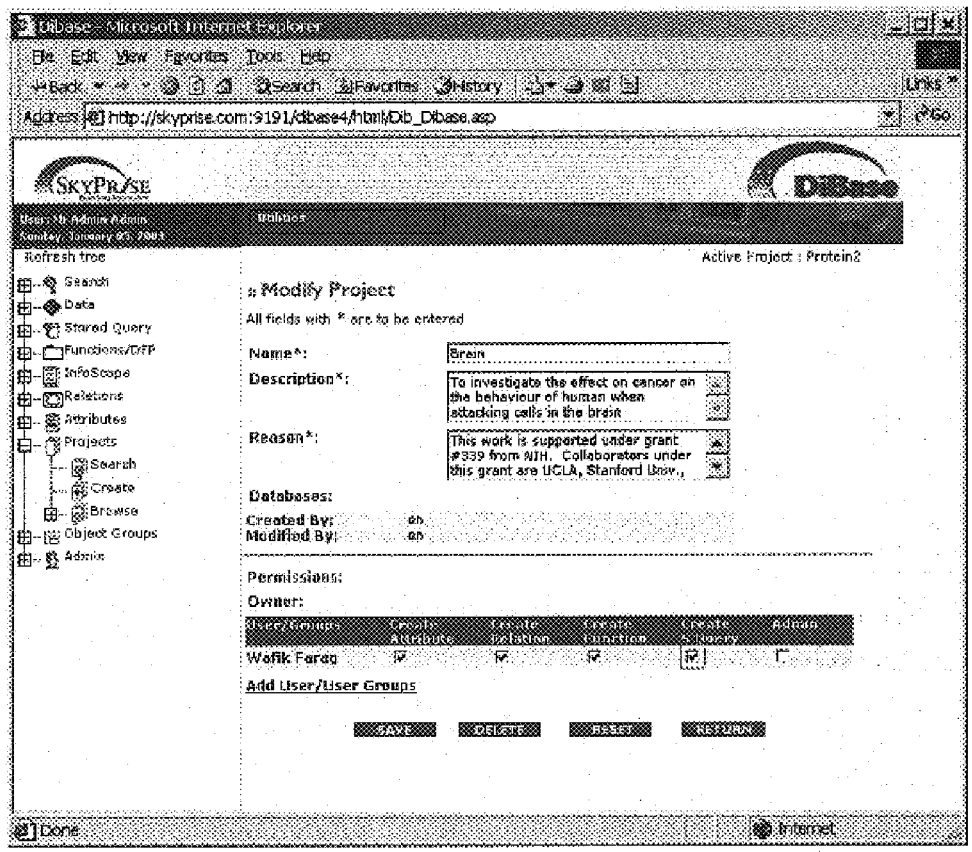
FIG. 20 represents a DiBase™ screen shot in the project creation/modification engine. A project X in DiBase™ is an implementation corresponding to a context X concept. The Figure shows security access and levels of access to other users. Description and reason are a sample of the metadata space holders for storing user input about the project.

Column 2-3, Type, captures the data type of the attribute used for table creation, see FIG. 19.

Column 2-4, User ID, captures the user id that created that attribute. Used for access rights and propagation authority. For example a user could create an attribute and makes it completely hidden from all other database users pending enforced system policies, see FIG. 32.

Column 2-5 and 2-6, Date and Time, the temporal data for attribute creation (i.e. contextual metadata), see FIG. 19.

Column 2-7, Location, captures the location of the attribute when entered. For example, in a biotech experiment, the lab location could have an effect on the experiment, this is an example of contextual information that is captured by the system and is optional. Other contextual attributes could also be added or deleted from the Schema X table. See FIG. 33 at logon screen.

Column 2-8, Assess rights, this attribute plays a role of governing the creation accessibility and integrity of the system. For example, a user would want to store the output of a lab experiment into SeBase to run some data mining functionality leveraging the work of other colleagues like searching for similarities. However, the attributes and the data entered into the databases might not be correct or "cleaned" yet for use by other users on the system. Once a researcher deems the integrity of the experiment data and is approved by a lab supervisor, or according to an approval process, the accessibility could be escalated to the group level, lab level, enterprise level, or world. This allows users to interact with SeBase instead of other storage mediums like flat files of excel spreadsheets which are external and not integrated with the rest of the information platform. This eliminates long design and revalidation periods while allowing immediate access to other researchers once made accessible.

Similarly, a researcher could allow access to certain individuals in other labs for collaboration purposes without affecting the integrity of the over all system. Another way is to store those result in a new context, as a new schema", all together ensuring the new context is separate from the first context.

Column 2-9, Reason, another contextual metadata to capture the mental model or the user who created that attribute to be available to other users. All attribute metadata is available to users of the system by pressing on the metadata button after selecting any data category in the system. This allows new users to the system to navigate and understand the context of the data without the need for a database administrator or a programmer for them to access data within the data model, see FIG. 19.

Column 2-10, Description, is another contextual metadata to capture the definition of the attribute by the creator. For example, attribute "name" identifies names of customers in a telecommunication system. This is a searchable field aiding users to find what they want, see FIG. 19.

Columns 2-11, 2-12, and 2-13, Data Source URL, data source name, and data source function are used to map an attribute from an external source, like another external database in a legacy system or a web site, to an attribute in SeBase. Mapping the attribute could be used as a pointer to the external source's attribute or it could be used to download the data values from that remote attribute. This allows SeBase to sit on top of other external databases regardless of their data model, platform, operating system, etc. and capture new relations between attributes, where a mix of external and internal could co-exist. For example, a customer's credit report retrieved from an external credit report database is used to evaluate customers' profile for buying new products. A new relation, customer_profile, which has customer's name, credit report rating, and customer's buying pattern gives insight of which customers with good credit rating buy products. Capturing such a relation is possible by adding a new attribute to customer_profile relation such as premier_customers attribute. SeBase allows users to capture new relationships quickly and easily without the need to alter models of external data sources. SeBase acts as a relation holder for external sources acting as an integration platform. That is, Sebase could sit on top of existing static relational databases and capture new relationships, as a dynamic database layer, for a static databases or external data sources. The data values of the attributes within those relations will exist in SeBase while all other data values of the underlying legacy database remain as is. This could be used as migration methodology of an archaic schema to a new schema without down time, or as a temporary holder of new relations between schema re-designs of the legacy system.

Another use of column 2-12 is to map external names to an internal naming convention. For example, an attribute is called item_weight and in an external database in France it is referenced as item_poids. The user can enforce that item_weight and item_poids to appear as the same attribute. Column 2-11 has the URL or path to the external database, column 2-12 has the name of the attribute as referenced in the foreign database, and column 2-13 contains the function used to extract the values and integrate them into SeBase. The functions' names stored in column 2-13, are a pointer to an entry in table Function X, see FIG. 4.

Another useful use for columns 2-11, 2-12, and 2-13 is for batch uploading from an external source. For example and output of an experiment is directed into an excel spreadsheet, that flat excel spreadsheet could be used to as an external source input to quickly upload the experiment results into the corresponding database attributes, even if the nomenclature is different.

Column 2-14, Relations, plays a key role in linking what relations does an attribute exist in and in what role, that is as a primary key, a principle attribute, or a descriptive attribute. Values in column 2-14 are pointers to tables. The attribute name is the primary key for Schema X. For example for attribute "name" in Schema X, see FIG. 2, has table Tb_Sch_Rel_name as the table name for all the relations that attribute "name" participates in, "Customer" and "Order", see FIG. 6.

Figure 28:
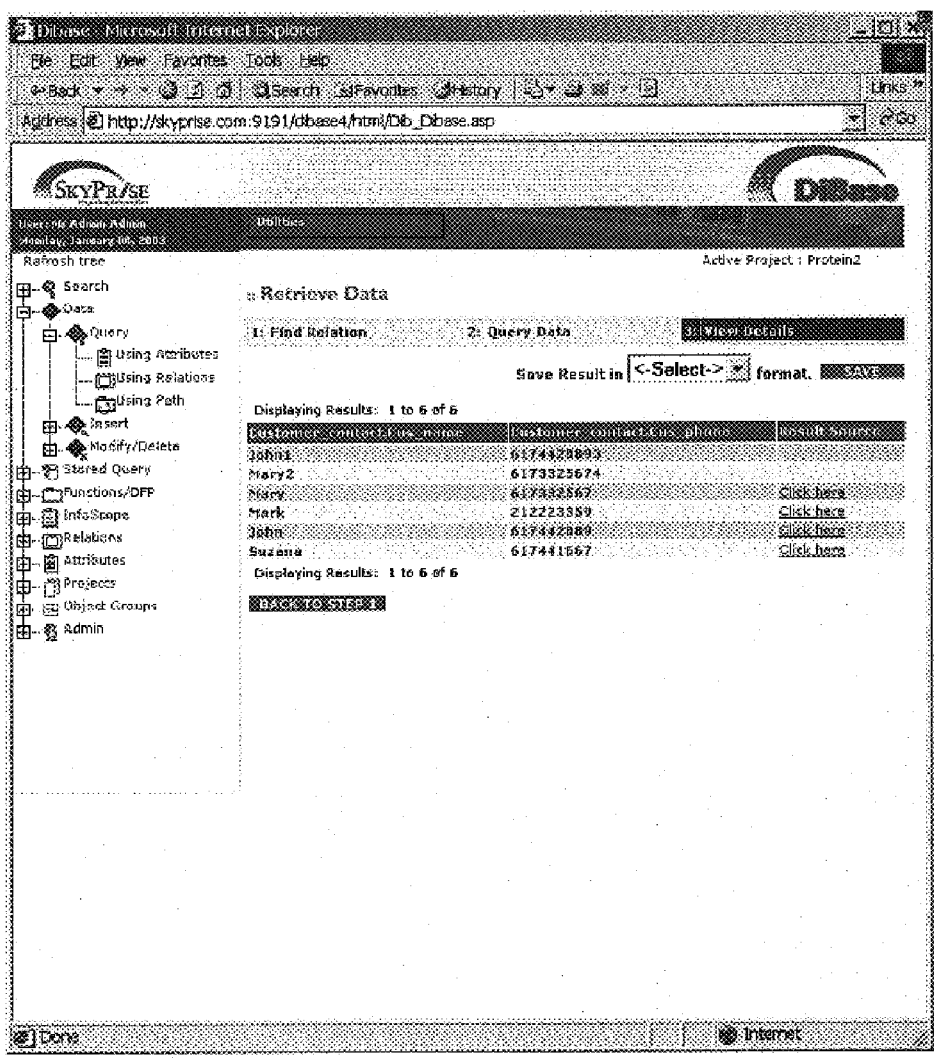
FIG. 28 represents a DiBase™ screen shot in the Sebase module where data is displayed from a query result in which some of the data in the relation are inserted from an output of an InfoScope result. This is identified by the link to each data item in the relation under the result source link. The result source link will display the saved result that created the data in that relation. This is the loop-back where results producing new relations can be stored in the database by creating a new relation on-the-fly and storing these new results dynamically.
Figure 29:
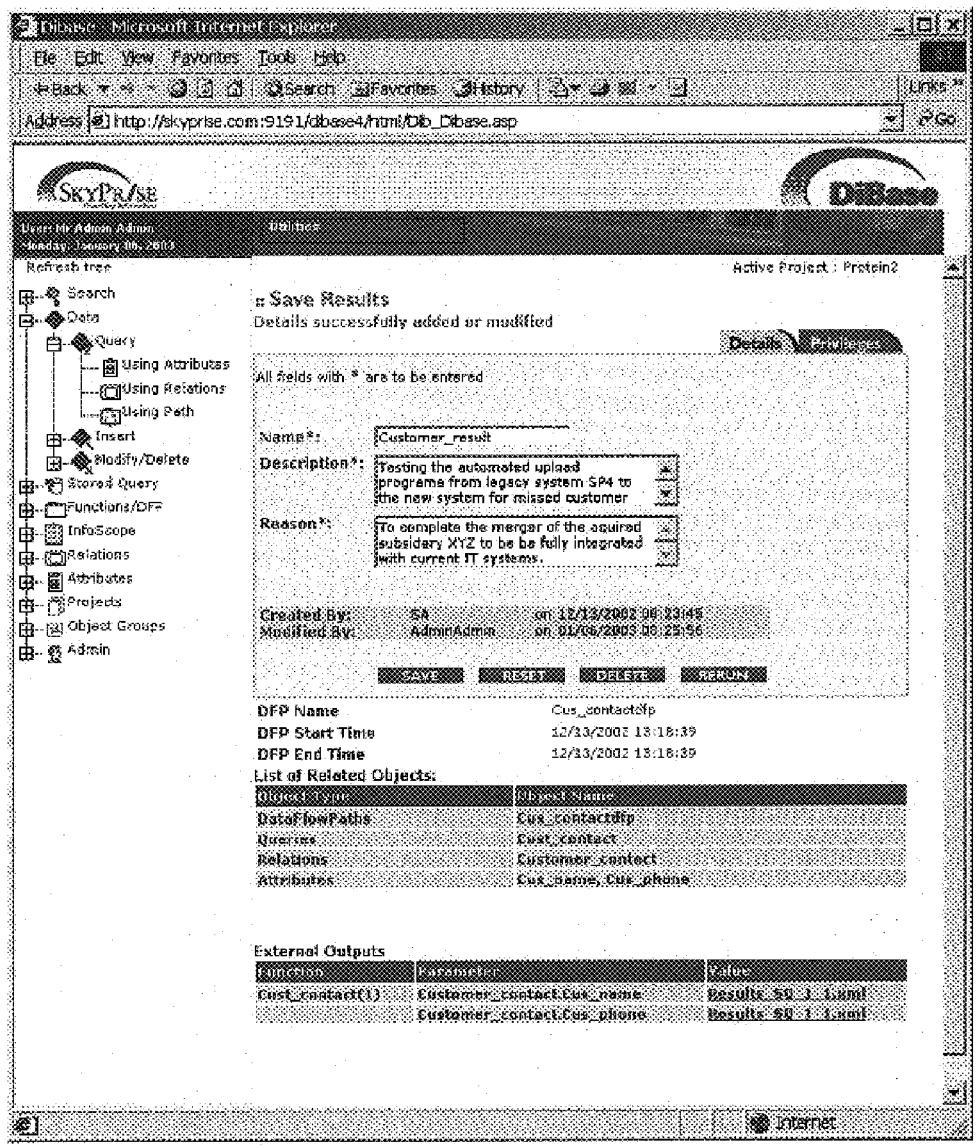
FIG. 29 represents a DiBase™ screen shot in the result model, InfoScope. Displays parameters of a saved result with DFP having no functions, only stored queries and the corresponding relations and attributes used in producing the results obtained. In this case no input parameters were defined in the DFP, only results are displayed.
Figure 30:
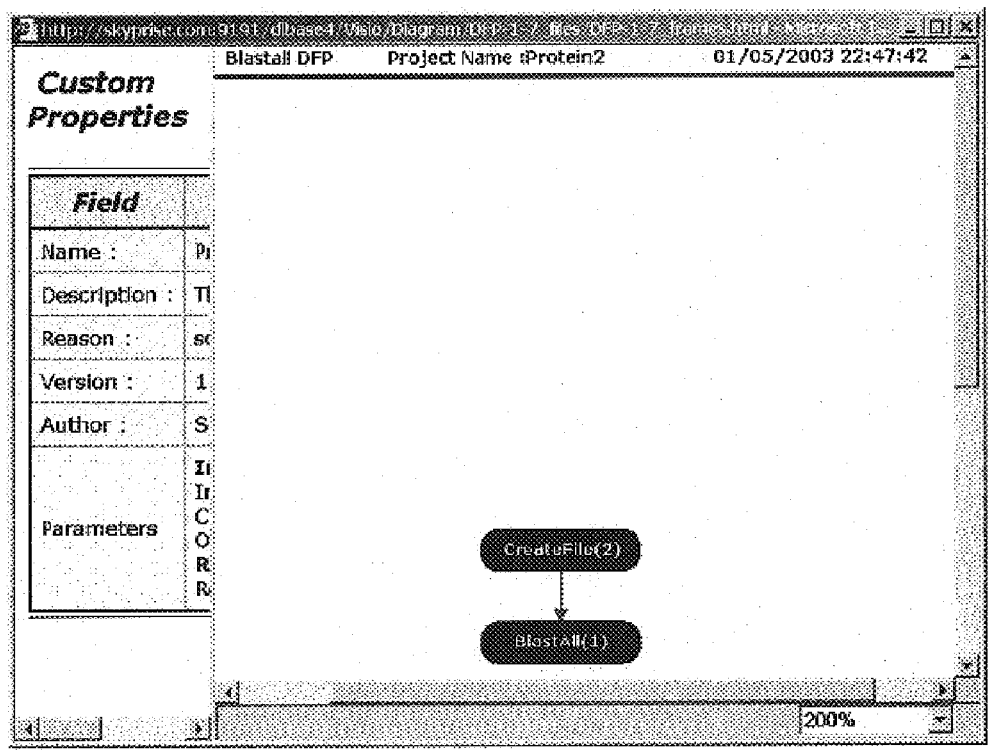
FIG. 30 represents a DiBase™ screen shot in the FunBase module. The figure displays a visual representation of the DFP with each component in the DFP whether it is a stored-query or a function and the connectivity between each successor and its predecessor. The movement of the cursor will change the left view displaying information about the link or function under review.

Column 2-15, Result Tag, links attributes to the result layer, see FIG. 28 and FIG. 29. The values in the Result tag (in the "Result Source" column of FIG. 28) point to (via a hyperlink in the "Result Source" column) the result tag attribute in table Result X, see FIG. 5. This identifies the attributes that participate in a result's "data-flow-path", that is, if a data attribute is part of a data set used by one or more functions or queries to obtain a result it is tagged as such. The source of this attribute is identified and stored in the result layer. Once a user decides to store a result, all data attributes participating are tagged in this column. Of course, if an attribute is used in more than one result, the values of the cell in column 2-15 for that attribute's row will be a pointer to a table, i.e. the one-to-many case as discussed earlier. This is used to capture the relation between a result and the data set used. For example, if a user wants to delete an attribute, DiBase™ will alert the user that a list of result could become non-reproducible. This alert is produced by the DiBase™ integrity engine.

Column 2-16, Triggers, is used to enforce dependencies. For example, adding a new entry in attribute price (see row 5 in FIG. 2) triggers an update in a user profile relation as what price ranges a user needs to be alerted when in effect.

Next the relations' table is discussed followed by scenarios for data and function interaction.

Relation X

In FIG. 3, best describes every attribute and its role as a good implementation for the contextual model.

Column 3-1, Relation ID, is a unique id to reference the relation name for storage considerations.

Column 3-2, Relation name by user, is the name of the relation as given by the user. This allows SeBase to capture a concept in user worldview. For example, in relation customer attributes: name, address, and phone # are needed to identify a customer and not an employee. Naming the relation is placing a contextual cover for the underlying group of attributes in the relation.

Column 3-3, Relation name is automatically generated by system. Some data models restrict relation name to a certain length or format restrictions. In SeBase a user is freed from such restrictions by mapping an internal name of the actual table that will be holding the attribute values. That is, a value in a cell in column 3-3 is a pointer to the actual table that holds the attributes and data values. The relation naming is best represented as an aggregate key. For example, for table "customer", assume that the functional dependency in that table is "name→phone #", that is, phone # depends on name and name is the primary key. Since $5^{th}$ normal form (highest degree of normalization in relational databases) targets binary relationships, Sebase chooses best representation to be in binary form as well. A binary relationship doesn't translate into a relationship between two attributes, but it is a relationship between two groups of attributes. For example, the relationship between "name" and "address" could be: "name→street #, street name, city, state, zip code". Here, the binary relation is between two sets of attributes one of which is composed of four attributes. Other automated relation naming constitutes a numbering system like Relation_1_2_1.

Column 3-4, DB name, the cells, in this column contain the actual database name in which the actual tables together with their attributes and data values are stored. This feature allows the ease of moving one or more tables or parts of tables from one database to another by copying the table into a new database and changing the value of the cell under column 3-4 that corresponds to the relation/table moved. This also allows different tables to co-exist in different database models, or systems, or platforms. For performance enhancement, a heavily used database table could be moved to another database freeing up the throughput and database engine cycles to other tables. This is particularly important for scalability of the contextual database model. Since the model is not restricted by a single schema, a schema" can span over several hardware boxes.

Column 3-5, Functions, the cells contain a pointer to a table listing all functions that access data from the database utilizing the corresponding function. In our "customer" example, two functions could be written: "Get_Phone" which retrieves the phone number for a given name, and "Get_Name" which retrieves a customer name given a phone number. Those two functions depend on the "customer" relationship. Thus in the table "Tb_Rel_Fun_Customer" will have two rows one corresponding to each function. Also, the versions of the function which use such relationship, it might be all the version, but not always. The third column in the sub table "Tb_Rel_Fun_Customer" is a list of the attributes used from the corresponding relation. Let's assume the "customer" relation has three attributes, "name", "address", and "phone #", while the function Get_phone uses attributes "name" and "phone #" only. Then only those attribute id's, in our example 1, 3 will be entered. Another implementation encourages function programming to expose the needed data variables as inputs to the function. Stored queries can than be used to link the data source to the function. This alternate method moves the relation between data and functions to the function layer captured by the DFP which allows collaborative users to benefit more from existing functionality and can change the stored query to point to a data source of their choice. Using the first method, this column is pivotal in supporting the alert features integrity constraints for changes. If a user tries to delete an attribute, which is part of a relation on which a function depends, SeBase will alert the user of a system integrity constraint. Similarly, if a user attempts to break-up a relation or drops an attribute from a relation, system integrity constraints will alert the user. If the user chooses to delete or alter a relation despite the warning, depending on the policy rules, the system can execute the command and the depending functions as well as any related results stored in the result layer will be deleted as well.

Column 3-6, Dimension, the cells contain a pointer to a sub table which contains the different related relations. The concept of dimension is to capture complex or multidimensional relationships. Any attribute that has a continuous dimension could end up holding complex relationships. For example, a street holds the continuous dimension of a space trajectory. A Street could run through multiple cities. How to represent such a street via a binary relationship is difficult. For example, Mass Ave is a street that runs through number of cities in the metropolitan city of greater Boston like Cambridge, Arlington, Lexington, etc. One could start representing a street by street address numbers. However, if we want to know all the bakeries on Mass Ave., a new relation will be needed. It becomes important to manage the different representations and relationships that an object of continuous dimension might give birth to. Other examples of dimensions are time. For example, to capture the evolution of the silkworm to butter fly is by having the same DNA. New relations are discovered revolving around a dimension and this column captures all relations that are related to a single dimension allowing re-creating a world view in the context as needed. The sub tables will have attributes that vary from one dimension to another with basic notions like dependencies, sequences, etc.

Column 3-7, SubTable, the cells in this column will contain a value when a relation is segmented horizontally for performance, storage space, or other reason. For example, in relation "Customer" if the numbers of customers grow from 2 million to 300 million, one might segment the Customer table into several sub tables for performance reason. Customers with last name starting with "A" to "F" will be in one sub table called "Customer-a-f", and so on, see FIG. 10. Of course, each table could reside in a different hardware machine database. See FIG. 10, sub table "Customer-a-f" is stored in a database called "telco2" and sub table "Customer-g-k" is stored in database "telco3", etc. This feature allows a database to scale in size quickly and easily in a step-wise fashion utilizing smaller and cheaper hardware when needed reflecting a "pay as you grow" approach. See FIG. 23, user can select the database to store in a newly created relation from a drop down menu of available databases. Administrators with a dashboard like tool, a tool that keeps statistics about space usage and performance measures for the hardware boxes holding databases for a certain context, can monitor and better load balance or add new databases as needed.

Figure 23:
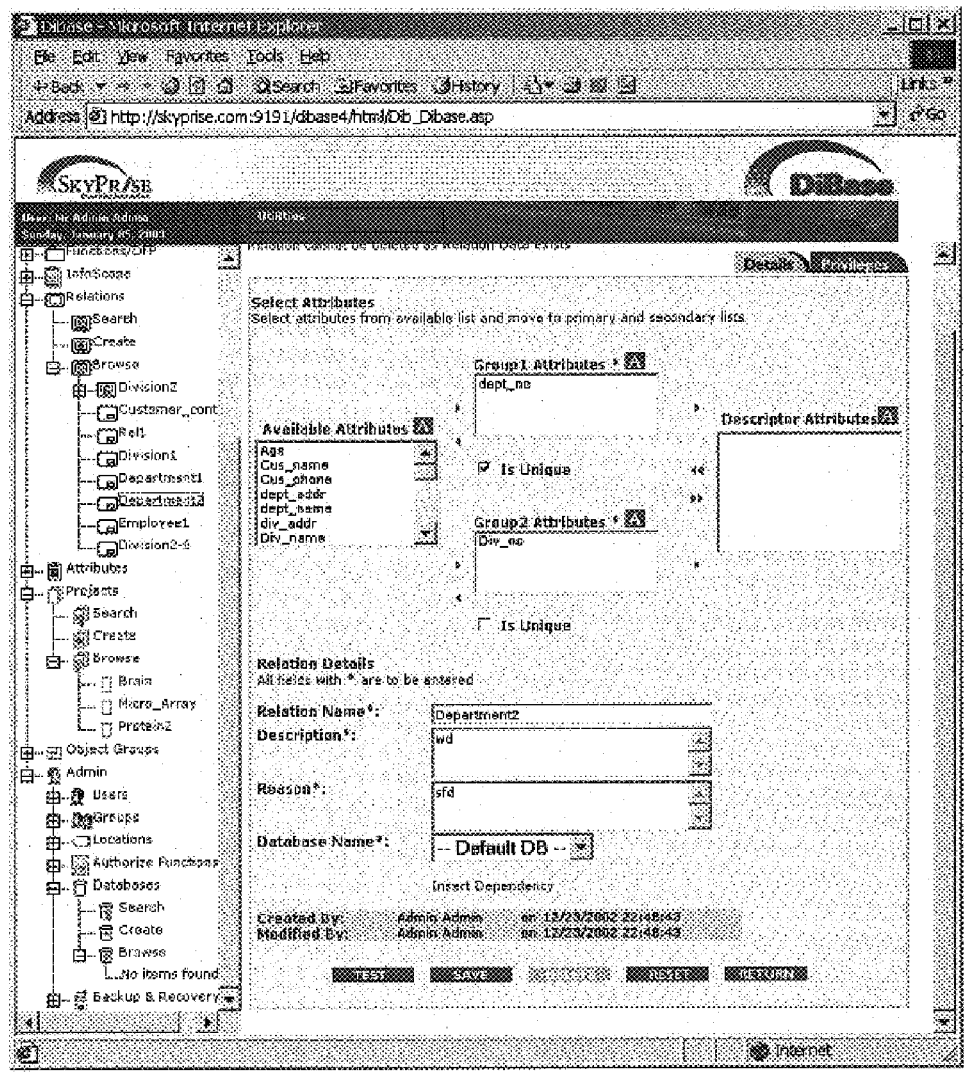
FIG. 23 represents a DiBase™ screen shot in the SeBase module for creating relations. A user selects the attributes of interest, organizes them as business rules mandate, select the type of relationship as in one-to-many or many-to-many, etc., fills in the relation metadata and creates the relations. A user can select the "test" option before creation, to test if the intended relation would cause any integrity violation before actual creation. This is done using one of the integrity constraints engine to conduct a dynamic normalization over the schema with that context, which is a step in the actual relation creation process.
Figure 24:
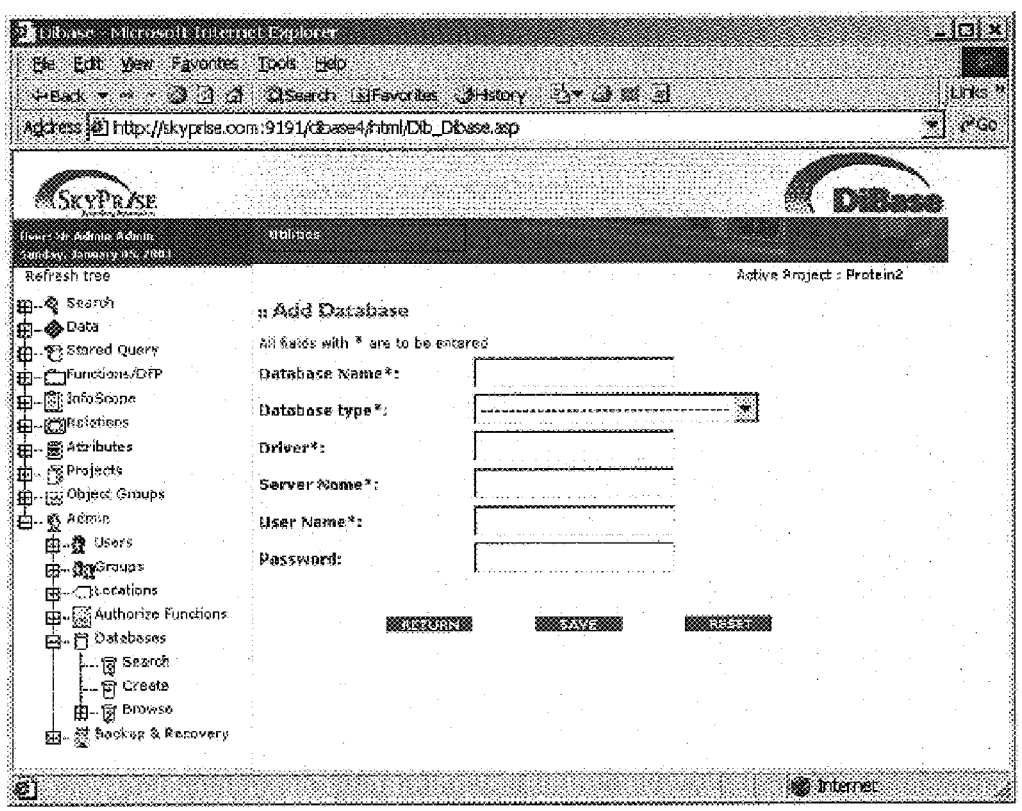
FIG. 24 represents a DiBase™ screen shot in the admin area for creating new storage area and making it available to DiBase™. These storage areas could be external hardware boxes or remote machines. The user enters relevant information for the DiBase™ master box to be able to access the new defined storage space. The new storage area uses a mix of different underlying data structures that can co-exist like a file system, a relational database, an object-oriented database, etc.
Figure 25:
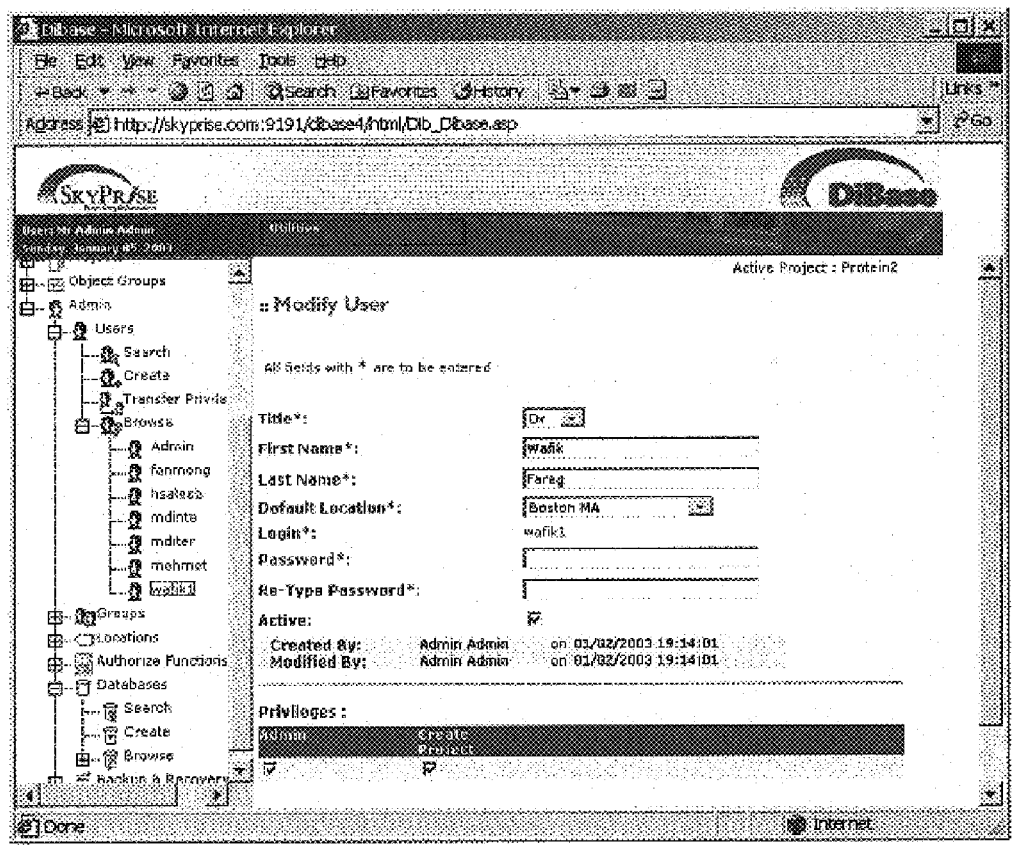
FIG. 25 represents a DiBase™ screen shot in admin area for creation of a new user together with the privilege access rights. The location can be used to enforce several possibilities like access to site license software in FunBase for example. If a software application is legally licensed only for a specific site, the user/location will authenticate that for access.

Column 3-8, 3-9, 3-10, and 3-11, all these columns capture the user who created a relation together with the time stamping of date and time as well as location stamping in column 3-11, see FIG. 23 as well for implementation display.

Figure 21:
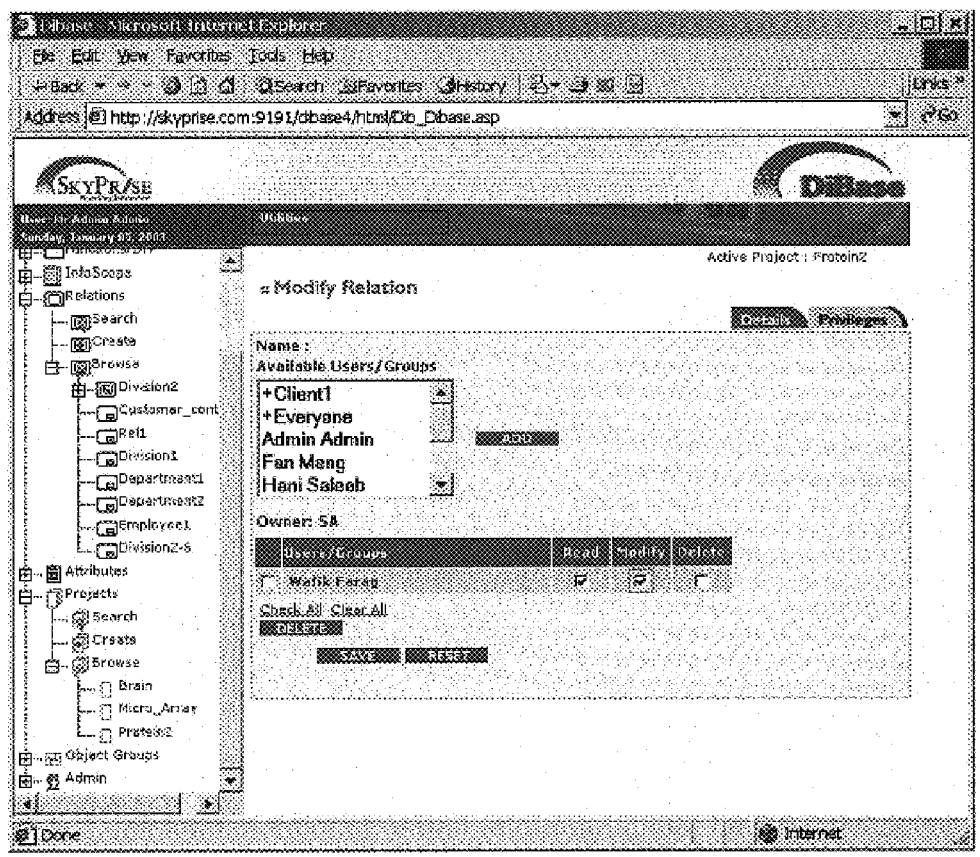
FIG. 21 represents a DiBase™ screen shot in the SeBase module for assigning access rights to a relation. Through out DiBase™, for each detail tab, a privilege tab is attached to enabling adding/adjusting access rights to the object in the detail tab, which can be a relation, an attribute, a function, a result, a DFP, etc. which are part of what constitute information elements in this document.

Column 3-12, Access rights, contain values that govern how multiple users can interact with the system while preserving the individual freedom, see FIG. 21. It is similar to column 8 in the Schema X table. This ensures a mechanism of experimenting and applying change without impacting software system that require high standards of stability and integrity like ISO-9002. Accounts could be created for testing and once production level performance is achieved changes are propagated to a targeted group.

Column 3-13, and 3-14, both of these columns are similar to columns 2-9 and 2-10 in Schema X, red capital A in FIG. 23 will display attribute met-data. The metadata in the user interface brings such information to the user.

Column 3-15, Attributes, each cell has a pointer to a table with each row in that table is one of the attributes in the corresponding relation of the same row in Relation X. For example, for row with "Relation ID"=1 in table Relation X, see FIG. 3, the "relation name by user"=Customer. For the relation Customer a new table "Tb_Rel_Att_Customer" is created as shown in FIG. 11. The newly created table name "Tb_Rel_Att_Customer" is stored as a pointer in column 3-15 of row 1 in Relation X. In FIG. 11, all the attributes in relation "Customer", namely: "name, address, phone #, and cell phone are stored with their role as "PK", that is primary key, or "DK", descriptive key. Descriptive keys are not critical to the existence of relation Customer. For example, if a user wants to delete the cell phone attribute from relation customer and create a new relation between "name" and "cell phone", the system will not alert the user that an integrity constraint of a relation is violated. Descriptor attributes are used to describe one or more attributes in a relation. However, the system will notify the user if functions or results in FIGS. 4 and 5 correspondingly, depend on the attribute "cell phone" being in relation "customer". Thus, the attribute "key role" column 11-5 in FIG. 11, the sub tables of column 3-15 is a good method to maintain for the integrity constraints of the system. Implementation wise, a number of variations are possible to optimize these data structure representations as long as they maintain the same data-relation separation, only one implementation is discussed here.

Column 3-16, result tag, has a similar role as the result tag attribute in Schema X in FIG. 2. However, result tag in column 3-16 in FIG. 3 defines the relations that participate in a result.

SeBase in Action

Figure 22:
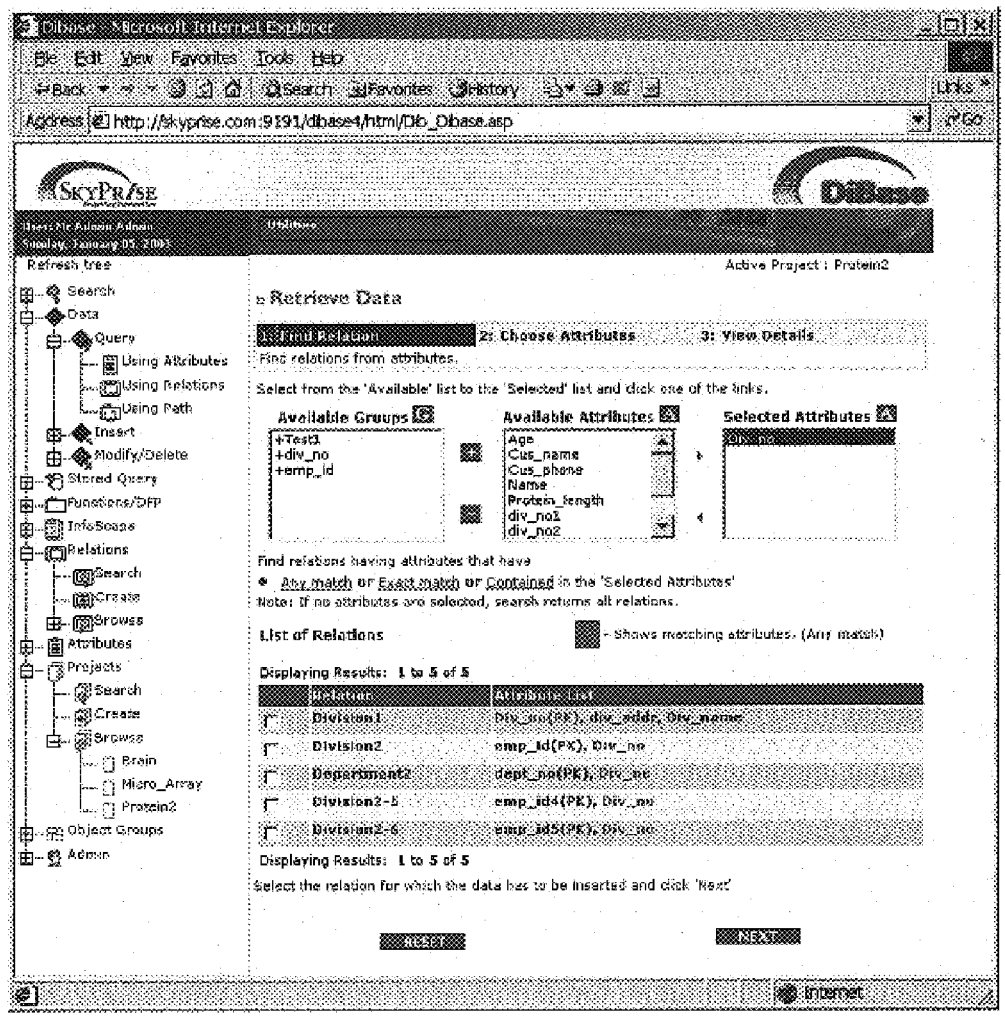
FIG. 22 represents a DiBase™ screen shot in the SeBase module for data manipulation. This screen is for querying data using one of the three access methods which is via attributes. Attributes allow users to browse and access data from an underlying schema without knowledge about the schema. For each attribute of interest a user can find more information by highlighting the attribute of interest and selecting the information button (red square with capital A for attributes). To find all relations in which one or more attributes of interest participate, a user can move the attributes of interest to the "Selected Attributes" box and select one of the search engines: any match, exact match, or contained. The result of the search will display all relations that match the search criteria. Otherwise, the user can directly select the relation of interest, if known, by selecting the using relation query access method.

A number of User scenarios interacting with SeBase are presented. First scenario is creation of attributes and relations. Second, scenarios presents query and insert of data values. For relations, a user wants to find if a relation exists or to create a new relation. Querying about relations allows users to find the latest state of the database without needing to know the design of a particular schema. No a priori knowledge of the underlying schema is expected. In FIG. 22, the user can search for relations using known attributes. In FIG. 21, one can examine from the tree on the left hand-side frame by selecting the browse functionality, existing relations or groups of relations in the system are displayed. Selecting anyone will bring FIG. 23, details about the selected relation.

Figure 32:
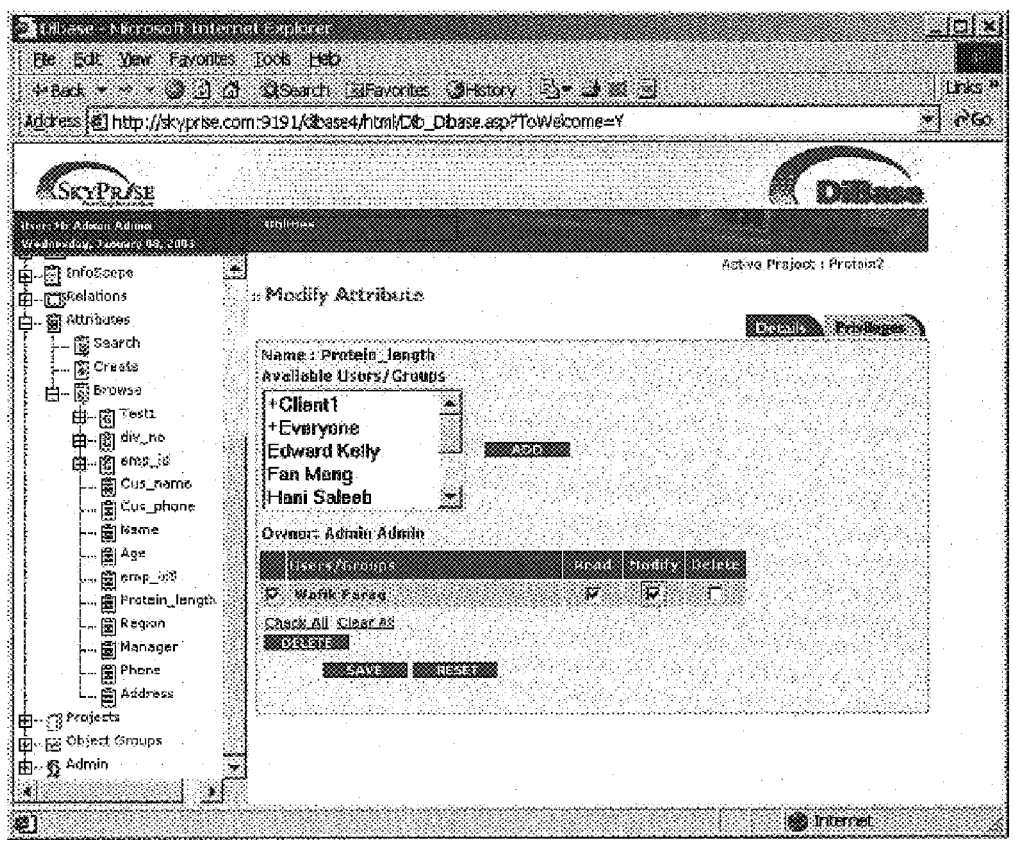
FIG. 32 represents a DiBase™ screen shot in the SeBase module for modifying access privileges to a particular attribute within a relation.

Similarly, attribute creation and search is available in FIGS. 32 under browse provides list of attributes or attribute groups are displayed under the browse in the left hand side frame. Also, FIG. 33, general search functionality at the top of the tree allows one to search any item in any information category.

Figure 31:
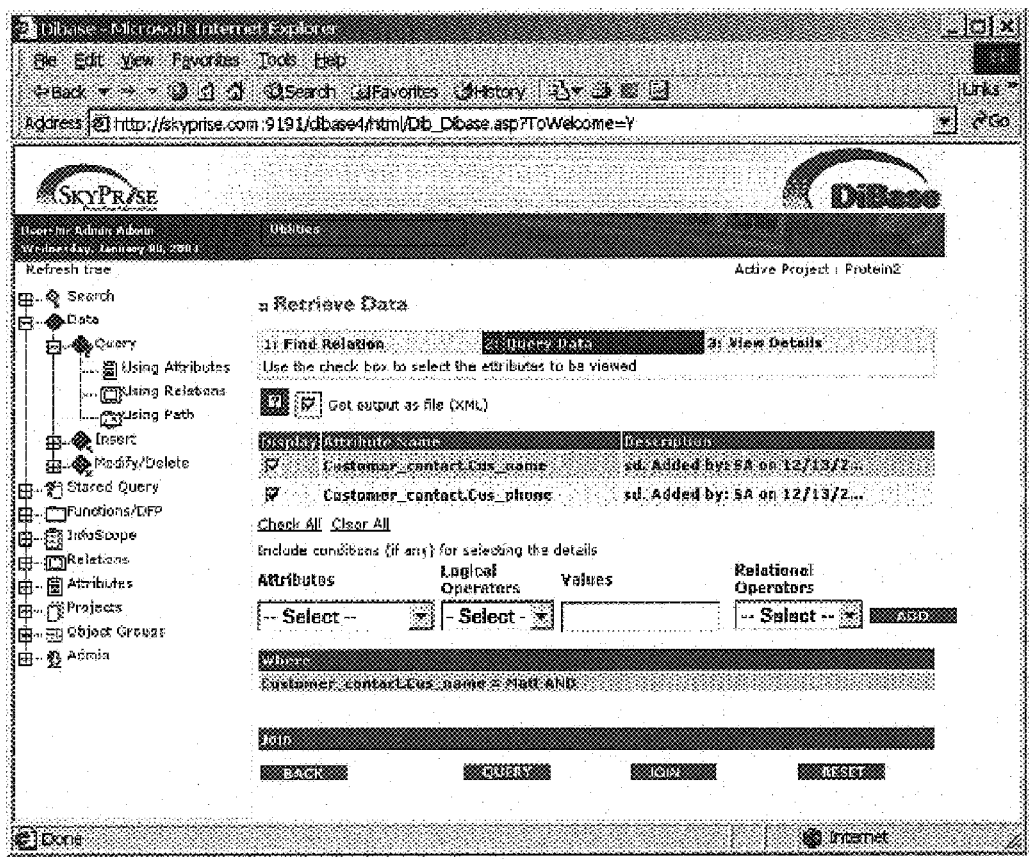
FIG. 31 represents a DiBase™ screen shot in the SeBase module displaying the visual non-structured language query interface. A condition is added to the query by selecting attributes and logical operators and values and adding the filter as a where condition. Great care was taken to simulate close resemblance to the relations SQL concepts to gain user acceptance. The Join button allows users to create a join on the fly between two existing relations even if the attribute names are different. This is a very powerful feature to enable an end user to join relations at any time—dynamically on a query based purpose.
Figure 34:
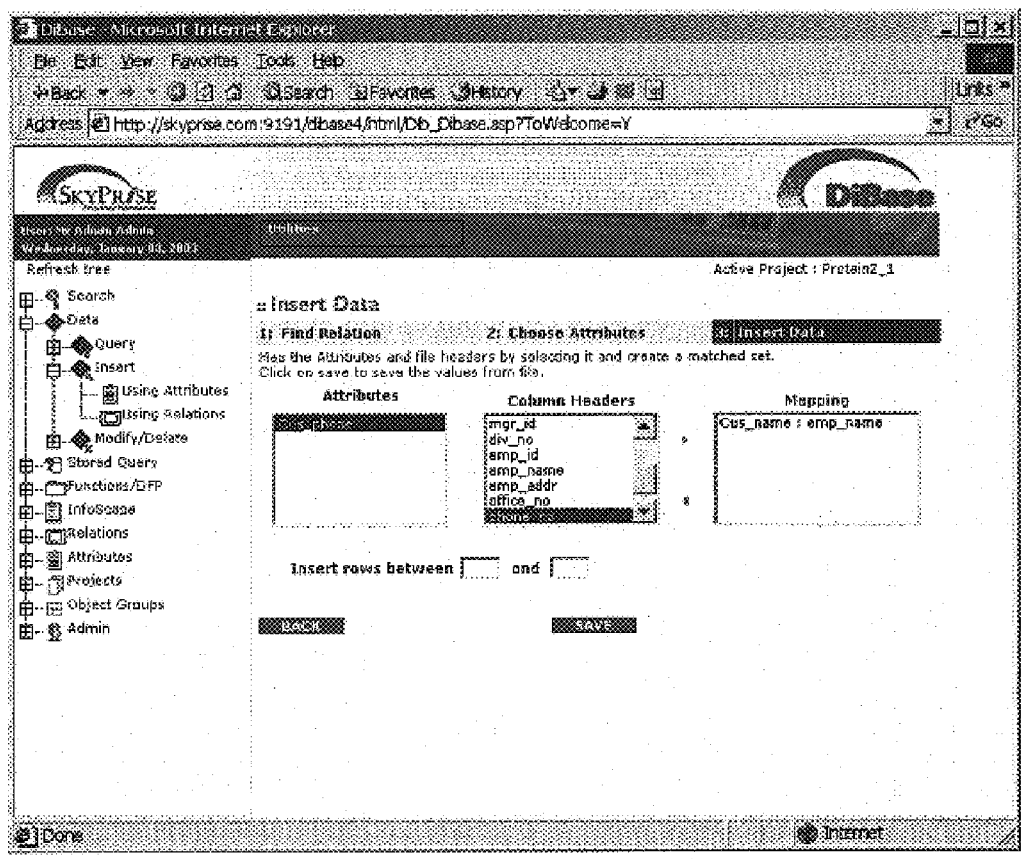
FIG. 34 represents a DiBase™ screen shot in the SeBase data insert area. This displays how a spreadsheet is uploaded into a relation in Sebase. User maps attributes in relations to column headers as read by DiBase™ from the Excel spreadsheet first row. Once mapping is completed, and row selection is identified if needed, data is uploaded into a relation in SeBase. This allows dynamic joining for external unstructured data on the fly. This is an example of how to dynamically integrate between structured and unstructured data sources.
Figure 35:
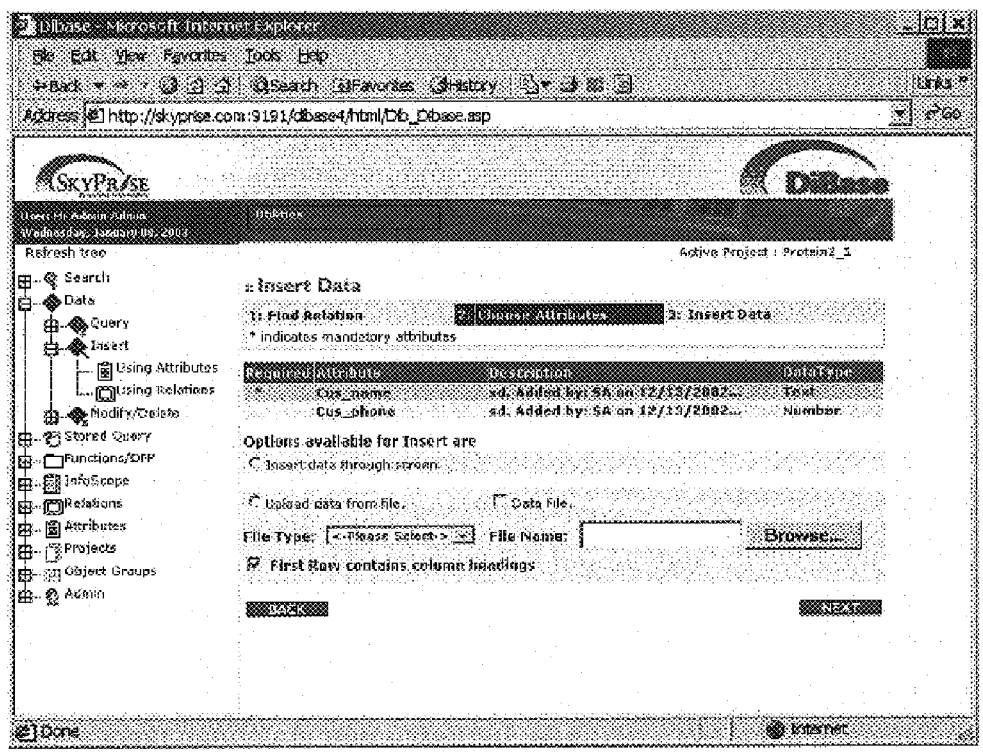
FIG. 35 represents a DiBase™ screen shot in the SeBase module for option to insert data into relations. Once one or more relations are selected, the insert method, via screen or file upload are selected.
Figure 36:
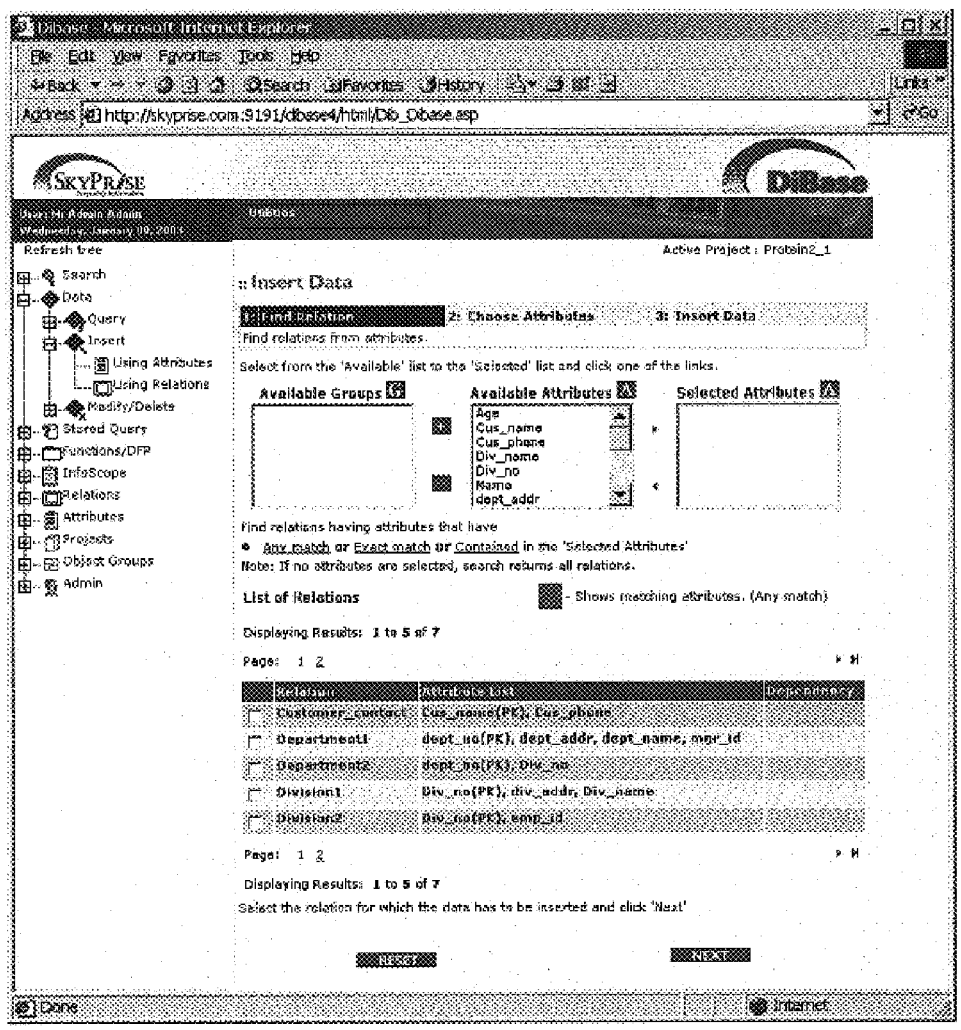
FIG. 36 represents a DiBase™ screen shot in the Sebase module to select relations for data insert via attribute selection, which requires no a priori knowledge about the underlying schema. This is similar to FIG. 22 for retrieving data where the browsing of schema is the same for managing data.

Second scenario, data insert and query, FIGS. 22 and 31 represents web-based query interface. In FIGS. 34, 35, and 36 present steps for the web-based interface for data insert.

Figure 33:
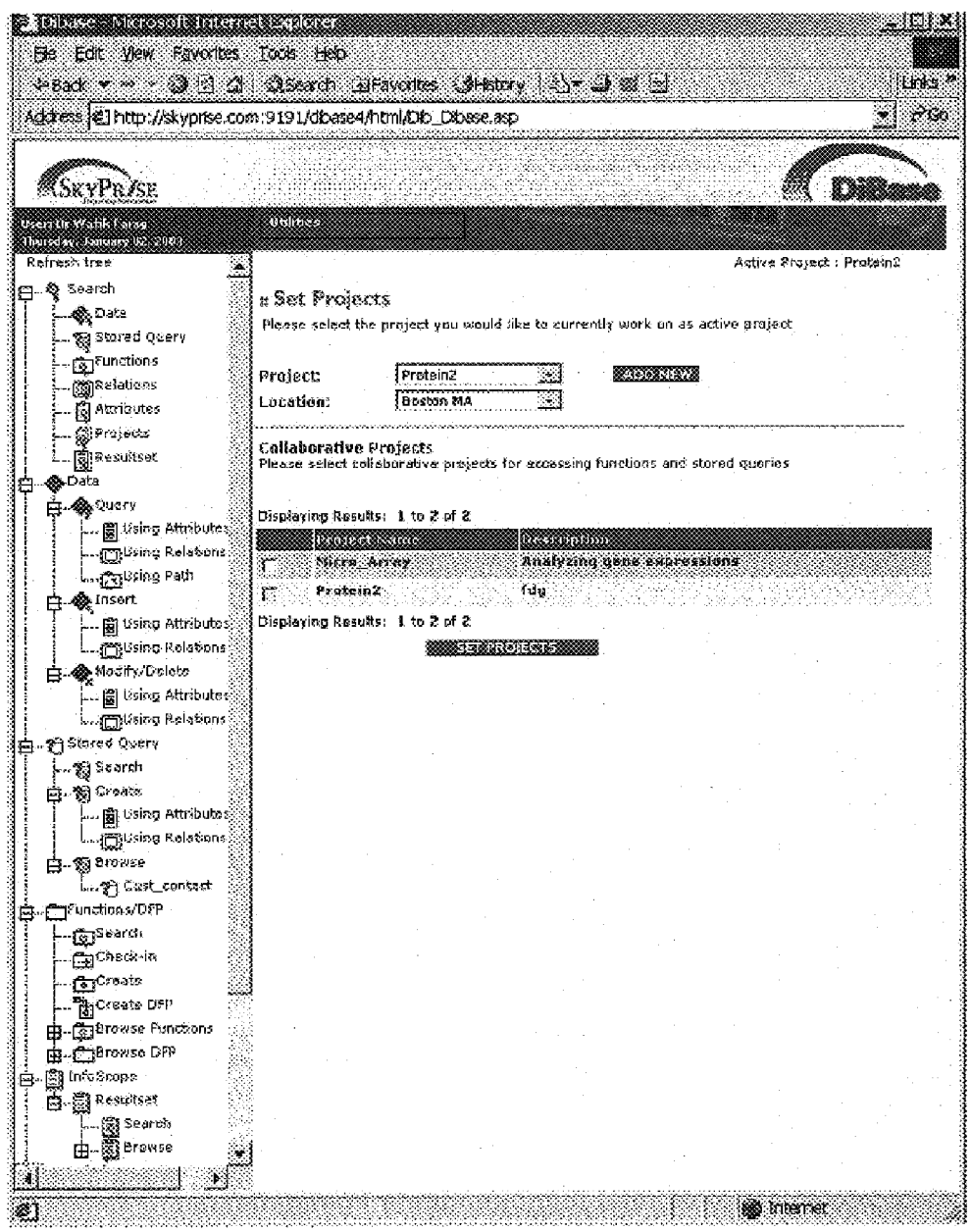
FIG. 33 represents a DiBase™ screen shot in the admin module for project selection/creation. User selects a project to work in and can also select additional projects as collaborative projects. The main project is called active because it is the project with respect to which dynamic changes by the user are allowed. Collaborative projects can not be changed; only access and data input activities are permitted. The integrity engine will operate only over the active project.

SeBase uses table "DiBase™ Master" table, see FIG. 1, for selecting a user's context. In FIG. 33, in the web-based interface, user at logon selects the context by selecting a project. Projects are the implementation for a schema″ that allows a user to select a context. Once a project is selected as the working project, this project will be used for dynamically adding new relations, results, functions, or stored queries. User can select other projects as collaborative projects, see FIG. 33. Once collaborative projects are selected a user can retrieve and only input data values in pre-defined slots into these projects, this is an implementation choice and not a limitation on the system. This maintains the theory that a user can only be in one context at any point in time and that all integrity constraints are based within the context of the working project. This allows users to collaborate without infringing on others. Users can access say a function from another context to add to a DFP or build a stored query to access data from a collaborative project.

Data—query: Let's run through an example.

Select name from project Protein2 where phone #=555-1234

Step 1:

The above query is instantiated via a user interface, see FIG. 22, which starts by requesting the user to select the attributes they want to find data from. "Name" is selected. The programmer interface uses a quasi SQL syntax like: Select name where phone #=555-1234. It is that simple and does not require table name a key factor.

Step 2:

A list of relations in which the requested attribute "Name" is a member of is displayed. User selects the relation of interest; this is like learning by discovery here about the state of the system at that point in time. This is an optional step, a user could go directly to step 3 if they know the relation they want.

Step 3:

In FIG. 22, a list or relations that contain selected attributes are displayed for user selection. A user selects a relation in which other attribute values are known to the user.

Step 4:

In FIG. 31, the system returns the selected relation(s) with the attributes to complete the query.

Internal System Actions:

In step 1, SeBase lists the set of attributes from Schema X table of FIG. 2. Once the user selects an attribute SeBase goes to column 2-14, retrieves the table name and displays all relation names in that table, which are all the relations that this attribute exists in. In case of multiple attributes, the returned sets of relation names from the sub tables are intersected. The relation names that appear in the intersected set will be displayed back to the user.

In Step 2, once the user selects a relation, SeBase selects the identified relation from Relation X, see FIG. 3, and retrieves the pointer to the attributes sub table from column 3-15 in Relation X. All the rows in the sub table are displayed for selection in step 3. In case the user skips step 2, Sebase will populate the set of relations for all the possible attributes that intersect from step 1.

In Step 3, once user formulates the query, attributes are instantiated, SeBase re-creates a query with the internal table representations as found in column 3-3 in Relation X (FIG. 3) and to the hardware box hosting a database as identified in column 3-4, if available—if blank, the default main database is selected. Sebase has complete knowledge of the exact table names and attributes. From this scenario, the reader finds that the table name is not needed to retrieve information from DiBase™. The user needs to select attributes they are seeking to get values for using what attributes they know. In our example, the user knows the "phone #" value and needs the "name" value and doesn't know if the person in request is a customer or an employee, which is weather they are in the customer relation or the employee relation. In FIG. 31, the relational operators box, fourth box in the query building interface, allows the user to select from two tables by choosing the "or" operator. In our example, the query becomes a compound query selecting from two relations.

Data—Insert

Data insert is very similar to the retrieval process and will be skipped to avoid repetition. See FIGS. 34, 35, and 36. The main difference is the user has the option to upload data from external data sources like Excel spreadsheet as in FIG. 34, flat file in certain formats like comma delimited or XML or from other external databases. In the case of the external databases the user needs to create a DFP, select the collaborative project that has access to the external database, formulate a stored query and insert it in the DFP, select the uploadSeBase function to upload data values into the relation of interest. This allows the user to have data from more than one external source or database into the same relation by having more collaborative projects active at the same time and formulate the corresponding stored queries for each data source.

Relation—Create

User creates a new relation between two sets of attributes. Attributes could be new or already existing in the system.

Figure 39:
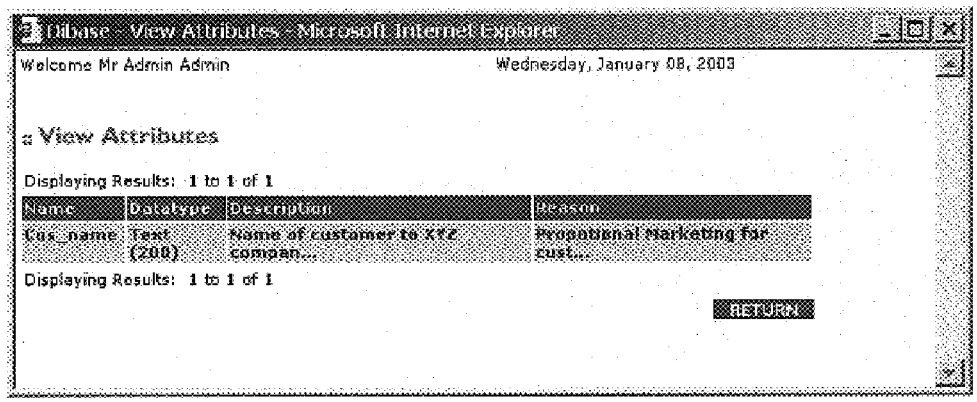
FIG. 39 represents a DiBase™ screen shot for viewing metadata about information elements, in this case for an information element of type attribute. Users can select any attribute from the list of attributes available to view metadata about it. All information elements in DiBase™ have the same feature for displaying stored metadata information. Metadata information allows addition by collaborative parties keeping a journal log of changes with tracking information.

Step 1.

a) The user either selects an existing attribute from the available attributes box, see FIG. 23. For more information about available attributes, user selects the red box with "A" which returns a pop-up window with detail about the attribute and its metadata, see FIG. 39.

or b) User creates a new attribute, see FIG. 19. Once the attribute is in the system, user can go to the create relation as in previous (a) method.

Step 2.
- a) Selecting an existing attribute from the available box a user can move the attribute to the corresponding box depending on the role of the attribute, primary, secondary, or descriptive. The selected attributed is deleted from the available box. This step is repeated until the user selects all attributes that need to be in the desired relation.

Step 3.
- a) User fills in new relation name and metadata.
- b) User can select a database for storage if available.
- c) User can link the new relation to another relation through insert dependency link to relate relations of different attribute naming. Say a relation has attributes protein_length as one attribute. Another relation has attribute protein_leng. The symentic meaning might be the same and only users can test worldview and representation issues. A user from the description of the other attribute might want to leverage the other relation information by linking both relations.
- d) Finally, user can either save the relation or test for integrity check by selecting the "test" button at the bottom, see FIG. 23. The test allows the user to change or delete if the relation already exist in the system. System displays offending relations for user inspection. See details in the relation integrity engine section below.

Internal System Actions:

Step 1.

a) SeBase list the set of attributes from Schema X table of FIG. 2. Once the user selects an attribute SeBase selects values of column 2-14 corresponding to the selected attributes, retrieves the table name and displays all relation names in that table, which are all the relations that this attribute exists in. In case of multiple attributes, the returned sets of relation names from the sub tables are intersected. The relation names that appear in the intersected set are passed to the integrity check engine with all the attributes available in the set. This allows the integrity engine to get the list of attributes and list of functional dependencies (FD's) within that context for verifying validity.

b) In case of a new attribute, Sebase inserts a new row entry in Schema X, where X is the corresponding user's context, which is the selected project in our implementation. User fills in new attribute name and meta-date, see FIG. 19. Some of an attributes values like location, user ID, data, and time are automatically filled using the contextual information about the user, see metadata and content type in FIG. 7.

In Step 2,
- a) Once the user selects the attributes for the relation to be, SeBase builds a list of all possible relations in which those attributes exist from Relation X, see FIG. 3, and retrieves the pointer to the attributes sub table from column 3-15 in Relation X. All the rows in the sub table are compiled for the integrity engine. Sebase maintains the attribute grouping on each side of the dependency for the two sets of attributes. The descriptor attributes are dealt with as a special case as they don't affect the binary relation constraints In Step 3.
SeBase inserts a new row in table Relation X with the new relation only after the integrity check for the relation is passed. SeBase populates a new row in every table pointed to by column 2-14 in table Schema X that corresponds to the selected attributes. Sebase also creates a new table with name from column 3-3 of table Relation X and stores it in database as indicated in column 3-4. A user could select a database destination if available. This new table will have the set of selected attributes. In case of insert dependency, columns 11, 12, and 13 are filled correspondingly.

Find Path

Figure 40:
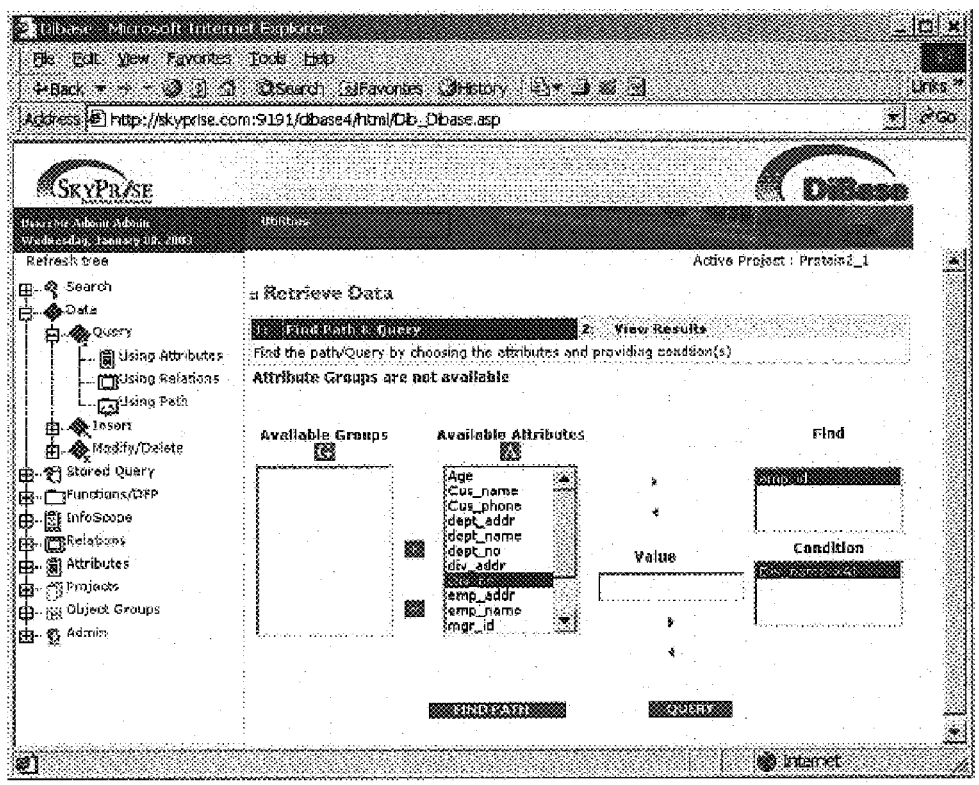
FIG. 40 represents a DiBase™ screen shot in SeBase for retrieving data out of relations via the path method. The path method allows a user to select an attribute of interest and another attribute of known value to find if possible to extract data values. SeBase uses algorithm FindPath to find out if a path exists between two attributes. This is very useful in a dynamic schema model to allow users to test and retrieve results without being knowledgeable with the underlying schema. SeBase will also display the path of relations used for user confirmation. The Red "A" button above the attribute list box is for retrieving attribute metadata information as is in FIG. 39.
Figure 41:
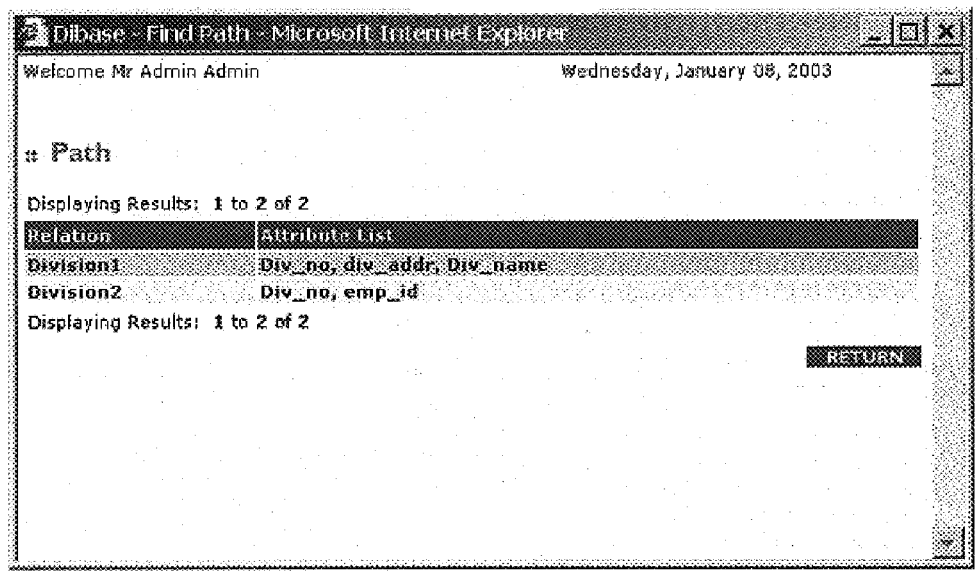
FIG. 41 represents a DiBase™ screen shot in the Sebase module for displaying a path of relations from which data could be accessed using two or more attributes. This third data access method "Using Path" allows users to discover if a path exists between two attributes within a context. This is another data access method available for an end-user. SeBase automatically searches for path using algorithm FindPath.
Figure 43:
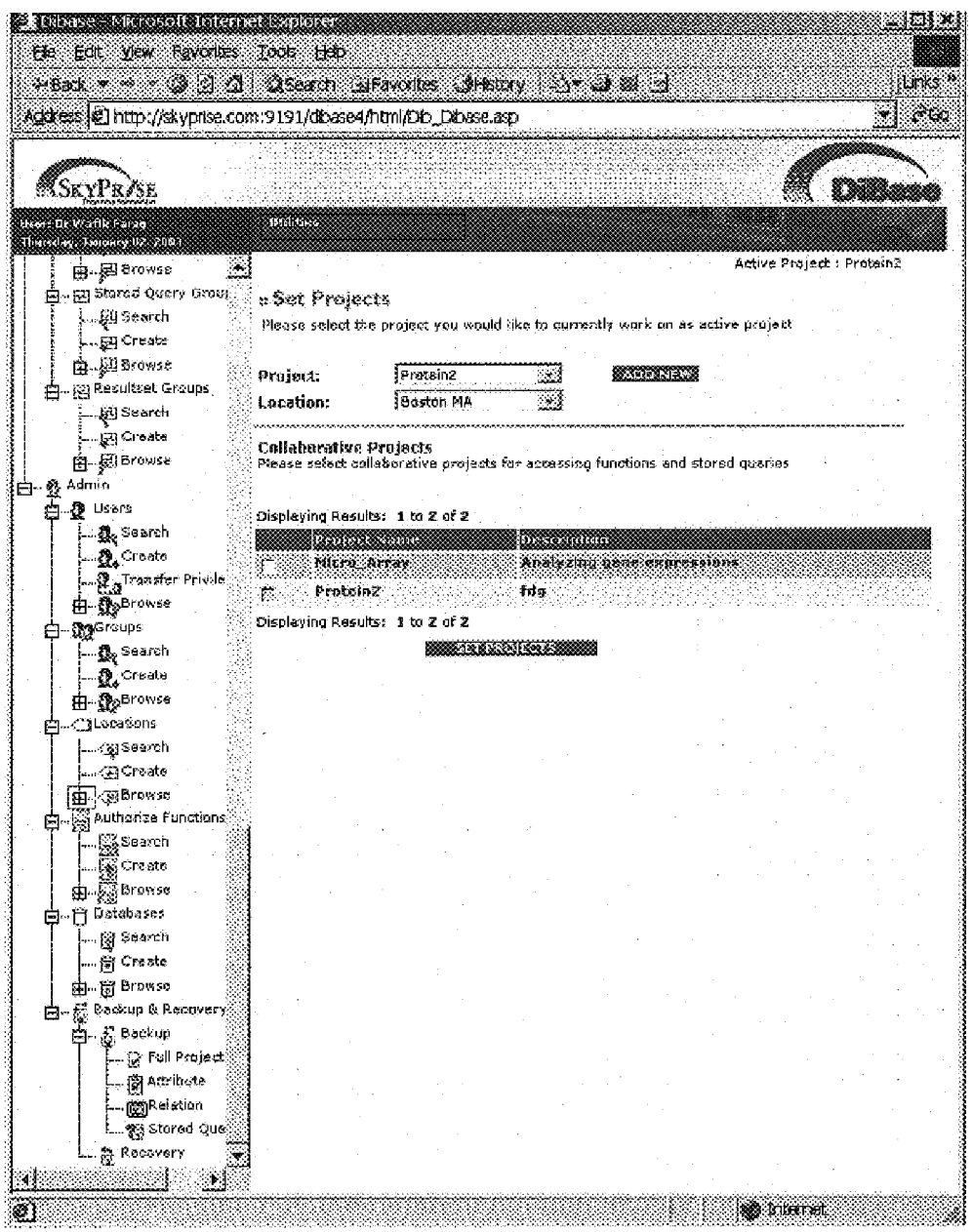
FIG. 43 represents a DiBase™ screen shot for some of the admin functionality in the tree on the left hand side frame. Admin functionality includes creating new users, or groups of users, in the system, searching for users, transferring privileges of one user profile to another. Administration of new checked in functions by users to validate code finger printing and security such as no viruses are embedded. Creation of new databases for disc space or performance needs. Backup and recovery can be performed on any information element available or a combination from an attribute level in SeBase to a complete project in DiBase™.

In the case of data retrieval, Sebase can simplify the search for the user by requesting from the user to enter two attributes and find if a path exists between them, see FIG. 40. This is a $3^{rd}$ method besides the attribute and relation access methods used to retrieve data out of Sebase without a priori knowledge of the underlying schema, see FIG. 22 left-hand-side tree under the "Data—Query". For example, let's say a user has a phone # and is not sure if the persons name will be retrievable given a phone #. If the two attributes are not in the same relation but exists in relations that have common joining attributes, than the query can be fulfilled. FIG. 41 displays list of relations that contain the two attributes as entered by the user in FIG. 40, emp_id and Div_name, which can find the solution requested. The user displays the pop window of FIG. 41 by selecting find path. Otherwise, to get the answer, the user will select query.

Find path is another implementation displaying the user freedom from needing to know the underlying database model. In case of DiBase™, the data model changes all the time—dynamic data model, hence the user needs such tools.

Below is an algorithm for finding a path between two attributes:

Given two set of attributes (X, Y) we should be able to get the unique path between them 1. The Path between X and Y exists if Y is in the Closure of X
    a. Find The Closure of X over the existing FD's in FDTable
    b. If Y exists in Closure of X than there is a path between X and Y else There is no path between the given attributes.
    c. For every attribute in X find a path to every other attribute in Y. for finding the paths:—
        i. create a acyclic graph using the Fds in ClosureFDsList, while creating the adjacency matrix for the graph for every edge also maintain the relation and FD causing that edge.
        ii. use the FindPath algorithm to find the path, if for two consecutive edges and BC the relation differs (say R1 is for edge AB, R2 is for edge BC) than add condition R1.B=R2.B to outputPath
    d. The Union of all the output Paths form the Path between two sets of attributes

---

Algorithm FindPath

FindPath between attribute s and attribute d:-
{
Int n = no of attributes
Path( ) array of n elements
Path (0) = s
Length = 0 // current path length

```
Algorithm FindPath

Destination = d
    //mark of the attributes as not reached
    for I = 1 to n reach(i) = 0;
    //search the path
    if (s==d or rfindPath(s))
    {
      NewPath an array of length + 1 attributes
      copy length +1 elements from Patah to new path
      return newpath;
    }
    else
      return null;
    }
    recursive function:
    rFindPath(s)
    {
    reach[s] = 1;
    for all vertex u adjacent to s
    {
    if reach(u) == 0 //u is not reached
    {
        length ++
        path[length] = u,
        if (u == destination ) return true
        if (rfinfPath(u)) return true
        //no path from u to destination
        length - -
      }
    }
    return false
    }
```

For the closure functionality mentioned in the find path algorithm, below is the algorithm from prior art[1]

```
Algorithm CLOSURE

Input : -A set of attributes X and a set of FDs F
Output :- the closure of X under F (list of all the attributes
which can be reached from X)
ClosureFDsList:- List of FD's which were used from the closure
CLOSURE(X,F)
Begin
ClosureFDsList = null
OLDDEP := Null , NEWDEP :=X
While NEWDEP <> OLDDEP do
  Begin
    OLDDEP := NEWDEP;
    For every FD W→Z in F do
      If W is in NEWDEP then
        NEWDEP := NEWDEP U Z
        ClosureFDsList = ClosureFDsList + W→Z
      End if
    Next
  End
Loop
Return (NEWDEP , ClosureFDsList)
End
```

The closure algorithm is added here for clarity and completeness to the meaning of Closure as used in the path algorithm. The closure algorithm is used from David Maier book "The Theory of relational databases" 1983—computer science press.

Features of Sebase:

A database model "contextual model" allows changes to relations among data attributes to be captured on the fly. Multiple schemas could co-exist in SeBase.

SeBase can act as a storage layer for new relations, for underlying legacy systems, or for external data sources. With all these searchable through one interface and can be integrated.

Is agnostic to the underlying data source or storage area. Could vary from a flat file to a relational model, an object oriented model or a mix of all.

A new process for propagating access rights to the attribute level, relation, up to the schema" level.

A user can establish a new relationship with no design process required to the whole schema.

System notifies a user if a newly created relation violates an existing relationship. The user has the choice to enforce the new relation thus losing access to the existing relation, this policy is not recommended in practice. An alternative more acceptable solution is once a user finds that the relation to be created is in conflict and still wants the relation to be created; the user can create a new project, i.e. a new context, and store the conflicting relation in the new project. This enables users to maintain different contexts supporting conflict. Other system users will not be aware of the newly created conflicting relationship until propagated by an administrative authority.

Funbase: Function-Based Model

Functions in a software system have taken the middle layer of a functionality server. No linkage to the data layer has been made. A number of system like revision control systems or source control systems keep track of functions for the versioning and changes within a single function and not with what the function interacts with. Other systems allow users to build workflows using a set of existing functions. Two things that need attention is the ability for users to check-in functions through a networked application and the on-the-fly storage of the result of a function or sequence of function that contain new attributes or relations.

Funbase is an open platform for checking in functions. To best describe some of the capabilities of functions checked into FunBase, some examples are mentioned together with installation process in the "Application and Function Installation Manual" filed with the present application.

To better understand the power of an open platform, one can see the FTPupload function that uploads databases from external sources and automatically creates corresponding relations into SeBase. FTPupload function is a generic database upload engine that takes an input file; see FIGS. 42A-42E for a sample file of one of the NCBI databases, in an XML format for identifying the underling schema of the external database uses that to create relations in Sebase and than uploads the corresponding data values.

A model is presented for storing, retrieving functions as well as executing them based on contextual dependencies.

First we will explore the table Function X in FIG. 4 in DiBase™.

How it Works

Function X

In various embodiments of the present invention, as described previously, we handle various categories pertinent to the context X in an analogous manner. We have discussed above the category "data", in which attribute definitions (in the table Schema X) are made distinct from relational definitions (in the table Relation X), and an integrity engine enforces rules as to as to permissible relations among attributes within the context X. In this way relations among attributes may be conveniently established and modified on the fly. Similarly, functions, pertinent to the context X may be established in the table Function X.

In order to permit flexible use of generalized functions in the context X, functions are required to be defined only via specification of inputs and outputs, even though it is common in computer science for functions to have what I call "side effects" wherein behavior of the functions includes such things as reading from and writing to storage in ways that are not specified as function inputs and outputs. When functions have such embedded characteristics they cannot have general application and must be rewritten for each context. As an example, in database design, data is commonly extracted using a SQL statement embedded in a function; when the schema is changed, it may then be necessary to update the SQL statement as well. In embodiments of the present invention, this problem is avoided by refusing to permit such an embedded characteristic in a function. Each function herein is defined solely in terms of inputs and outputs and thus functional behavior is dictated solely by logical processes imposed on the inputs to arrive at the outputs, with no other data dependency implicit in the function.

Figure 45:
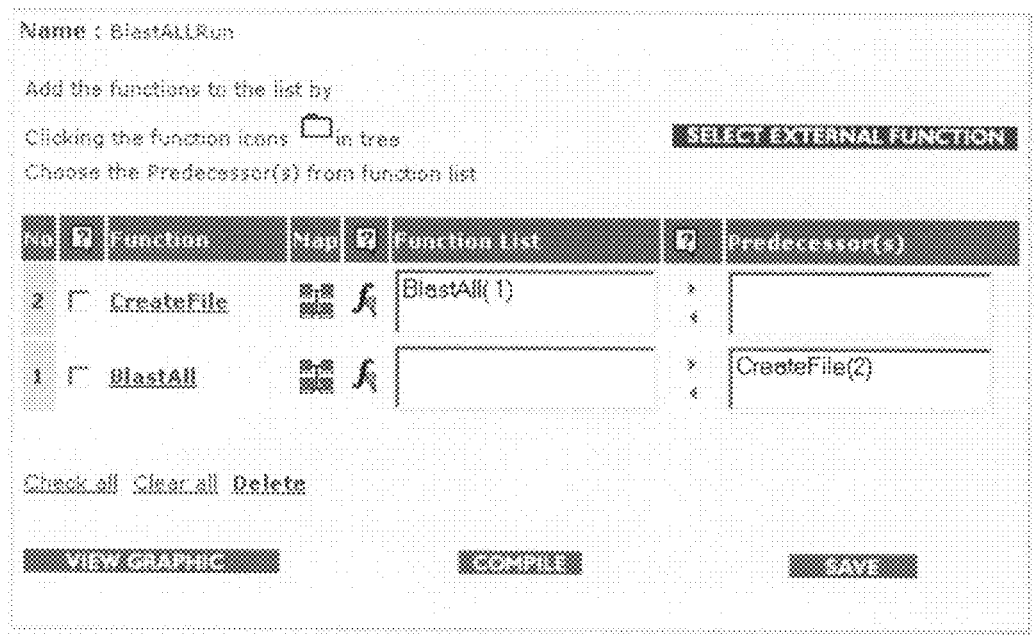
FIG. 45, taken from the DiBase™ Application and function Installation Manual, provides a screen shot of how a user can graphically add and associate functions to a data flow path. After adding a function, its order in the workflow is determined by the list of predecessor functions. In addition to adding functions from the active project, functions can be added from collaborative projects by selecting the link "Select External Functions/Stored Queries" and selecting from the list of functions or stored queries that appear from that project. This is another way for a user to do dynamic integration of information elements.
Figure 46:
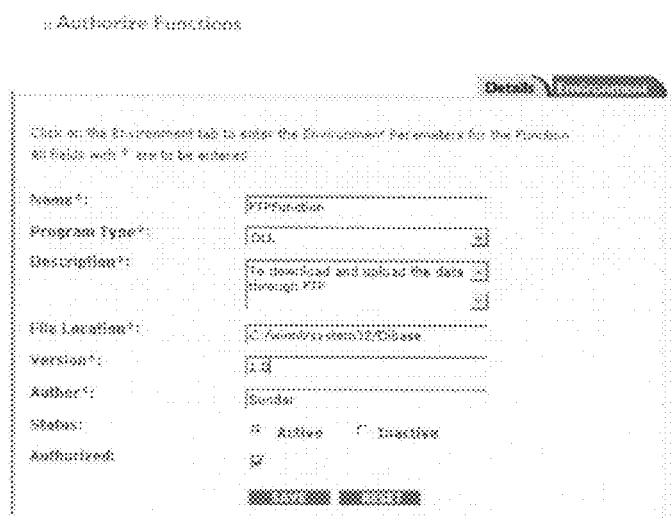
FIG. 46, also taken from the DiBase™ Application and function Installation Manual, provides a screen shot for an administrator to authorize a function after a user checks it in. The user has the same check-in graphic without the ability to authorize or activate a function. The policies and procedures of an enterprise can allow users such privileges if needed. The user interface acts as an SDK for uploading custom written functions into FunBase to be used and shared in DFP. See FIG. 8 for ability to modify function parameters and mapping interface as well as view integrity constraints that might limit modification of a function's parameters. In this example the user checked in a DLL function.
Figure 47:
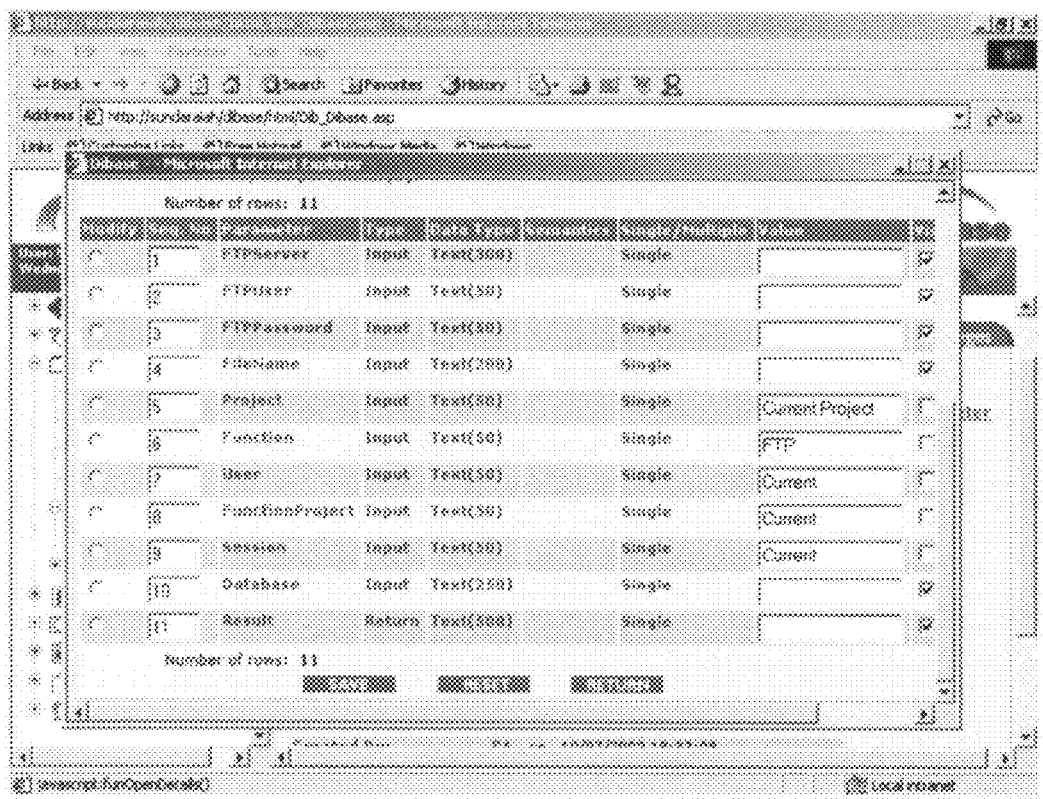
FIG. 47, also taken from the DiBase™ Application and function Installation Manual, provides a screen shot of a graphic for mapping the inputs and outputs of a function to be added into FunBase. The user/author of the checked-in function needs to define the I/O for each function. The user can hide some variables or set default values if a value is not provided at run time. Once a function is checked in Funbase, other users with access rights can use it in creating DFP.
Figure 48:
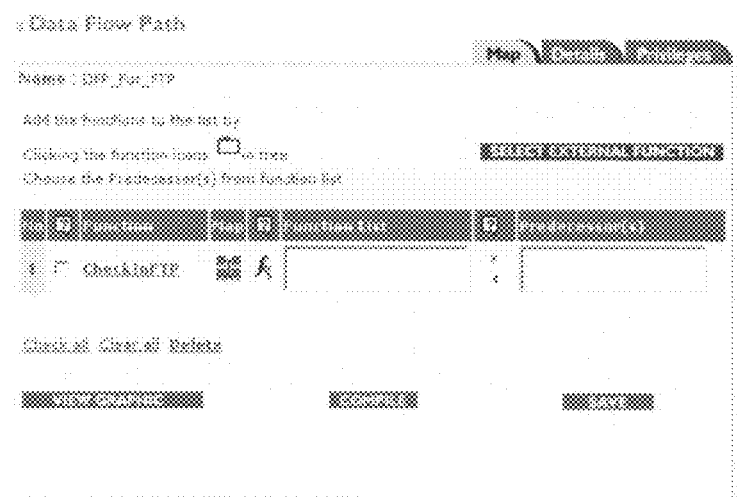
FIG. 48, also taken from the DiBase™ Application and function Installation Manual, provides a screen shot of a graphic displaying how a user can add a function into a new DFP after the function has been checked-in and authorized for use in FunBase.
Figure 49:
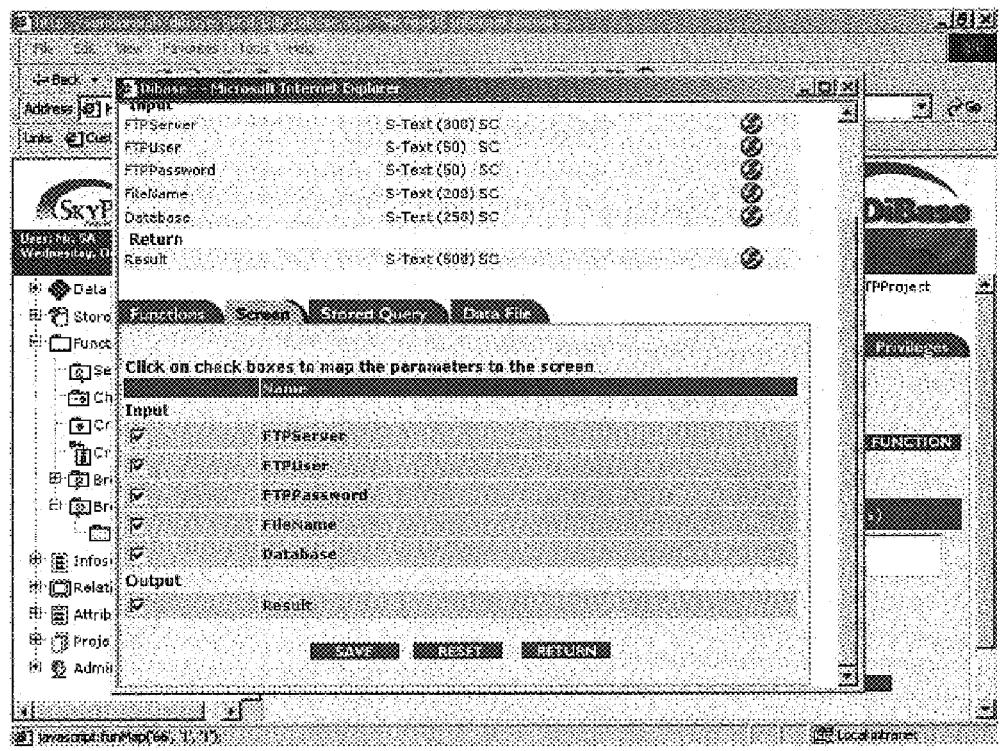
FIG. 49, also taken from the DiBase™ Application and function Installation Manual, provides a screen shot of a graphic displaying mapping the inputs and outputs of a function from the DFP. An input or output can be mapped to another function's I/O, a stored query, a data file, etc. Once all the input and outputs of all functions in a DFP are mapped, the DFP is ready for execution.
Figure 50:
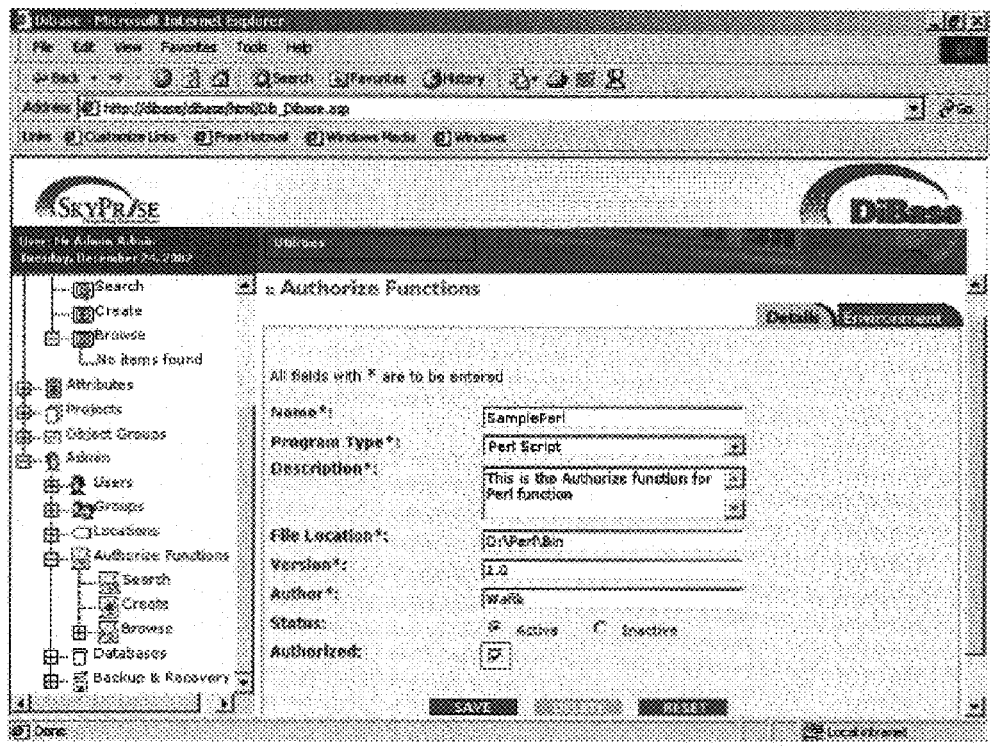
FIG. 50, also taken from the DiBase™ Application and function Installation Manual, provides a screen shot of a graphic for authorizing another function. FunBase accepts executables or functions where a compiler resides on the same machine the function code resides. File location could be on any network reachable server connected to the main DiBase™ server. A cluster or a network of servers could also run the function for faster response time.
Figure 51:
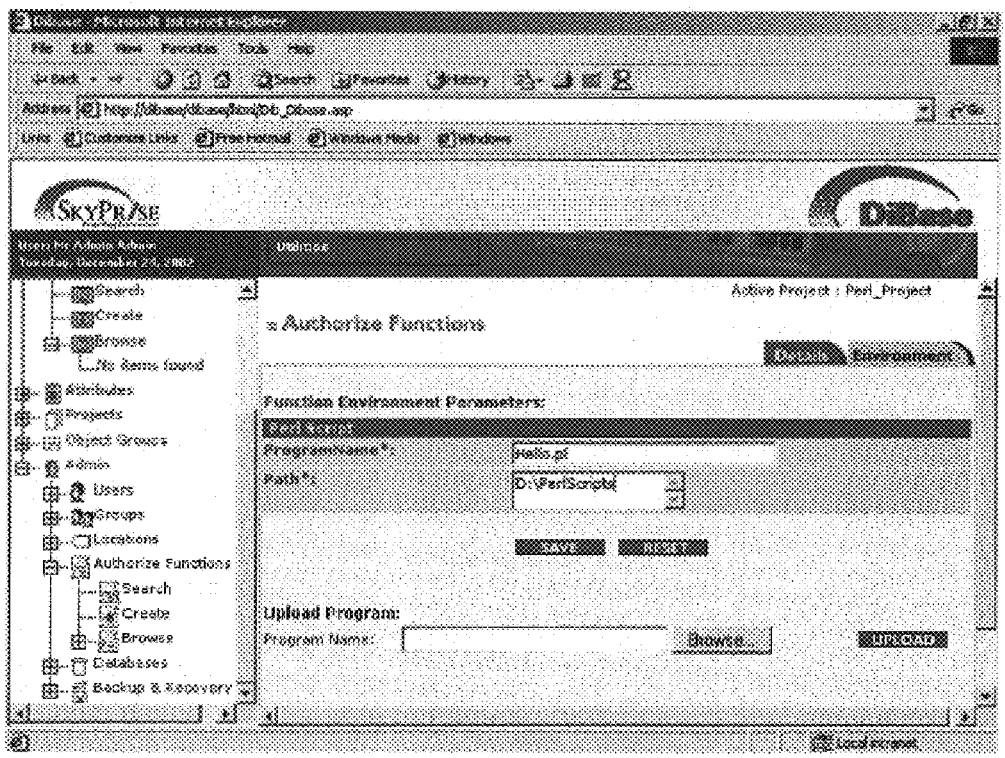
FIG. 51, also taken from the DiBase™ Application and function Installation Manual, provides a screen shot of a graphic for a user who owns a project to authorize a function in FunBase to be available for execution in the DiBase™ platform. Following the entry of information in the graphic of FIG. 50, the user provides further information in FIG. 51 about the compiler ("Upload Program") and the pathname for the function.

Users may flexibly add functions to (or modify or delete them from) the table Function X. A function integrity engine enforces rules with respect (i) to the naming and versioning of functions in Function X, and (ii) to the use of functions from Function X in a data flow path, and (iii) the use of consistent input parameters in connection with the execution of a data flow path. (Execution of a data flow path occurs when the user instructs FunBase to "compile" by selecting the graphical "compile" button as is shown in FIG. 45.)

In FIG. 4 is shown the structure of the table Function X. Below I explain the different attributes of this table and their role.

Column 4-1, Function ID, is a unique id to reference a function for storage

Column 4-2, Function name, is the name of the function used by the application.

Column 4-3, version, implements a DiBase™ sub table scheme for one-to-many cases. This implementation allows a user to change a function or modify it while maintaining older versions of the function. This implementation is therefore similar to a source control system.

Column 4-4, Inputs, identifies input data, or user inputs for searching, or other items provided as an input to the function. Users can add new contextual inputs to a function thought no actual input is required. For example, a function "mapquest" returns a set of directions given two inputs: origin and destination. However, it is assumed that it only works in USA. A user could create a new version of function "mapquest" qualifying an input parameter as country, which gets instantiated from a users context information. In this example, if we have another function called "mapeurope". A user with a cell phone who requests direction will still enter only two entries: origin and destination, while the context of the country could be retrieved from the cell phone network information. See FIG. 7 for some parameters of contextual data that are used to qualify, search for, and select functions.

Column 4-5, Outputs, is a list of outputs of a function. One-to-many scheme is used in this column as well to store all output types of a function. This allows users to query about a function by its output.

Column 4-6, author, is the person who wrote the function and has full access rights to change the function. Though once a function is checked and used by other users, like being embedded in a DFP, the author of the function will need admin assistance for function deletion if requested.

Column 4-7, 4-8, 4-9, 4-10, 4-11, Check by user ID, identifies who checked a function together with time stamping and authentications and location etc. This is similar as in Schema or Relation tables in FIGS. 2 and 3 respectively.

Column 4-12, 4-13, are user entered metadata information about a function.

Column 4-14, classification, is a set of classes that a group in a project or a team agrees upon and facilitates search. Allows users to create context for functions within an application and becomes selectable for new functions. Examples for classifications are: clustering, data mining, conversion, etc. where functions of such a class are stored.

Column 4-15, Path, is where a function is stored, it could be a URL, or a path on a network, etc.

Column 4-16, OS, the operating system that a function could run on. This address variation like different flavors of Unix or Linux. This enables DiBase™ to utilize a mix of operating systems running at the same time for different functions in a DFP.

Column 4-17, Platform, is it windows, Mac, Unix, etc. Gives users idea if they find a good result obtained by a function that runs on Unix and they run on Linux that compatibility issues are not major like running on Mac. Users will be more willing to spend the time to modify the function for the similar platform. A user could also have in their context what platforms or OS do they have access to or are familiar with, thus restricting the search.

Column 4-18, and 4-19, both of these columns can be used in a variety of ways. For example, a user wants to find any data mining function that runs on Windows 2k, written in C, and has complexity less than $n^2$.

Column 4-21, and 4-22 provide usage and statistics about a functions use.

FunBase in Action

A key benefit for users to check in their functions into DiBase™ is to keep the integrity of the software system. See Exhibit A for details of checking in a function and mapping of parameters. Linking functions with data and results provides a holistic view for users. In addition, because DiBase™ brings the power of change to the end user, more integrity constraints need to have a place holder to enable their existence.

In addition, the output of a function could be stored back in the database even if it is a new relation or attribute.

Users who check in newly created functions enhance collaboration by making this function searchable to the fellow users. For example, a financial analyst who writes a function to perform a market outlook based on some criteria and result in positive predictions may attract user's attention. Users who observe the results can track in DiBase™ which functions or sequence of functions used to achieve such a result.

InfoScope—Result layer

Find results obtained via function x, where function x is a particular version of a function.

What data sets are used to obtain this result

What user assumptions were used in instantiating a function used for a particular result.

These are some of the benefits of having a platform that can store results. With the decrease in storage costs and increase in the value of information, storing the results might be more valuable than leaving them on paper. This is one of the aspects I identify as return on information (ROI). For example, in the biotech industry, a drugs life time spans over numbers of years and can exceed a decade. Once a drug is found and submitted to the FDA for approval, recreating those early on results to substantiate one's claim becomes difficult. Infoscope allows a user to store a result of interest. InfoScope stores the data sets used as inputs, the sequence of functions with the specific variable instantiation, and the result. Let's examine table Result X in FIG. 5, where X is the context within which results are obtained, see DiBase™ Master table in FIG. 1 column 6.

Result X

Above we have now discussed handling, in the context X of both the category "data", with respect to which attribute definitions (in the table Schema X) are made distinct from relational definitions (in the table Relation X), and the category "function", with respect to which function definitions, flow-paths, and metadata (in the table Function X) are handled. In each case the table contents are policed by an integrity engine. Similarly, in the context X, the category "result" uses a table Result X for handling result definitions and result metadata, and a result integrity engine polices the contents of Result X as well.

For the sake of brevity, will highlight the significant columns of interest. A lot of similarities exist in the other master meta-tables like Schema and Relation, FIGS. 2 and 3 respectfully.

Column 5-12 is a pointer one-to-many scheme that captures the whole data-flow-path of data. That is what data sets are used in a result, functions and their particular versions, the user input for function variables etc. Having result X as part of the DiBase™ platform facilitates the tagging and capturing of such information.

Column 5-15, identifies dependencies to be executed when a result is re-run.

Results come is different data types, it is also anticipated that functions could be a type of result to be stored. In case of the different data type, SeBase can manage as discussed utilizing its dynamic aspect. If the result is a function or a stored query, DiBase™ handles such cases similar to the check-in procedure which is a dynamic open platform for functions.

This gives a brief view of the importance of the result layer to fulfill requirement such as 21 CFR Part 11 for drug approval process. It provides a complete electronic signature for the different items in all information categories involved in producing a result. For example, a result that was obtained in year 4 of a drug research can easily be re-run, see FIG. 29, at year 8 to cover newly added data sets and investigate if the previous claim still hold.

Integrity Engine

In the DiBase™ implementation, an integrity engine utilizes a set of rules to maintain system correctness. The integrity engine provides in effect a shield to protect information elements from being corrupted inadvertently by user error in interacting with the system; and therefore providing a way for non-technical users to interact with the system at all information category levels in a collaborative or individual fashion. With respect to each information category, the integrity engine provides modifiable rules to best suit the policies and procedures on how information elements are manipulated by a user. The integrity engine expands the circle of trust to end-users beside system administrators. This enables end-users to collaborate with other users and interact with information elements to benefit from the system's dynamic capability while sharing and tracking items from all information categories.

As exemplified below, the integrity engine's role varies by the information category type it controls and by three levels within each information category. In addition, the integrity engine works globally to control the relations among all information categories with in a context and how to interact across contexts. Within each information category, the integrity engine works at three levels: syntactic, semantic, and operational. These levels are enforced within a context, and several contexts may co-exist. (Thus, for example, although our examples are given with respect to a context X, a model may include more than one context like a context Y.) The permissible co-existence of contexts enables users to create environments which might be in conflict with each other in parallel, but all of which can co-exist and be accessible under one system, DiBase™.

Some integrity rules can change depending on the model under design and on the policies and procedures of the organization. These are rules that an administrator can modify, such as which users can access certain projects. Other rules need to be enforced within a context due to the domain of information being operated upon. For example, a context that manages biological interactions must prohibit certain proteins to co-exist with other genes or proteins based on the laws of nature discovered. A change in such a rule will reflect a change in the model, in this case could change the rule, which reflects a new understanding of nature, to mimic the impact on the whole model. Another example is a context of a produce factory might require that temperatures can't drop below a certain level since otherwise the produce will freeze and deteriorate. Depending on the model under study the rules are crafted to manage what change is permissible and what is to be considered a violation.

The more general the model is designed to be the more challenging is the task of creating an integrity engine that works for the model—because an integrity engine designed to mimic a general model must be able to work in a very wide range of potential contexts validating user interaction over time. Such an integrity engine must capture a wide range of human understanding, expertise, and knowledge for this range of potential contexts. Prior art models, such as relational data model, can change only via a manual process which avoids the dynamic change issues that necessitates the need for an integrity engine. An integrity engine eliminates the need for a manual static process of validation that takes place after a change is recognized to access the integrity of the system.

I will demonstrate the integrity engine rules for information management, though this can be easily mimicked to other domain specific environments and it should be easier. In the current implementation, the information being managed has only three categories: data, functions, and results. Examples of rules suitable for these categories are presented below. In addition, there are presented a set of global rules that manage the relationships among information elements in different categories.

Integrity Engine Design for Use with a Data Model—Data Information Category:

Data Category—Semantic level:

In the semantic level, integrity rules enforce to maintain correctness of meaning and eliminate duplication like:
  Attributes: There will be two groups of Attributes. Each group can have primary and secondary attributes.
  Primary Combination of attributes is unique
  Secondary Combination of attributes can be repeated.
  An attribute can be descriptor attribute to a single attribute or a group of attributes in case of primary as well as secondary attributes
  An attribute can have one or more descriptor attributes
  Examining the above sample of rules prohibits a user creating a relation between two set of attributes twice since one of the attribute groups must be primary and primary combination of attribute groups must be unique. This eliminates existence of AB→CD twice but allows AF→CD to co-exist with the relation having AB as its two primary attributes.

Relations:
  A Relation cannot be created on a single attribute
    (Help Note: If a user wants to create a relation with single attribute, he can create a new ID attribute and then create relation between these two attributes. For example, to create a relation with attribute name the user can create another ID attribute and then create a relation)
  The path between two Relations must be unique.
  E.g. consider the following relations
    a. R1: EmpAddress (Name, Address)
    b. R2: EmpPhone (Name, Phone)
    c. R3: PhoneMake (Phone, Make)
  Suppose R1 is related to R3 via R2.
  This means that EmpPhone is required to complete the relation between EmpAddress and PhoneMake. So the path R1-R2-R3 is unique and there cannot be another path between R1 and R3 defined within the system.
  When modifying/deleting objects, the dependant records in all related tables within the system should be updated accordingly.

Data Category—Operational Level:

In this operation level, activity is governed during user interaction. When can an attribute be added, deleted, or modified? Similarly for entering data values, incorrect values need to be rejected by the system from being entered into a relation. The third major area is if a user creates a new relation, how will the system accept it? This is referred to sometimes as the dynamic normalization engine.

For attribute change:
  If an attribute is referenced in one or more Relations:
  Deletion Not Allowed
  Modification Allowed for the Following:
    Description field of the attribute can be modified. When modifying the description, the old description can/requested to be retained and the new description should be added to the existing description.
    Length Field of the attribute can be modified to a higher length only. This is only for Text Datatype (**Integer Length cannot be modified. The standard range for integer is −32768 to 32767. The Length of the Integer field will be 6
    Data Type field of the attribute can be modified to a Compatible type only. They are:
    Integer to Number
    Integer to Text
    Number to Text
    Date to Text
  If Attribute is not referenced in any Relation:
  Deletion Allowed
  Modification Allowed
  If data is entered into a relation the data type of each cell must match the input data types entered by the user or if uploaded by the system. SeBase will compile an error report available for the user to view offending rows to which data was not successfully loaded.

Relation Integrity (Dynamic Normalization Engine)

Requiring relation integrity assures best practices for when to accept a relation into the system without violating system correctness. System correctness ensures that a user gets consistent answers to the same query with the system being in the same state. If the state of the system changes, values or relations are created or changed, than the result can change which does not conflict with the correctness of the system.

Relation addition into SeBase is best described by the following set of rules:

A relation can be added only if:—
1) All the attributes in the new relation do not exists together in any other relation
2) Grouping of attributes: relations are binary defining only one Dependency among attribute groups.
  say attributes A is a subset set of attributes X in new relation (X→Y) and if A exists in any other relation than all attributes in A should be grouped together in the existing relation
  say attributes A is a subset set of attributes Y in new relation (X→Y) and if A exists in any other relation than all attributes in A should be grouped together in the existing relation
  say attributes A is a subset set of attributes in R(X,Y) A(xi,yi) and if A exists in any other relation than all Xi's in A should be grouped together and all Yi's should be grouped together in the existing relation
3) create a set of attribute using the following steps:—
  a) Build the List containing attributes in X
  b) Add all the attributes in all the relations containing one or more attributes in the list to the list
  c) Repeat step b till the list does not change
If one or more attributes in y are in the list than the relation cannot be added, if List contains no attribute in Y than only the relation can be added.
4) Elements on the RHS (all or subset) should only be with the elements in the LHS of existing FDs or new element they should not exist with any other element in the list built in step 3.

For any FD X→Y we need to keep a list of all attribute groups in X, i.e. the left hand side of a relation (i.e. FD). X or a subset of X in any existing FD can't appear with any other attribute from the list created in step 3 below as an X (i.e. the left hand side of an FD) in a new FD.

Eg:—Say we have FDs ABC→DEF and DEF→GHI then if a user comes to define a new FD (AH→K) . . . . Rule 1, 2, and 3 will Pass but Building the List of LHS containing A we get (ABC) hence A should exists only with B,C or any new element not in the list (ABCDEFGHI), H is in the given list hence FD(AH→K) can not be added to the context.

Let's examine some examples using the above rules on a set of relations:

Assume a blank context. User defines relation R1(A, B, C, D, E, F)
FDs:—ABC→DEF—passed
User defines relation Rx(AC→B)—fails by rule 1
User defines relation R2(DE→GH) (rule1 passed, rule 2 passed rule3 passed, rule4 passed)—relation is stored.
Context state=relations in the system R1(ABC→DEF), R2(DE→GH)
User defines Rx(AD→H) (rule1 passed, rule2 failed since AD are in different groups in R1 hence addition of this relation is not allowed
User come to define Rx(AG→H) (rule1 passed, rule2 failed since GH are in the same groups in R2—failed.
User defines Rx(AB→GHI) (rule1 passed, rule2 passed, rule3 failed)
List(A, B, C, D, E, F, G, H) contains GH hence addition of this relation is not allowed
User defines R3(AB→I) (rule1 passed, rule2 passed, rule3 passed)—passed and stored.

Context state=relations in the system R1(ABC→DEF), R2(DE→GH), R3(AB→I)

User defines Rx(G→A) (rule1 passed, rule2 passed, rule3 failed List(A, B, C, D, E, G, H, I)—failed.

User defines Rx(EF→I) (rule1 passed, rule2 passed, rule3 failed)—failed.

User defines Rx(AI→J) (rule1 passed, rule2 failed since A and I are in different groups in R3 hence addition of this relation will not be allowed User defines Rx(AH→J) (rule1 passed, rule2 passed, rule3 passed, rule4 fails, A is in ABC in R1 and A can't be with any other attribute from the list of rule2 except BC i.e. A, B, C, D, E, F, I, H, G. Thus AH→J fails.

Data Category—Syntactic Level:
This level ensures the actual syntactic consistency within a context. The following are some integrity engine rules:
No two attributes can have same name
No two relations could have the same name
No two secondary data types could have the same name—new secondary data types could be created in the system within the primary data types such as text, number, integer, etc.
Attribute integrity is best used to ensure uniqueness of attribute and relation naming.

DiBase™ Global Integrity Engine:
The global integrity ensures consistency among information categories.

DiBase™ Global—Syntactic Level:

No two contexts could appear with the same name

No two storage spaces (the underlying storage box which can store part or all of a single context or a combination from more than one context)

Integrity engine design for use with function category—Operational level:

If a function is referenced in a DFP within the current project or another project:

Deletion Not Allowed

Modification Not Allowed

If Function is NOT referenced in a DFP within the current project or another project:

Deletion Allowed
  Modification Allowed

If DFP is referenced (i.e. if Results are saved):
  Deletion Not Allowed
  Modification Not Allowed If DFP is NOT referenced (i.e. the Result is NOT Saved):
  Deletion Allowed
  Modification Allowed If Authorized Function is tied within a Checked-in Function (i.e. a Function uses this Authorized Function):

Deletion Not Allowed
  Modification Allowed only for Environment details (i.e. data)

If authorized Function is NOT tied in any Checked-in Function (i.e. a Function Does Not use the Authorized Function):
  Deletion Allowed of the program type and the Environment details
  Modification Allowed of the program type and the Environment details Projects Addition/Modification:

SA, Site Admin and Project Admin can delete a Project.

Owner cannot delete projects unless he is a SA, Site Admin or a Project Admin

If the Project is not referenced in any other project within the system
  Deletion Allowed.
    The corresponding record in the Projects table should be deleted
    All the related objects should be deleted
    All the related tables including the counter tables should be dropped
    The user privileges and the project privileges should be updated accordingly
  Modification Allowed If the Project is referenced in any other project within the system
  Deletion Allowed.
    E.g.: Project P1 has a Function F1.Project P2 has a DFP which constitutes of functions from Project P2 and also Function F1 of Project P1
    When creating the DFP in project P2, record the details of inclusion of the Function P1.F1 within the DFP in the database against project P1
    When Project P1 is to be deleted warn the user that P1.F1 is used in P2.DFP and ask the user if project P2 can be deleted. If allowed then delete the project P1. This will make the DFP in project P2 Invalid.
  Modification Allowed
    Only objects of the project which are NOT referenced by any other project within the system can be modified The above rules list best practices for system integrity. Especially the inter-category integrity rules between Data, StoredQuery, function, and results, what are referred to as inter-category rules.

DiBase™ uses other rules that are known like Data integrity. Data integrity ensure when an attribute is of data type text to expect text. This is important when storing results into attributes in SeBase.

Backup and Recovery
  The following objects will get Backup/Restored
    Selected Project and its dependencies (includes Attributes, Relations, Relation Data, Stored Queries, Stored Query Results, Functions, Function Implementation Details, Data Flow Paths, Function Parameters, Users, Groups)
    Selected Relation and its dependencies (includes Selected Relations, attributes & Relation Data)
    Selected Stored Query and its dependencies (includes Selected Stored Queries, Relations, Attributes & Relation Data)
    Operational Objects (includes Users, Function Implementation Details, Program Types, list of Databases & Groups)
    Infoscope (Includes ResultSet Objects)
  Encryption & Compression:
    The backup file will be encrypted and compressed, which will not be understandable by any person.

Admin is backing up a project. After Backup of selected project, DiBase™ system will give a list of external references, which are referred in the selected project. A function 'FUN_A' in Project 'Proj_A' is referring a Function 'FUN_B' in another project 'Proj_B'. If we are backing up Project 'Proj_A', DiBase™ system should list 'FUN_B' along with Project Name 'Proj_B'.

While Restoring a Function which has got some Stored procedure/Dll Reference, the Function Implementation of that particular function will be set as unauthorized. Because we have restored only the metadata (function name, description, parameter details) & implementation details of that function, not the original Stored Procedure/Dll. Admin will set it as Authorized, once he copies the corresponding Stored Procedure/Dll to the new project database. A list of Functions has to be provided to the Admin, these implementation details has to be authorized Admin is Backing up a project, which has external reference in some other projects. Backup captures referenced project details (name, Desc.), provide user a facility to map the projects while restoring.

Backup & Recovery of Data Spread Across multiple databases.

Backup: Backup the relations with the same Database reference.

Recover: While restoring, check whether the database exists or not, if exists then put the data else user is provided an option by which on how to map the databases.

Audit log details like Created Owner, Created Date, Modified user & Modified Date. will also get backed up. Backup the related User as well with the Object (Project/Relation/Stored Query). While restoring check whether the user exists in the DiBase™ system or not. If exists then don't restore and use the login name of user everywhere. if user doesn't exists then create a new user. After restoring all the objects make the new user as inactive. Only admin can change to active.

Backed up filename will be combination of Timestamp, Object Type of Backup with the extension .dib.

Prj_MMDDYY_HHMMSS.dib—For Project Backup

Rel_MMDDYY_HHMMSS.dib—For Selected Stored Queries Backup

Sqry_MMDDYY_HHMMSS.dib—For Selected Stored Queries Backup

Backing all information categories into operability brings an open approach to exchange and collaboration. Users do not have to separately backup different categories and reassemble later during restore where inconsistencies pose a problem.

Information Integration

DiBase™ platform is a dynamic collaborative web-based software system that solves a number of key integration challenges. Data integration is an example of a widely discussed problem that DiBase™ solves without customization or a change in the architecture. This best tests the openness of the platform to different implementations. DiBase™ tackles the complex issues of data integration by:

1. Empowering users to capture new relations that integrate disparate data sources "on the fly". Utilizing a dynamic data model, DiBase™ brings a unique capability to end users to store new integrating relations incrementally as new relations are discovered by various users.
2. Enabling a wide range of field-based expertise to contribute in the growth of the virtual integration layer through a web-based collaborative environment. No matter where or what platform the expert uses, they can still connect and contribute to the growth of the virtual integration layer given they have the correct security access. With DiBase™ imposing no requirement on a prior design or system understanding, end-users can quickly and easily concentrate on their work and not on the technical challenges of managing the information.
3. Allowing DiBase™ users to create relations based on complex computations separate from the data source. This enables the integration layer to scale not only in size but in complexity as well. DiBase™ embodies a workflow component, FunBase™, which enables users to create and compile complex computation flows with custom functions check-in capability and to store the result into SeBase acting as the integration layer. This enhances the understanding of how or why a relation exists between items in the integration layer. Separating the integration logic from the data layer brings a level of flexibility that takes care of problems when the underlying data source changes.
4. Freeing users from the need to know the underlying data model as a pre-requisite to interacting with the system. In a dynamic environment, users will navigate and discover new relations and access more data without the priory data model understanding. This enhances sharing of new relationships that are discovered and made available by other users.

Some DiBase™ Features:

A database model "contextual model" allowing changes to relations among data attributes to be enforced on the fly. It also allows the co-existence of multiple schemas in a database—Schema-base "SeBase".

Functions affected due to a change in a relationship are displayed for user action.

A new process for propagating access rights to new data, functions, and results

A function-base model "FunBase" for check-in custom functions and storing a dynamically created DFP back in the system for later re-runs or investigation.

A user can establish a new relationship without requiring database redesign.

System notifies a user if a newly created relation violates an existing relationship.

CONCLUSION

Methods, systems, and articles of manufacture consistent with this invention enable an end-user to dynamically manage all information categories. This includes creating attributes, relations, check-in new functions, and storing results with all details on how they were obtained. Elevating the storing structure in the database model to use context instead of the traditional table as the access structure enables the data model to dynamically store information items on-the-fly. This also frees users from needing design knowledge about the underlying data model to be able to manipulate items in it. Making such a system network accessible, like a web-based system, opens new doors to solving applications, leveraging end-user expertise in areas that were chained down by the technical limitations and resources that surrounded software systems. It also opens the door for true collaboration of all information category items. Users don't only share data or end results, but the way a result was achieved, the method, the path, the data sources used. Collaboration allows users to re-run DFP on their own data to compare result, simply and easily with no more replicating complete system environments. Also, information access is extended. A user can retrieve a result by when it was executed, or who executed, or what functions where used. It changes the way users think of information sharing and how to solve problems.

The above mentioned description of the invention with the variations of implementation has been presented for purposes of illustration and description. It is not exhaustive and does not limit the invention to the precise form disclosed.

For example, the described implementation is a web-based software system, but the present invention could be implemented in a manufacturing factory where a user chooses from a kiosk like machine (i.e hardware) say a paint and a material (i.e. as data sources) to be mixed together to form a shape, as one function, or choose to apply the paint on the surface of a material, as another function with the result being stored tracking the new formulated data-flow-path. This invention may be implemented as software, a combination of software and hardware, or hardware alone. The scope of this invention is defined by the claims and their equivalents.

I claim:

1. A computer implemented method for dynamically and contextually managing information in an electronic computational environment, the method comprising:
   with respect to a project, the project providing a corresponding context and/or one or more other contexts for management of a plurality of information elements, each information element being in at least one of a plurality of information categories, each information category being a member of a category set, the category set including data category, function category, and result category, wherein the corresponding context and/or one or more other contexts corresponds to at least one contextual model, where the contextual model is defined by the information elements and a set of rules governing permissible relationships among the information elements;
   (a) receiving an input and/or user interaction to the electronic computational environment specifying a relationship among at least two information elements;
   (b) using an integrity engine, operating globally to enforce the set of rules, to verify dynamically correctness of the relationship specified among all information categories within the corresponding context and/or one or more other contexts;
   wherein the integrity engine's role varies by the information category and operates on at least one of a plurality of levels within each information category to cause enforcement of the set of rules within the corresponding context and/or one or more other contexts;
   the plurality of levels within each information category including syntactic, semantic, and operational levels; where the corresponding context and/or one or more other contexts and the integrity engine establish the contextual model; and
   (c) upon acceptance of the relationship by the integrity engine, storing automatically the relationship specified in a storage medium, permitting dynamic interaction, wherein the dynamic interaction includes storing, retrieving, manipulation of information elements, and modifications of relations with respect to the corresponding context and/or one or more other contexts.

2. The method according to claim 1, further comprising: storing, in a schema table, a list of attributes in the data category, each attribute being an element; and storing, in a relation table, separately from the schema table, a list of relationships among such attributes, permitting dynamic interaction with respect to data aspects of the context.

3. The method according to claim 1, further comprising: storing, in a function table, a list of functions in the function category, inputs to and outputs from each of the listed functions, and metadata for each of the listed functions, each function being an element permitting dynamic interaction with respect to function aspects of the context.

4. The method according to claim 1, further comprising: storing, in a result table, a list of results in the result category, and for each listed result, a sequence of functions pertinent to such result, input parameters to and outputs from each function, and metadata, each result being an element permitting dynamic interaction with respect to result aspects of the context.

5. The method according to claim 1, wherein the information elements relates to a plurality of projects, each project providing a distinct corresponding context and/or one or more other contexts, the method further comprising: storing a table listing the distinct corresponding context and/or one or more other contexts; and for each distinct corresponding context and/or one or more other contexts, storing an information element table pertinent the information categories in the distinct corresponding context and/or one or more other contexts, the table listing information elements that are present, in the information categories, in the distinct corresponding context and/or one or more other contexts.

6. The method according to claim 5, wherein the information elements relates to the plurality of projects, each project providing the distinct corresponding context and/or one or more other contexts, the method further comprising: for each distinct corresponding context and/or one or more other contexts, storing a distinct schema table that lists attributes pertinent to the distinct corresponding context and/or one or more other contexts in the data category; and storing a relation table that shows relations among attributes.

7. The method according to claim 5, wherein the information elements relates to the plurality of projects, each project providing the distinct corresponding context and/or one or more other contexts, the method further comprising: for each distinct corresponding context and/or one or more other contexts, storing a function table that lists functions, in the function category, pertinent to the distinct corresponding context and/or one or more other contexts, inputs to and outputs from each of the listed functions, and metadata for each of the listed functions.

8. The method according to claim 5, wherein the information elements relates to the plurality of projects, each project providing the distinct corresponding context and/or one or more other contexts, the method further comprising: for each distinct corresponding context and/or one or more other contexts, storing a result table that lists results, in the result category, pertinent to the distinct corresponding context and/or one or more other contexts, and for each listed result, a sequence of functions pertinent to the result, input parameters to and outputs from each function, and metadata for each listed result.

9. The method according to claim 5, wherein the information elements in one of the distinct corresponding context and/or one or more other contexts has a relation to the information elements present in another of the distinct corresponding context and/or one or more other contexts.

10. The method according to claim 1, wherein the input is via a graphical user interface by an end user.

11. The method according to claim 10, further comprising: operating a server running software instructions implementing processes including receiving the input using the integrity engine and storing, wherein the input is via a web browser application running on a computer in communication with the server over a network.

12. The method according to claim 1, wherein at least some of the rules are modifiable to modify behavior of the corresponding context and/or one or more other contexts.

13. The method according to claim 1, wherein at least some of the rules are modifiable by the user to modify behavior of the corresponding context and/or one or more other contexts.

14. The method according to claim 1, wherein the corresponding context and/or one or more other contexts change dynamically in response to the presence of the information elements.

15. The method according to claim 1, wherein the input specifying the relationship includes specifying, for a result, a process by which the result is obtained and at least some of the result itself.

16. The method according to claim 1, wherein the input specifying the relationship includes specifying, for a function, a workflow by which data is made available to the function.

17. The method according to claim 1, wherein the input specifying the relationship includes specifying, for the information elements, a set of relationships among attributes associated with the information elements.

18. The method according to claim 2, wherein at least one of the schema table and the relation table stores user-definable annotation of entries therein.

19. The method according to claim 3, wherein the function table includes a provision for storing user-definable annotation of entries therein.

20. The method according to claim 4, wherein the result table stores user-definable annotation of entries therein.

21. The method according to claim 1, wherein the corresponding context and/or one or more other contexts include information content that is dynamic.

22. The method according to claim 1, wherein the project includes integration of information from a plurality of information sources, so that the information elements from the information sources may be integrated in the corresponding context and/or one or more other contexts dynamically.

23. The method according to claim 5, wherein at least one of the plurality of projects is associated with another party, the method further comprising: for an active one of the plurality of projects, making therein available, to the user, information elements from at least one user-specified other project, so that information elements from the plurality of projects may be dynamically integrated by the user and so that the user may collaborate with the other party.

24. The method according to claim 1, wherein the electronic computational environment is multi-user, so that a plurality of users may collaborate with respect to the project, resulting in a collaboration in which the information elements may be integrated dynamically without a pre-conceived design.

25. The method according to claim 1, further comprising tracking changes resulting from the user interaction with the project and identifying such changes by at least one of time, user, location and version.

26. The method according to claim 5, wherein the computational environment is multi-user so that there are a plurality of end users and wherein each end-user has a profile for each context in the system to enforce policies and procedures on the user interaction with the information elements and any other users.

27. The method according to claim 1, further comprising providing a user with administrative rights with respect to the information elements including at least one of backup/restore, performance optimization, grouping or organization, access authorization, and annotation.

28. A system for dynamically and contextually managing information in an electronic computational environment, the system comprising:
 a processor;
 a memory having stored thereon instructions executed by the processor that cause the processor to perform a process comprising:
  with respect to a project, the project providing a corresponding context and/or one or more other contexts for management of a plurality of information elements, each information element being in at least one of a plurality of information categories, each information category being a member of a category set, the category set including data category, function category, and result category, wherein the corresponding context and/or one or more other contexts corresponds to at least one contextual model, and the contextual model is defined by the information elements and a set of rules governing permissible relationships among the information elements;
 means for receiving an input and/or user interaction to the electronic computational environment specifying a relationship among at least two information elements;
 using an integrity engine, operating globally to enforce the set of rules, to verify dynamically correctness of the relationship specified among all information categories within the corresponding context and/or one or more other contexts;
 wherein the integrity engine's role varies by the information category and operates on at least one of a plurality of levels within each information category to cause enforcement of the set of rules within the corresponding context and/or one or more other contexts;
 the plurality of levels within each information category including syntactic, semantic, and operational levels; where the corresponding context and/or one or more other contexts and the integrity engine establish the contextual model; and
 means, operative upon acceptance of the relationship by the integrity engine, for storing automatically the relationship specified in a storage medium, permitting dynamic interaction, wherein the dynamic interaction includes storing, retrieving, manipulation of information elements, and modifications of relations with respect to the corresponding context and/or one or more other contexts.

* * * * *